United States Patent
Liu et al.

(10) Patent No.: US 11,956,776 B2
(45) Date of Patent: Apr. 9, 2024

(54) BASE STATION APPARATUS, TERMINAL APPARATUS AND COMMUNICATION METHOD

(71) Applicants: SHARP KABUSHIKI KAISHA, Sakai (JP); FG Innovation Company Limited, Tuen Mun (HK)

(72) Inventors: Liqing Liu, Sakai (JP); Shohei Yamada, Sakai (JP); Hiroki Takahashi, Sakai (JP); Masayuki Hoshino, Sakai (JP); Hidekazu Tsuboi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 480 days.

(21) Appl. No.: 17/280,497

(22) PCT Filed: Sep. 27, 2019

(86) PCT No.: PCT/JP2019/038127
§ 371 (c)(1),
(2) Date: Jun. 10, 2021

(87) PCT Pub. No.: WO2020/067416
PCT Pub. Date: Apr. 2, 2020

(65) Prior Publication Data
US 2022/0030607 A1    Jan. 27, 2022

(30) Foreign Application Priority Data
Sep. 27, 2018   (JP) ................................ 2018-181504

(51) Int. Cl.
*H04W 72/12*   (2023.01)
*H04W 72/04*   (2023.01)
(Continued)

(52) U.S. Cl.
CPC ... *H04W 72/1273* (2013.01); *H04W 72/0446* (2013.01); *H04W 72/046* (2013.01); *H04W 72/23* (2023.01)

(58) Field of Classification Search
CPC ............. H04W 72/1273; H04W 72/23; H04W 72/0446; H04W 72/046
See application file for complete search history.

(56) References Cited

U.S. PATENT DOCUMENTS

| | | | |
|---|---|---|---|
| 2017/0223687 A1* | 8/2017 | Kuchibhotla | ......... H04L 5/0007 |
| 2019/0150124 A1* | 5/2019 | Nogami | ................ H04L 5/0044 |
| 2022/0248437 A1* | 8/2022 | Takahashi | ............. H04W 72/23 |

FOREIGN PATENT DOCUMENTS

| | | |
|---|---|---|
| CN | 104769868 A | 7/2015 |
| CN | 108476101 A | 8/2018 |

OTHER PUBLICATIONS

Nokia, "CR to 38.214 capturing the RAN1 #94 meeting agreements" [online], 3GPP TSG RAN WG1 #94 R1-1810021, Aug. 24, 2018, section 5.1.2.1.
(Continued)

*Primary Examiner* — Ronald B Abelson
(74) *Attorney, Agent, or Firm* — ScienBiziP, P.C.

(57) ABSTRACT

A terminal apparatus includes: a reception unit which receives, from a base station apparatus, a physical downlink control channel including downlink control information in a search space specific to the terminal apparatus; and a control unit which determines the number of bits of a time domain resource allocation field in the downlink control information. The time domain resource allocation field is a time domain resource allocation field for a physical downlink shared channel. A default table indicates a time domain resource allocation configuration for the physical downlink shared channel. When a parameter is not received, the
(Continued)

number of bits of the time domain resource allocation field is determined based on the number of the in the default table.

9 Claims, 21 Drawing Sheets

(51) Int. Cl.
*H04W 72/044* (2023.01)
*H04W 72/0446* (2023.01)
*H04W 72/1273* (2023.01)
*H04W 72/23* (2023.01)

(56) References Cited

OTHER PUBLICATIONS

RAN1, "CRs to 38.2xx NR specs capturing URLLC agreements of RAN1 #926 & RAN1 #93" [online], 3GPP TSG RAN #80 RP-181257, Jun. 14, 2018, section 7.3.1.2.2.
Huawei, "CR to 38.212 capturing the RAN1#92bis and RAN1#93 meeting agreements related to URLLC", 3GPP TSG RAN WG1 Meeting #93 Busan, Korea, May 21-25, 2018, R1-1807962.
Samsung, "Corrections on DL/UL Resource Allocation", R1-1800451, 3GPP TSG RAN WG1 Meeting AH1801, Vancouver, Canada, Jan. 22-26, 2018, section 3, figures 1 and 2.
"3rd Generation Partnership Project; Technical Specification Group Radio Access Network; NR; Multiplexing and channel coding (Release 15)" 3GPP TS 38.212 V15.1.1 (Apr. 2018), section 7.3.1.2.2.
Ericsson, "Summary of 7.1.3.3.1 (resource allocation)", R1-1805505, TSG-RAN WG1 #92bis, Sanya, China, Apr. 16-20, 2018, sections 2 and 3.

\* cited by examiner

Random Access Response Grant Content field size

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for scheduled PUSCH | 3 |
| CSI request | 1 |

FIG. 9

Applicable PDSCH time domain resource allocation

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0 common | 1 | - | - | Default A for normal CP |
|  |  | 2 | - | - | Default B |
|  |  | 3 | - | - | Default C |
| SI-RNTI | Type0A common | 1 | No | - | Default A |
|  |  | 2 | No | - | Default B |
|  |  | 3 | No | - | Default C |
|  |  | 1,2,3 | Yes | - | pdsch-TimeDomainAllocationList provided in pdsch-ConfigCommon |
| RA-RNTI, TC-RNTI | Type1 common | 1, 2, 3 | No | - | Default A |
|  |  | 1, 2, 3 | Yes | - | pdsch-TimeDomainAllocationList provided in pdsch-ConfigCommon |
| P-RNTI | Type2 common | 1 | No | - | Default A |
|  |  | 2 | No | - | Default B |
|  |  | 3 | No | - | Default C |
|  |  | 1,2,3 | Yes | - | pdsch-TimeDomainAllocationList provided in pdsch-ConfigCommon |
| C-RNTI, MCS-C-RNTI, CS-RNTI | Any common search space associated with CORESET #0 | 1, 2, 3 | No | - | Default A |
|  |  | 1, 2, 3 | Yes | - | pdsch-TimeDomainAllocationList provided in pdsch-ConfigCommon |
| C-RNTI, MCS-C-RNTI, CS-RNTI | Any common search space not associated with CORESET #0, UE specific search space | 1,2,3 | No | No | Default A |
|  |  | 1,2,3 | Yes | No | pdsch-TimeDomainAllocationList provided in pdsch-ConfigCommon |
|  |  | 1,2,3 | No/Yes | Yes | pdsch-TimeDomainAllocationList provided in pdsch-Config |

FIG. 10

Default PDSCH time domain resource allocation A for normal CP

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type B | 0 | 2 | 4 |
| 15 | 2,3 | Type B | 0 | 4 | 7 |
| 16 | 2,3 | Type B | 0 | 8 | 4 |

FIG. 11

Default PDSCH time domain resource allocation B

| Row index | dmrs-TypeA-Position | PDSCH mapping type | $K_0$ | S | L |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | 2,3 | Type B | 1 | 2 | 2 |
| 7 | 2,3 | Type B | 1 | 4 | 2 |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 (Note 1) | 2,3 | Type B | 0 | 10 | 4 |
| 13 (Note 1) | 2,3 | Type A | 0 | 2 | 7 |
| 14 (Note 1) | 2 | Type A | 0 | 2 | 12 |
| 15 | 3 | Type A | 0 | 3 | 11 |
| 16 | 2,3 | Type B | 1 | 2 | 4 |
| 16 | Reserved | | | | |

Note 1: If the PDSCH was scheduled with SI-RNTI in PDCCH Type0 common search space, the UE may assume that this PDSCH resource allocation is not applied

FIG. 12

Default PDSCH time domain resource allocation C

| Row index | dmrs-TypeA-Position | PDSCH mapping type | $K_0$ | S | L |
|---|---|---|---|---|---|
| 1 (Note 1) | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | | | Reserved | | |
| 7 | | | Reserved | | |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 (Note 1) | 2,3 | Type B | 0 | 2 | 7 |
| 14 (Note 1) | 2 | Type A | 0 | 2 | 12 |
| | 3 | Type A | 0 | 3 | 11 |
| 15 (Note 1) | 2,3 | Type A | 0 | 0 | 6 |
| 16 (Note 1) | 2,3 | Type A | 0 | 2 | 6 |
| Note 1: The UE may assume that this PDSCH resource allocation is not used, if the PDSCH was scheduled with SI-RNTI in PDCCH Type0 common search space | | | | | |

FIG. 13

- The starting symbol $S$ relative to the start of the slot, and the number of consecutive symbols $L$ counting from the symbol $S$ allocated for the PDSCH are determined from the start and length indicator $SLIV$:

if $(L-1) \leq 7$ then $$SLIV = 14 \cdot (L-1) + S$$

else $$SLIV = 14 \cdot (14 - L + 1) + (14 - 1 - S)$$

where $0 < L \leq 14 - S$

FIG. 14

Applicable PUSCH time domain resource allocation

| RNTI | PDCCH search space | pusch-ConfigCommon includes pusch-TimeDomainAllocationList | pusch-Config includes pusch-TimeDomainAllocationList | PUSCH time domain resource allocation to apply |
|---|---|---|---|---|
| | PUSCH scheduled by MAC RAR as described in subclause 8.2 of [6, TS 38.213] | No Yes | - | Default A pusch-TimeDomainAllocationList provided in pusch-ConfigCommon |
| C-RNTI, MCS-C-RNTI, TC-RNTI, CS-RNTI | Any common search space associated with CORESET 0 | No Yes | - | Default A pusch-TimeDomainAllocationList provided in pusch-ConfigCommon |
| C-RNTI, MCS-C-RNTI, TC-RNTI, CS-RNTI | Any common search space not associated with CORESET 0, UE specific search space | No Yes No/Yes | No No Yes | Default A pusch-TimeDomainAllocationList provided in pusch-ConfigCommon pusch-TimeDomainAllocationList provided in pusch-Config |

FIG. 16

Default PUSCH time domain resource allocation A for normal CP (PUSCH default A)

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j+1 | 0 | 14 |
| 9 | Type A | j+1 | 0 | 12 |
| 10 | Type A | j+1 | 0 | 10 |
| 11 | Type A | j+2 | 0 | 14 |
| 12 | Type A | j+2 | 0 | 12 |
| 13 | Type A | j+2 | 0 | 10 |
| 14 | Type B | j | 8 | 6 |
| 15 | Type A | j+3 | 0 | 14 |
| 16 | Type A | j+3 | 0 | 10 |

FIG. 17

BASE STATION APPARATUS, TERMINAL APPARATUS AND COMMUNICATION METHOD

CROSS-REFERENCE TO RELATED APPLICATION

The present application claims priority based on Japanese Patent Application No. 2018-181504 filed on Sep. 27, 2018, the content of which is incorporated herein by reference.

FIELD

The present invention relates to a base station apparatus, a terminal apparatus and a communication method.

BACKGROUND

Technical studies and standardization of Long Term Evolution (LTE)-Advanced Pro and New Radio (NR) technology, as a radio access scheme and a radio network technology for fifth generation cellular systems, are currently conducted by the 3rd Generation Partnership Project (3GPP) (Non Patent Literature 1).

The 5th generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

PRIOR ART LITERATURE

Non-Patent Literature

Non-Patent Literature 1: RP-161214, NTT DOCOMO, "Revision of SI: Study on New Radio Access Technology", June 2016.

SUMMARY

Technical Problem

The objectives of some aspects of the present invention provide a terminal apparatus, a base station apparatus, a communication method, and an integrated circuit capable of performing efficient communication in the wireless communication system described above.

Solution to Problem (1) In order to achieve the above objective, the following means are provided according to aspects of the present invention. That is, a terminal apparatus according to one aspect of the present invention includes: a reception unit which receives, from a base station apparatus, a physical downlink control channel including downlink control information in a search space specific to the terminal apparatus; and a control unit which determines the number of bits of a time domain resource allocation field in the downlink control information. The time domain resource allocation field is a time domain resource allocation field for a physical downlink shared channel. A default table indicates a time domain resource allocation configuration for the physical downlink shared channel. When a parameter is not received, the number of bits of the time domain resource allocation field is determined based on the number of entries in the default table.

(2) In addition, a base station apparatus according to one aspect of the present invention includes: a transmission unit which transmits, to a terminal apparatus, a physical downlink control channel including downlink control information in a search space specific to the terminal apparatus; and a control unit which determines the number of bits of a time domain resource allocation field in the downlink control information. The time domain resource allocation field is a time domain resource allocation field for a physical downlink shared channel. A default table indicates a time domain resource allocation configuration for the physical downlink shared channel. When a parameter is not transmitted, the number of bits of the time domain resource allocation field is determined based on the number of entries in the default table.

(3) In addition, a communication method for a terminal apparatus according to one aspect of the present invention includes: receiving, from a base station apparatus, a physical downlink control channel including downlink control information in a search space specific to the terminal apparatus; and determining the number of bits of a time domain resource allocation field in the downlink control information. The time domain resource allocation field is a time domain resource allocation field for a physical downlink shared channel. A default table indicates a time domain resource allocation configuration for the physical downlink shared channel. When a parameter is not received, the number of bits of the time domain resource allocation field is determined based on the number of entries in the default table.

(4) In addition, a communication method for a base station apparatus according to one aspect of the present invention includes: transmitting, to a terminal apparatus, a physical downlink control channel including downlink control information in a search space specific to the terminal apparatus; and determining the number of bits of a time domain resource allocation field in the downlink control information. The time domain resource allocation field is a time domain resource allocation field for a physical downlink shared channel. A default table indicates a time domain resource allocation configuration for the physical downlink shared channel. When a parameter is not received, the number of bits of the time domain resource allocation field is determined based on the number of entries in the default table.

Invention Effect

According to some aspects of the present invention, the base station apparatus and the terminal apparatus can perform communication efficiently.

BRIEF DESCRIPTION OF THE DRAWINGS

FIG. 9 is a diagram illustrating an example of fields included in an RAR UL grant according to an embodiment of the present invention.

FIG. 10 is a diagram defining which resource allocation table according to an embodiment of the present invention is applied to PDSCH time domain resource allocation.

FIG. 11 is a diagram illustrating an example of a default table A according to an embodiment of the present invention.

FIG. 12 is a diagram illustrating an example of a default table B according to an embodiment of the present invention.

FIG. 13 is a diagram illustrating an example of a default table C according to an embodiment of the present invention.

FIG. 14 is a diagram illustrating an example of calculating SLIV according to an embodiment of the present invention.

FIG. 16 is a diagram defining which resource allocation table according to the present embodiment is applied to PUSCH time domain resource allocation.

FIG. 17 is a diagram illustrating an example of a PUSCH default table A according to the present embodiment.

DETAILED DESCRIPTION OF THE PREFERRED EMBODIMENTS

Hereinafter, the embodiments of the present invention will be described.

Figure 1:
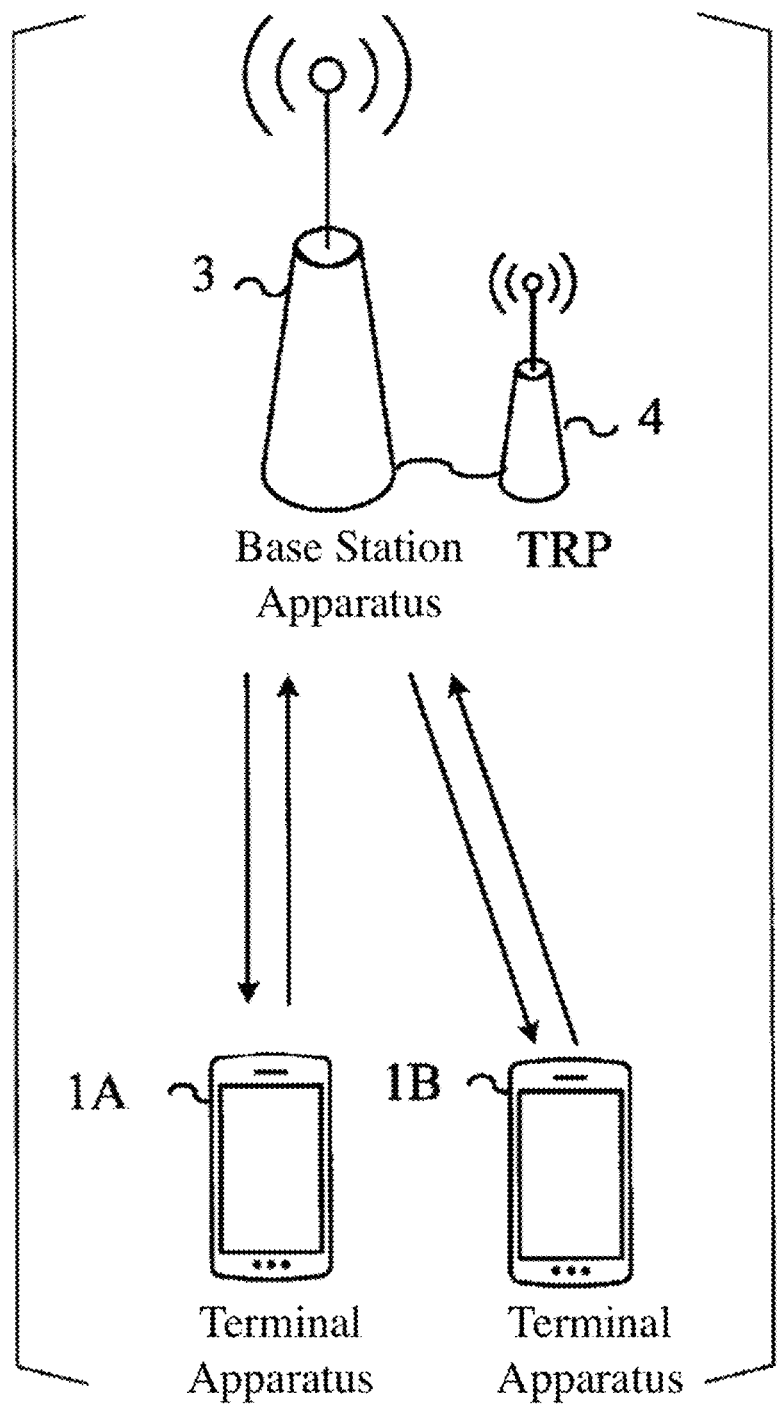
FIG. 1 is a conceptual diagram illustrating a wireless communication system according to an embodiment of the present invention.

FIG. 1 is a conceptual diagram of a wireless communication system according to the present embodiment. In FIG. 1, a wireless communication system includes a terminal apparatus 1A, a terminal apparatus 1B, and a base station apparatus 3. Hereinafter, the terminal apparatus 1A and the terminal apparatus 1B are each also referred to as a terminal apparatus 1.

The terminal apparatus 1 is also referred to as a user terminal, a mobile station apparatus, a communication terminal, a mobile equipment, a terminal, a user equipment (UE), and a mobile station (MS). The base station apparatus 3 is also referred to as a radio base station apparatus, a radio station, a fixed station, a Node B (NB), an evolved Node B (eNB), a base transceiver station (BTS), a base station (BS), an NR Node B (NR NB), an NNB, a transmission and reception point (TRP), or a gNB. The base station apparatus 3 may also include a core network apparatus. In addition, the base station apparatus 3 may include one or more transmission reception points 4. At least one part of the functions/processes of the base station apparatus 3 described below may be functions and processes of each transmission reception point 4 included in the base station apparatus 3. The base station apparatus 3 may function as one cell or a plurality of cells to serve the terminal apparatus 1 in a communicable range (communication area) controlled by the base station apparatus 3. In addition, the base station apparatus 3 may function as one cell or a plurality of cells to serve the terminal apparatus 1 in a communicable range (communication area) controlled by one or more transmission reception points 4. Further, one cell may be divided into a plurality of portion areas (beamed areas), and the terminal apparatus 1 may be served in each of the portion areas. Here, the portion region may be identified based on a beam index or a precoding index used in beamforming.

The wireless communication link from the base station apparatus 3 to the terminal apparatus 1 is referred to as a downlink. The wireless communication link from the terminal apparatus 1 to the base station apparatus 3 is referred to as an uplink.

In FIG. 1, Orthogonal Frequency Division Multiplexing (OFDM) including a cyclic prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used in a radio communication between the terminal apparatus 1 and the base station apparatus 3.

In addition, in FIG. 1, Universal-Filtered Multi-Carrier (UFMC), Filtered OFDM (F-OFDM), Windowed OFDM, or Filter-Bank Multi-Carrier (FBMC) may also be used in the radio communication between the terminal apparatus 1 and the base station apparatus 3.

Further, in the present embodiment, OFDM is described as a transmission scheme using OFDM symbols, but the present invention may also include cases where any other transmission schemes described above are used.

Furthermore, in FIG. 1, in the radio communication between the terminal apparatus 1 and the base station apparatus 3, the CP may not be used, or the above-described transmission scheme with zero padding may be used instead of the CP. Moreover, the CP or zero padding may be added both forward and backward.

One aspect of the present embodiment may be operated in carrier aggregation or dual connectivity with a radio access technology (RAT) such as LTE or LTE-A/LTE-A Pro. At this time, it may be applied to some or all cells or cell groups, carriers or carrier groups (e.g., a primary cell (PCell), a secondary cell (SCell), a primary secondary cell (PSCell), a master cell group (MCG), a secondary cell group (SCG), etc.). In addition, it may also be applied to stand-alone apparatuses that operate independently. In a dual connectivity operation, a special cell (SpCell) is referred to as a PCell of MCG or a PSCell of SCG depending on whether a Medium Access Control (MAC) entity is associated with MCG or SCG, respectively. If a dual connectivity operation is not performed, the SpCell is referred to as a PCell. The SpCell supports PUCCH transmission and contention-based random access.

In the present embodiment, one serving cell or a plurality of serving cells may be configured for the terminal apparatus 1. The configured plurality of serving cells may also comprise one primary cell and one or more secondary cells. The primary cell may be a serving cell in which an initial connection establishment procedure has been performed, a serving cell in which a connection re-establishment procedure has been initiated, or a cell indicated as a primary cell in a handover procedure. One or more secondary cells may be configured when or after a radio resource control (RRC) connection is established. The configured plurality of serving cells may also comprise one primary secondary cell. The primary secondary cell may be a secondary cell, in which control information can be transmitted in the uplink, out of one or more secondary cells in which the terminal apparatus 1 is configured. In addition, a subset of the two types of serving cells, i.e., a master cell group and a secondary cell group, may be configured for the terminal apparatus 1. The master cell group may also include one primary cell and zero or more secondary cells. The secondary cell group may also include one primary secondary cell and zero or more secondary cells.

Time Division Duplex (TDD) and/or Frequency Division Duplex (FDD) may be applied to the wireless communication system according to the present embodiment. The Time Division Duplex (TDD) scheme or the Frequency Division Duplex (FDD) scheme may be applied to all of multiple cells. Cells to which the TDD scheme is applied and cells to which the FDD scheme is applied may be aggregated. The TDD scheme may also be referred to as an unpaired spectrum operation. The FDD scheme may also be referred to as a paired spectrum operation.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

The physical channels and the physical signals according to the present embodiment will be described below.

In FIG. 1, the following physical channels are used in the wireless communication between the terminal apparatus 1 and the base station apparatus 3.

PBCH (Physical Broadcast CHannel)
PDCCH (Physical Downlink Control CHannel)
PDSCH (Physical Downlink Shared CHannel)
PDCCH (Physical Uplink Control CHannel)
PDSCH (Physical Uplink Shared CHannel)
PRACH (Physical Random Access CHannel)

The PBCH is used to broadcast an essential information block (MIB: Master Information Block, EIB: Essential information Block, BCH: Broadcast Channel) including essential system information required by the terminal apparatus 1.

In addition, the PBCH may be also used to broadcast a time index within a period of a block of synchronization signals (also referred to as SS/PBCH block). Here, the time index is information for indicating an index of the synchronization signal and the PBCH within the cell. For example, in a case that the SS/PBCH block is transmitted by using three transmission beams (transmission filtering configurations, Quasi-CoLocation (QCL) regarding reception spatial parameters), an order of time within a predetermined period or within a configured period may be indicated. In addition, the terminal apparatus may recognize a difference in the time indexes as a difference in the transmission beams.

The PDCCH is used to transmit (or carry) Downlink Control Information (DCI) in downlink wireless communication (i.e., wireless communication from the base station apparatus 3 to the terminal apparatus 1). Here, one or more pieces of DCI (which may be referred to as DCI formats) are defined for transmission of the downlink control information. That is, a field for the downlink control information is defined as DCI and mapped to information bits. The PDCCH is transmitted in a PDCCH candidate. The terminal apparatus 1 monitors a set of PDCCH candidates in a serving cell. The monitoring means an attempt to decode the PDCCH according to a DCI format.

For example, the following DCI formats are defined.
DCI format 0_0
DCI format 0_1
DCI format 1_0
DCI format 1_1
DCI format 2_0
DCI format 2_1
DCI format 2_2
DCI format 2_3

The DCI format 0_0 may be used for scheduling of a PUSCH within a cell. DCI format 0_0 may include information for indicating scheduling information of the PUSCH (frequency domain resource allocation and time domain resource allocation). DCI format 0_0 may also be attached with CRC scrambled by any of C-RNTI, CS-RNTI, MCS-C-RNTI, and/or TC-RNTI. DCI format 0_0 may be monitored in a common search space or a UE-specific search space.

DCI format 0_1 may also be used for scheduling of a PUSCH within a cell. DCI format 0_1 may include information for indicating scheduling information of the PUSCH (frequency domain resource allocation and time domain resource allocation), information for indicating a BandWidth Part (BWP), a Channel State Information (CSI) request, a Sounding Reference Signal (SRS) request, and information related to an antenna port. DCI format 0_1 may be attached with CRC scrambled by any of C-RNTI, CS-RNTI, SP-CSI-RNTI, and/or MCS-C-RNTI. DCI format 0_1 may also be monitored in a UE-specific search space.

DCI format 1_0 may be used for scheduling of a PDSCH within a cell. DCI format 1_0 may include information for indicating scheduling information of the PDSCH (frequency domain resource allocation and time domain resource allocation). DCI format 1_0 may be attached with CRC scrambled by any of C-RNTI, CS-RNTI, MCS-C-RNTI, P-RNTI, SI-RNTI, RA-RNTI, and/or TC-RNTI. DCI format 1_0 may also be monitored in a common search space or a UE-specific search space.

DCI format 1_1 may also be used for scheduling of a PDSCH within a cell. DCI format 1_1 may include information for indicating scheduling information of the PDSCH (frequency domain resource allocation and time domain resource allocation), information for indicating a BandWidth Part (BWP), Transmission Configuration Indication (TCI), and information related to an antenna port. DCI format 1_1 may be attached with CRC scrambled by any of C-RNTI, CS-RNTI, and/or MCS-C-RNTI. DCI format 1_1 may also be monitored in a UE-specific search space.

DCI format 2_0 is used to notify the slot format of one or more slots. The slot format is defined as one in which each OFDM symbol in the slot is classified as downlink, flexible, or uplink. For example, in a case that the slot format is 28, DDDDDDDDDDDDFU is applied to 14 symbols of OFDM symbols in the slot in which slot format 28 is indicated. Here, D is a downlink symbol, F is a flexible symbol, and U is an uplink symbol. Further, the slot will be described later.

DCI format 2_1 is used to notify the terminal apparatus 1 of physical resource blocks and OFDM symbols which may be assumed not to be transmitted. Besides, this information may be referred to as a preemption indication (intermittent transmission indication).

DCI format 2_2 is used for transmission of the PUSCH and transmit power control (TPC) commands for the PUSCH.

DCI format 2_3 is used to transmit a group of TPC commands for sounding reference signal (SRS) transmission by one or more terminal apparatuses 1. In addition, an SRS request may also be transmitted together with the TPC commands. In addition, an SRS request and TPC commands may be defined in DCI format 2_3 for an uplink with no PUSCH and PUCCH or an uplink with the transmit power control of the SRS not associated with the transmit power control of the PUSCH.

The DCI for the downlink is also referred to as a downlink grant or a downlink assignment. Here, the DCI for the uplink is also referred to as an uplink grant or an uplink assignment. DCI is also referred to as a DCI format.

A cyclic redundancy check (CRC) parity bit attached to a DCI format transmitted by one PDCCH is scrambled by SI-RNTI (System Information-Radio Network Temporary Identifier), P-RNTI (Paging-Radio Network Temporary Identifier), C-RNTI (Cell-Radio Network Temporary Identifier), CS-RNTI (Configured Scheduling-Radio Network Temporary Identifier), RA-RNTI (Random Access-Radio Network Temporary Identity), or Temporary C-RNTI. The SI-RNTI may be an identifier used for broadcasting of system information. The P-RNTI may be an identifier used for paging and notification of system information change. The C-RNTI, the MCS-C-RNTI, and the CS-RNTI are identifiers used for identifying the terminal apparatus within a cell. The Temporary C-RNTI is an identifier used for identifying the terminal apparatus 1 that has transmitted a random access preamble in a contention-based random access procedure.

The C-RNTI (terminal apparatus identifier (identification information)) is used to control the PDSCH or the PUSCH in one or more slots. The CS-RNTI is used to periodically allocate resources of the PDSCH or the PUSCH. The MCS-C-RNTI is used to indicate the use of a predetermined MCS table for grant-based transmission. The Temporary C-RNTI (TC-RNTI) is used to control PDSCH transmission or PUSCH transmission in one or more slots. The Temporary C-RNTI is used to schedule retransmission of a random access Message 3 and transmission of a random access Message 4. The RA-RNTI (random access response identification information) is determined according to frequency and time location information of a physical random access channel on which a random access preamble is transmitted.

The PUCCH is used to transmit uplink control information (UCI) in uplink wireless communication (i.e., wireless communication from the terminal apparatus 1 to the base station apparatus 3). Here, the uplink control information may include channel state information (CSI) for indicating a state of a downlink channel. Further, the uplink control information may include a scheduling request (SR) for requesting UL-SCH resources. Further, the uplink control information may also include HARQ-ACK (Hybrid Automatic Repeat reQuest ACKnowledgement). HARQ-ACK may indicate HARQ-ACK for downlink data (Transport block, Medium Access Control Protocol Data Unit (MAC PDU), Downlink-Shared Channel (DL-SCH)).

The PDSCH is used to transmit downlink data (Downlink Shared CHannel (DL-SCH)) from a Medium Access Control (MAC) layer. Furthermore, in a case of the downlink, the PDSCH is also used to transmit System Information (SI), a Random Access Response (RAR), and the like.

The PUSCH may be used to transmit uplink data (Uplink-Shared CHannel (UL-SCH)) from the MAC layer or a HARQ-ACK and/or CSI along with the uplink data. Furthermore, the PSUCH may be used to transmit the CSI only or the HARQ-ACK and CSI only. In other words, the PSUCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive radio resource control (RRC) signaling (also referred to as RRC message or RRC information) in the RRC layer, respectively. In addition, the base station apparatus 3 and the terminal apparatus 1 may transmit and/or receive a MAC control element in a Medium Access Control (MAC) layer. Further, the RRC layer of the terminal apparatus 1 acquires the system information reported from the base station apparatus 3. Here, the RRC signaling, the system information, and/or the MAC control element is also referred to as higher layer signaling or a higher layer parameter. The higher layer herein means a higher layer viewed from a physical layer, and thus, may include one or more layers such as a MAC layer, an RRC layer, an RLC layer, a PDCP layer, and a Non Access Stratum (NAS) layer. For example, the higher layer in a process of the MAC layer may include one or more layers such as an RRC layer, an RLC layer, a PDCP layer, and a NAS layer. Hereinafter, "A is given in the higher layer" and "A is given by the higher layer" may mean that the higher layer (mainly, RRC layer, MAC layer, etc.) of the terminal apparatus 1 receives A from the base station apparatus 3, and the received A is given from the higher layer of the terminal apparatus 1 to the physical layer of the terminal apparatus 1.

The PDSCH or PUSCH may be used to transmit the RRC signaling and the MAC control element. Here, in the PDSCH, the RRC signaling transmitted from the base station apparatus 3 may be signaling common to multiple terminal apparatuses 1 within a cell. In addition, the RRC signaling transmitted from the base station apparatus 3 may be signaling dedicated to a certain terminal apparatus 1 (also referred to as dedicated signaling). In other words, information specific to the terminal apparatus (UE-specific information) may be transmitted to a certain terminal apparatus 1 by using dedicated signaling. In addition, the PUSCH may be used to transmit UE capability in the uplink.

In FIG. 1, the following downlink physical signals are used for downlink wireless communication. Here, the downlink physical signals are not used to transmit information output from the higher layers but are used by the physical layer.

Synchronization signal (SS)
Reference Signal (RS)

The synchronization signal may include a Primary Synchronization Signal (PSS) and a Secondary Synchronization Signal (SSS). A cell ID can be detected by using the PSS and SSS.

The synchronization signal is used for the terminal apparatus 1 to establish synchronization in a frequency domain and a time domain in the downlink. Here, the synchronization signal may be used by the terminal apparatus 1 for precoding or selecting a beam in a precoding or beamforming process performed by the base station apparatus 3. Furthermore, the beam may be referred to as transmission or reception filtering configuration, or spatial domain transmission filtering or spatial domain reception filtering.

A reference signal is used for the terminal apparatus 1 to perform propagation path compensation on a physical channel. Here, the reference signal is used for the terminal apparatus 1 to calculate downlink CSI. In addition, the reference signal may be used for a numerology such as a radio parameter or subcarrier spacing, or used for fine synchronization to achieve FFT window synchronization.

In the present embodiment, any one or more of the following downlink reference signals are used.

DMRS (Demodulation Reference Signal)
CSI-RS (Channel State information Reference Signal)
PTRS (Phase Tracking Reference Signal)
TRS (Tracking Reference Signal)

The DMRS is used to demodulate a modulated signal. Besides, two types of reference signals, i.e., a reference signal for demodulating the PBCH and a reference signal for demodulating the PDSCH, may be defined as the DMRS, or both reference signals may be referred to as the DMRS. The CSI-RS is used for measurement of Channel State Information (CSI) and beam management, and a periodic, semi-persistent, or aperiodic CSI reference signal transmission method is adopted. For the CSI-RS, a Non-Zero Power (NZP) CSI-RS and a Zero Power (ZP) CSI-RS for which the transmission power (or reception power) is zero may be defined. Here, the ZP CSI-RS may be defined as a CSI-RS resource in which the transmit power is zero or which is not transmitted. The PTRS is used to track the phase in the time axis to ensure frequency offset due to phase noise. The TRS is used to ensure Doppler shift during fast travel. In addition, the TRS may be used as one configuration for the CSI-RS. For example, a radio resource may be configured with one port CSI-RS being a TRS.

In the present embodiment, any one or more of the following uplink reference signals are used.

DMRS (Demodulation Reference Signal)
PTRS (Phase Tracking Reference Signal)
SRS (Sounding Reference Signal)

The DMRS is used to demodulate a modulated signal. Besides, two types of reference signals, i.e., a reference signal for demodulating the PUCCH and a reference signal for demodulating the PUSCH, may be defined as the DMRS, or both reference signals may be referred to as the DMRS. The SRS is used for measurement of uplink Channel State Information (CSI), channel sounding, and beam management. The PTRS is used to track the phase in the time axis to ensure frequency offset due to phase noise.

The downlink physical channels and/or the downlink physical signals are collectively referred to as a downlink signal. The uplink physical channel and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

BCH, UL-SCH and DL-SCH are transport channels. A channel used in a Medium Access Control (MAC) layer is referred to as a transport channel. In addition, the unit of a transport channel used in the MAC layer is referred to as a transport block (TB) or a MAC PDU (Protocol Data Unit). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Figure 2:
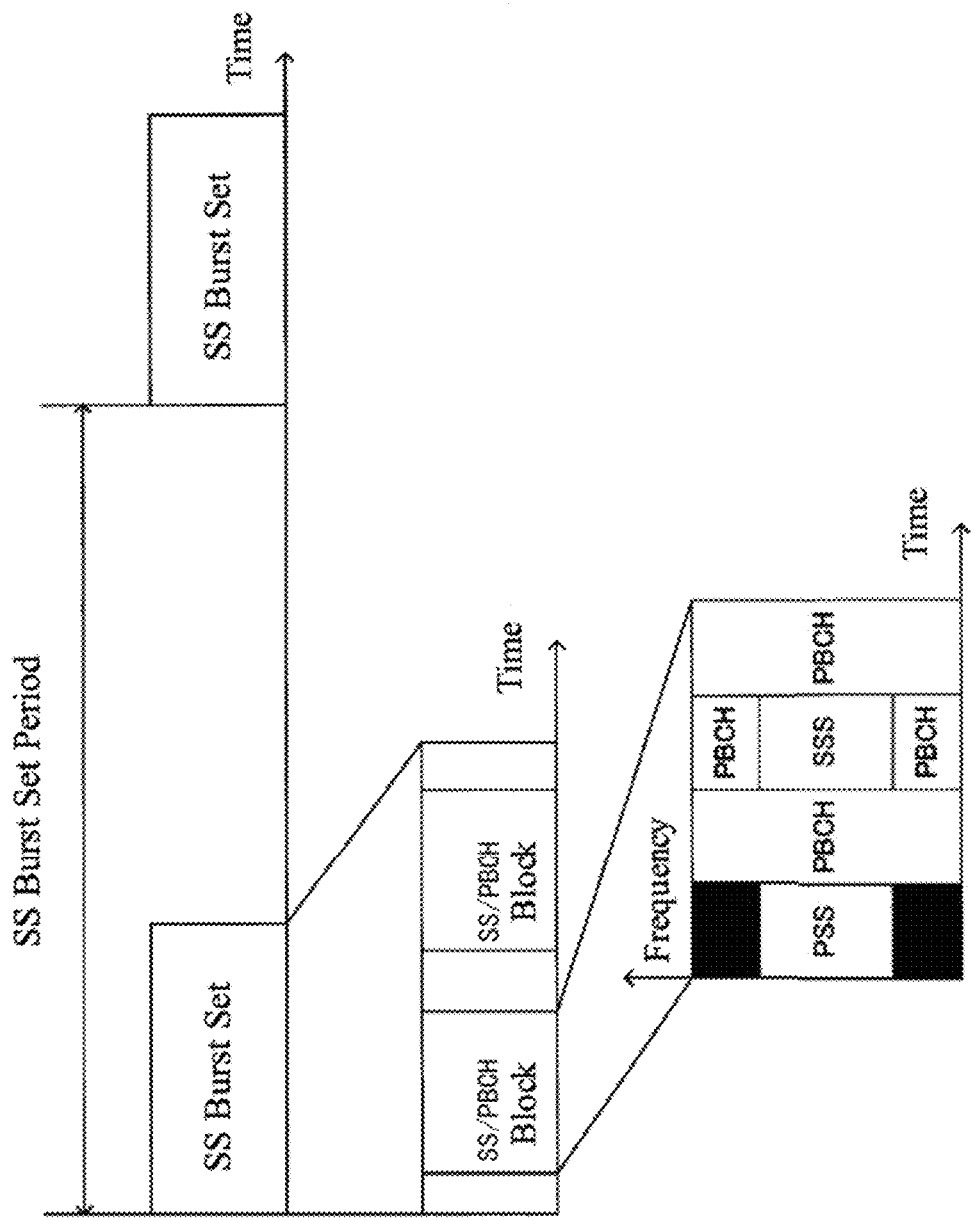
FIG. 2 is a diagram illustrating an example of an SS/PBCH block and an SS burst set according to an embodiment of the present invention.

FIG. 2 is a diagram illustrating an example of an SS/PBCH block (also referred to as a synchronization signal block, an SS block or an SSB) and an SS burst set (also referred to as a synchronization signal burst set) according to the present embodiment. FIG. 2 illustrates an example in which two SS/PBCH blocks are included in a periodically transmitted SS burst set, and each SS/PBCH block includes four consecutive OFDM symbols.

The SS/PBCH block is a unit block including at least a synchronization signal (PSS, SSS) and/or a PBCH. The signal/channel contained in a transmitted SS/PBCH block is expressed as a transmitted SS/PBCH block. When the base station apparatus 3 transmits the synchronization signal and/or the PBCH by using one or more SS/PBCH blocks in the SS burst set, an independent downlink transmission beam may be used for each SS/PBCH block.

In FIG. 2, the PSS, the SSS and the PBCH are time/frequency division multiplexed in one SS/PBCH block. The order in which the PSS, the SSS and/or the PBCH are multiplexed in the time domain may be different from that in the example illustrated in FIG. 2.

The SS burst set may be transmitted periodically. For example, a period used for initial access and a period configured for a connected (Connected or RRC Connected) terminal apparatus may be defined. In addition, the period configured for the connected (Connected or RRC Connected) terminal apparatus may be configured in the RRC layer. Also, the period configured for the connected (Connected or RRC Connected) terminal may be a period of a radio resource in the time domain during which transmission is potentially to be performed, and actually, whether the transmission is to be performed during the period may be determined by the base station apparatus 3. Furthermore, the period used for the initial access may be predefined in specifications or the like.

The SS burst set may be determined based on a System Frame Number (SFN). Moreover, a starting position of the SS burst set (boundary) may be determined based on the SFN and the period.

The SS/PBCH block is assigned an SSB index (also referred to as an SS/PBCH block index) according to a temporal position in the SS burst set. The terminal apparatus 1 calculates an SSB index based on information of the PBCH and/or information of the reference signal included in the detected SS/PBCH block.

SS/PBCH blocks at the same relative time in each SS burst set of multiple SS burst sets are assigned the same SS block index. It may be assumed that the SS/PBCH blocks at the same relative time in each SS burst set of multiple SS burst sets are in QCL (or the same downlink transmission beam is applied). In addition, it may be assumed that antenna ports for the SS/PBCH blocks at the same relative time in each SS burst set of multiple SS burst sets are in QCL with respect to an average delay, a Doppler shift, and a spatial correlation.

It may be assumed that the SS/PBCH blocks that are assigned the same SSB index in a certain SS burst set period are in QCL with respect to an average delay, an average gain, a Doppler spread, a Doppler shift, and a spatial correlation. A configuration corresponding to one or more SS/PBCH blocks (or reference signals) that are in QCL may be referred to as a QCL configuration.

The number of SS/PBCH blocks (also referred to as the number of SS blocks or the number of SSBs) may be defined as, for example, the number of SS/PBCH blocks within an SS burst or an SS burst set or in an SS/PBCH block period. Further, the number of SS/PBCH blocks may indicate the number of beam groups for cell selection within an SS burst or an SS burst set or in an SS/PBCH block period. Here, the beam groups may be defined as the number of different SS/PBCH blocks or the number of different beams included within an SS burst or an SS burst set or in an SS/PBCH block period.

Hereinafter, the reference signal described in the present embodiment includes a downlink reference signal, a synchronization signal, an SS/PBCH block, a downlink DM-RS, a CSI-RS, an uplink reference signal, an SRS, and/or an uplink DM-RS. For example, the downlink reference signal, the synchronization signal, and/or the SS/PBCH block may be referred to as the reference signal. The reference signal used in the downlink includes a downlink reference signal, a synchronization signal, an SS/PBCH block, a downlink DM-RS, a CSI-RS, and/or the like. The reference signal used in the uplink includes an uplink reference signal, an SRS, an uplink DM-RS, and/or the like.

In addition, the reference signal may also be used for Radio Resource Measurement (RRM). In addition, the reference signal may also be used for beam management.

The beam management may be a procedure of the base station apparatus 3 and/or the terminal apparatus 1 for matching directivity of an analog and/or digital beam in a transmission apparatus (e.g., the base station apparatus 3 in the downlink and the terminal apparatus 1 in the uplink) with directivity of an analog and/or digital beam in a reception apparatus (e.g., the terminal apparatus 1 in the downlink and the base station apparatus 3 in the uplink) to acquire a beam gain.

In addition, a procedure for configuring, setting or establishing a beam pair link may include the following procedures.

Beam selection
Beam refinement
Beam recovery

For example, the beam selection may be a procedure for selecting a beam in communication between the base station apparatus 3 and the terminal apparatus 1. In addition, the beam refinement may be a procedure for selecting a beam having a higher gain or changing a beam to an optimum beam between the base station apparatus 3 and the terminal apparatus 1 through the movement of the terminal apparatus 1. The beam recovery may be a procedure for re-selecting the beam in a case that the quality of a communication link is degraded due to blockage caused by a blocking object, a passing pedestrian, or the like in communication between the base station apparatus 3 and the terminal apparatus 1.

The beam management may include the beam selection and the beam refinement. The beam recovery may include the following procedures.

Detection of beam failure
Discovery of new beam
Transmission of beam recovery request
Monitoring of response to beam recovery request For example, when the transmission beam of the base station apparatus 3 is selected in the terminal apparatus 1, Reference Signal Received Power (RSRP) of an SSS included in an SS/PBCH block or a CSI-RS may be used, or the CSI may be used. In addition, a CSI-RS resource index (CRI) may be used as a report to the base station apparatus 3, or an index indicated by a sequence of a demodulation reference signal (DMRS) used for demodulating the PBCH and/or a PBCH included in an SS/PBCH block may be used.

Besides, the base station apparatus 3 indicates a CRI or a time index of the SS/PBCH when indicating a beam to the terminal apparatus 1, and the terminal apparatus 1 performs reception based on the indicated CRI or time index of the SS/PBCH. At this time, the terminal apparatus 1 may configure a spatial filter based on the indicated CRI or time index of the SS/PBCH to perform reception. In addition, the terminal apparatus 1 may perform reception by using a Quasi-Co-Location (QCL) assumption. A certain signal (such as antenna port, synchronization signal, reference signal) being in QCL with or QCL-assumed with another signal (such as antenna port, synchronization signal, reference signal) can be interpreted as that the certain signal is associated with another signal.

If a long term property of a channel over which a symbol on an antenna port is conveyed can be inferred from a channel over which a symbol on the other antenna port is conveyed, those two antenna ports are said to be in QCL. The long term property of the channel includes one or more of a delay spread, a Doppler spread, a Doppler shift, an average gain, and an average delay. For example, in a case that an antenna port 1 and an antenna port 2 are in QCL with respect to an average delay, this means that a reception timing of the antenna port 2 may be inferred from a reception timing of the antenna port 1.

The QCL may be expanded to beam management. Therefore, a spatially expanded QCL may be newly defined. For example, the long term property of a channel in spatial domain QCL assumption may be an Angle of Arrival (AoA), a Zenith angle of Arrival (ZoA), or the like, and/or an angle spread (e.g., an Angle Spread of Arrival (ASA) or a Zenith angle Spread of Arrival (ZSA)), a transmission angle (AoD, ZoD, or the like), an angle spread of the transmission angle (e.g., an Angle Spread of Departure (ASD) or a Zenith angle Spread of Departure (ZSD)), a spatial correlation, or a reception spatial parameter, in a radio link or channel.

For example, in a case that the antenna port 1 and the antenna port 2 are considered to be in QCL with respect to a reception spatial parameter, this means that a reception beam for receiving signals from the antenna port 2 may be inferred from a reception beam (a reception spatial filter) for receiving signals from the antenna port 1.

A combination of long term properties which may be considered to be in QCL may be defined as a QCL type. For example, the following types may be defined.

Type A: Doppler shift, Doppler spread, average delay, delay spread
Type B: Doppler shift, Doppler spread
Type C: average delay, Doppler shift
Type D: reception spatial parameter The QCL types described above may configure and/or indicate a transmission configuration indication (TCI) as a QCL assumption between one or two reference signals and the PDCCH or PDSCH DMRS in the RRC and/or MAC layer and/or the DCI. For example, when an index #2 of the PBCH/SS block and the QCL type A+QCL type B are configured and/or indicated as one state of the TCI in a case that the terminal apparatus 1 receives the PDCCH, the terminal apparatus 1 in receiving the PDCCH DMRS may consider the Doppler shift, the Doppler spread, the average delay, the delay spread, and the reception space parameters in the reception of the PBCH/SS block index #2 as the long term properties of the channel to receive the PDCCH DMRS, and may perform synchronization or propagation path estimation. At this time, a reference signal indicated by the TCI may be referred to as a source reference signal (e.g., the PBCH/SS block in the example described above), and a reference signal affected by the long term properties inferred from the long term properties of the channel acquired at the time of receiving the source reference signal may be referred to as a target reference signal (e.g., the PDCCH DMRS in the example described above). In addition, the TCI may be configured with a combination of a source reference signal and a QCL type for one or more TCI states and each state by the RRC and indicated to the terminal apparatus 1 by the MAC layer or the DCI.

According to this method, as the beam management and beam indication/report, the operations of the base station apparatus 3 and terminal apparatus 1 equivalent to the beam management may be defined by the spatial domain QCL assumption and the radio resource (time and/or frequency).

The subframe will be described below. In the present embodiment, the subframe may also be referred to as a resource unit, a radio frame, a time period, or a time interval.

Figure 3:
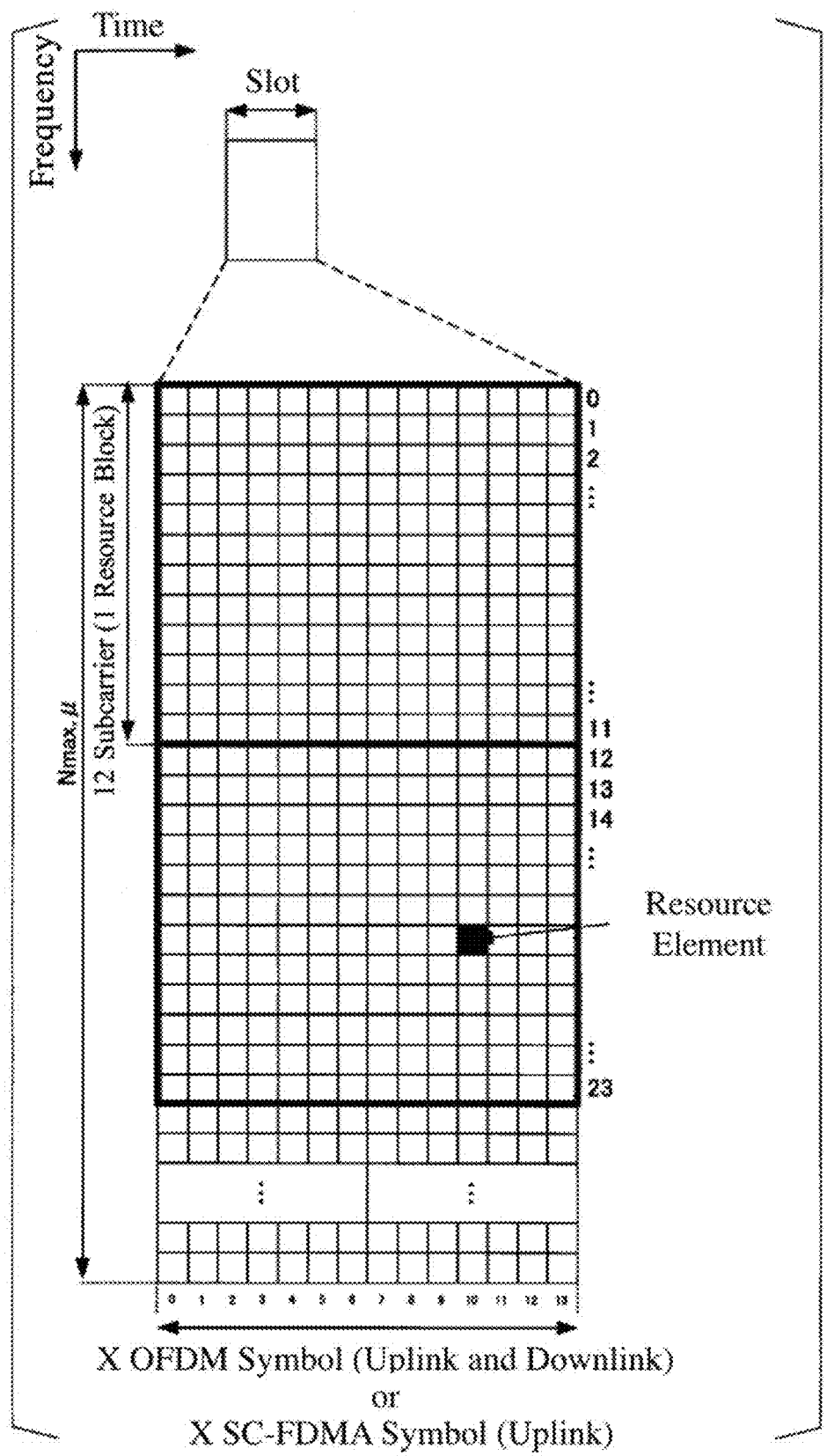
FIG. 3 is a diagram illustrating an example of a schematic configuration of an uplink slot and a downlink slot according to an embodiment of the present invention.

FIG. 3 is a diagram illustrating an example of a schematic configuration of an uplink slot and a downlink slot according to a first embodiment of the present invention. Each of the radio frames is 10 ms in length. In addition, each of the radio frames includes 10 subframes and W slots. Further, one slot includes X OFDM symbols. In other words, the length of one subframe is 1 ms. The time length of each slot is defined by the subcarrier spacing. For example, in the case where the subcarrier spacing for OFDM symbols is 15 kHz and in the case of a normal cyclic prefix (NCP), X=7 and X=14 correspond to 0.5 ms and 1 ms, respectively. In addition, in a case that the subcarrier spacing is 60 kHz, X=7 and X=14 correspond to 0.125 ms and 0.25 ms, respectively. Further, for example, in the case of X=14, W=10 when the subcarrier spacing is 15 kHz, and W=40 when the subcarrier spacing is 60 kHz. FIG. 3 illustrates the case of X=7 as an example. In addition, a case of X=14 can be similarly configured by expanding the case of X=7. Further, the uplink slot is defined similarly, and the downlink slot and the uplink slot may be defined separately. Furthermore, the bandwidth of the cell of FIG. 3 may also be defined as a BandWidth Part (BWP). Moreover, the slot may be defined as a Transmission Time Interval (TTI). The slot may not be defined as a TTI. The TTI may be a transmission period of the transport block.

The signal or the physical channel transmitted in each of the slots may be represented by a resource grid. The resource grid is defined by multiple subcarriers and multiple OFDM symbols for each numerology (e.g., subcarrier spacing and cyclic prefix length) and for each carrier. The number of subcarriers constituting one slot depends on the bandwidth of the downlink and uplink of a cell, respectively. Each element within the resource grid is referred to as a resource element. The resource element may be identified by using a subcarrier number and an OFDM symbol number.

The resource grid is used to represent mapping of a certain physical downlink channel (such as the PDSCH) or a certain physical uplink channel (such as the PUSCH) to resource elements. For example, in the case where the subcarrier spacing is 15 kHz and the number X of OFDM symbols included in a subframe is 14, and in the case of NCP, one physical resource block is defined by 14 consecutive OFDM symbols in the time domain and by 12*Nmax consecutive subcarriers in the frequency domain. Nmax represents the maximum number of resource blocks determined by a subcarrier spacing configuration μ described below. In other words, the resource grid includes (14*12*Nmax, μ) resource elements. In a case of Extended CPs (ECPs), since it is supported only in the 60 kHz subcarrier spacing, one physical resource block is defined by, for example, 12 (the number of OFDM symbols included in one slot)*4 (the number of slot included in one subframe)=48 consecutive OFDM symbols in the time domain and by 12*Nmax, μ consecutive subcarriers in the frequency domain. In other words, the resource grid includes (48*12*Nmax, μ) resource elements.

A reference resource block, a common resource block, a physical resource block, and a virtual resource block are defined as the resource block. One resource block is defined as 12 subcarriers consecutive in the frequency domain. Alternatively, the reference resource block is common in all subcarriers; for example, resource blocks are configured with 15 kHz subcarrier spacing and numbered in an ascending order. A subcarrier index 0 at a reference resource block index 0 may be referred to as a reference point A (which may simply be referred to as a "reference point"). The common resource block is a resource block numbered from 0 in an ascending order in each subcarrier spacing configuration μ from the reference point A. The resource grid described above is defined by the common resource block. The physical resource block is a resource block included in a Bandwidth Part (BWP) described below and numbered from 0 in an ascending order, and the physical resource block is a resource block included in a BWP and numbered from 0 in an ascending order. A certain physical uplink channel is first mapped to a virtual resource block. Thereafter, the virtual resource block is mapped to a physical resource block. Hereinafter, a resource block may be a virtual resource block, a physical resource block, a common resource block, or a reference resource block.

Next, the subcarrier spacing configuration μ will be described. In NR, one or more OFDM numerologies are supported as described above. In a certain BWP, the subcarrier spacing configuration μ (μ=0, 1, . . . , 5) and the cyclic prefix length are given by a higher layer for a downlink BWP and by a higher layer for an uplink BWP. Here, when μ is given, a subcarrier spacing Δf is given by Δf=2^μ·15 (kHz).

In the subcarrier spacing configuration the slots are counted in an ascending order from 0 to N^{subframe, μ}_{slot}−1 within a subframe, and counted in an ascending order from 0 to N^{frame, μ}_{slot}−1 within a frame. N^{slot}_{symb} consecutive OFDM symbols are in the slots based on the slot configuration and cyclic prefix. N^{slot}_{symb} is 14. The start of the slot n^{μ}_{s} in the subframe is aligned in time with the start of the (n^{μ}_{s} N^{slot}_{symb})-th OFDM symbol in the same subframe.

Figure 4:
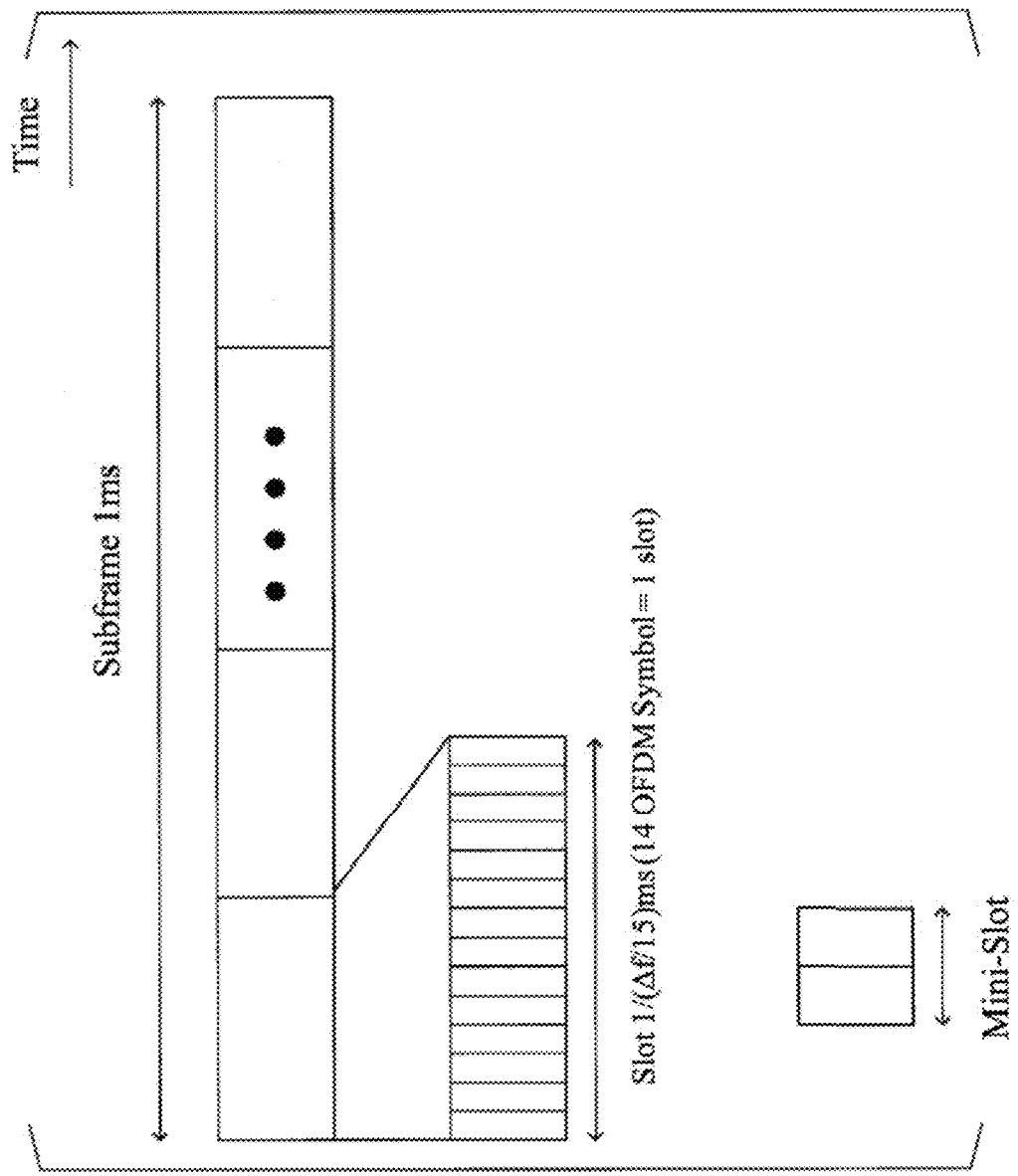
FIG. 4 is a diagram illustrating a relationship among a subframe, a slot, and a mini-slot in the time domain according to an embodiment of the present invention.

Next, the subframe, the slot, and a mini-slot will be described below. FIG. 4 is a diagram illustrating a relationship among a subframe, a slot, and a mini-slot in the time domain. As illustrated in FIG. 4, three types of time units are defined. The subframe is 1 ms regardless of the subcarrier spacing, the number of OFDM symbols included in a slot is 7 or 14, and the slot length varies according to the subcarrier spacing. Here, in a case that the subcarrier spacing is 15 kHz, 14 OFDM symbols are included in one subframe. The downlink slot may be referred to as a PDSCH mapping type A. The uplink slot may be referred to as a PUSCH mapping type A.

The mini-slot (which may be referred to as a sub-slot) is a time unit including fewer OFDM symbols than OFDM symbols included in the slot. FIG. 4 illustrates a case in which the mini-slot includes two OFDM symbols as an example. The OFDM symbols in the mini-slot may match the timing for the OFDM symbols constituting the slot. Besides, the smallest unit for scheduling may be a slot or a mini-slot. In addition, assigning a mini-slot may be referred to as non-slot based scheduling. In addition, scheduling a mini-slot may be expressed as scheduling a resource in which the relative time position of the starting position of the reference signal and the data are fixed. The downlink mini-slot may be referred to as a PDSCH mapping type B. The uplink mini-slot may be referred to as a PUSCH mapping type B.

Figure 5:
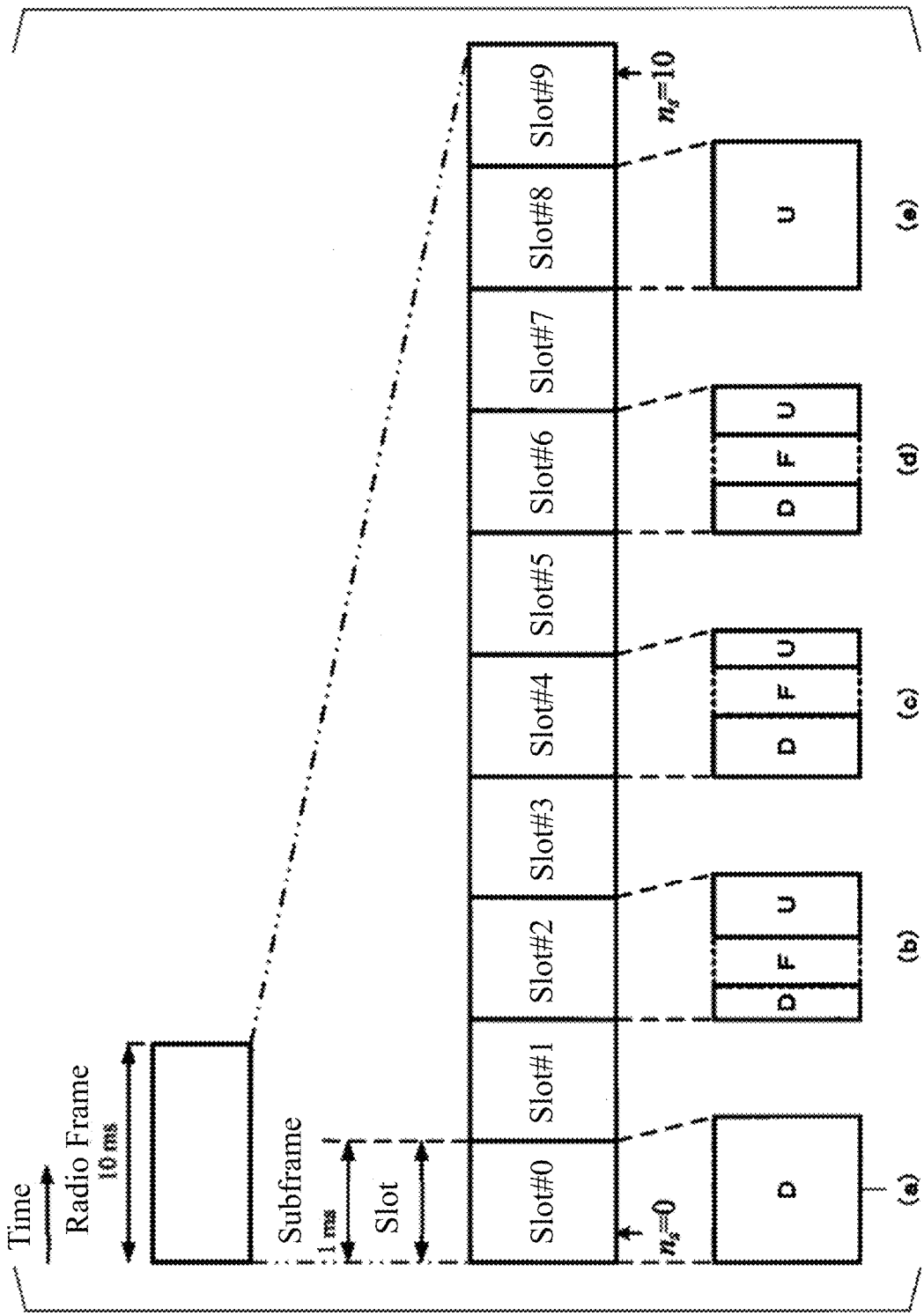
FIG. 5 is a diagram illustrating an example of a slot or a subframe according to an embodiment of the present invention.

FIG. 5 is a diagram illustrating an example of a slot format. Here, a case that the slot length is 1 ms while the subcarrier spacing is 15 kHz is illustrated as an example. In FIG. 5, D represents the downlink, and U represents the uplink. As illustrated in FIG. 5, during a certain time period (for example, the minimum time period to be allocated to one UE in the system), the subframe may include one or more of the followings:

Downlink symbol
Flexible symbol
Uplink symbol.

Besides, the ratio of these symbols may be predetermined as a slot format. In addition, the ratio of these symbols may also be defined by the number of downlink OFDM symbols included in the slot, or defined by the starting position and ending position within the slot. Further, the ratio of these symbols may also be defined by the number of uplink OFDM symbols or DFT-S-OFDM symbols included in the slot, or defined by the starting position and ending position within the slot. Furthermore, scheduling slot may be expressed as scheduling a resource in which the relative time positions of the reference signal and a slot boundary are fixed.

The terminal apparatus 1 may receive a downlink signal or a downlink channel through a downlink symbol or a flexible symbol. The terminal apparatus 1 may transmit an uplink signal or a downlink channel through an uplink symbol or a flexible symbol.

Item (a) of FIG. 5 is an example in which in a certain time period (which may be referred to as, for example, a minimum unit of time resource that can be allocated to one UE, a time unit, etc; and a plurality of minimum units of time resource may be bundled and referred to as a time unit) is entirely used for downlink transmission. Item (b) of FIG. 5 illustrates an example in which an uplink is scheduled, for example, via a PDCCH on the first time resource, and an uplink signal is transmitted via a flexible symbol that includes a processing delay of the PDCCH, a time for switching from a downlink to an uplink, and generation of a transmit signal. Item (c) of FIG. 5 illustrates an example in which the first time resource is used to transmit a PDCCH and/or a downlink PDSCH, and then a PUSCH or PUCCH is transmitted over a gap for a processing delay, a time for switching from a downlink to an uplink, and generation of a transmit signal. Here, for example, the uplink signal may be used to transmit the HARQ-ACK and/or CSI, i.e., UCI. Item (d) of FIG. 5 illustrates an example in which the first time resource is used to transmit a PDCCH and/or a PDSCH, and then an uplink PUSCH and/or PUCCH is transmitted over a gap for a processing delay, a time for switching from a downlink to an uplink, and generation of a transmit signal. Here, for example, the uplink signal may be used to transmit the uplink data, i.e., the UL-SCH. Item (e) of FIG. 5 illustrates an example in which the entire slot is used for uplink transmission (PUSCH or PUCCH).

The downlink part and uplink part described above may include a plurality of OFDM symbols, which is similar to the case with LTE.

Figure 6:
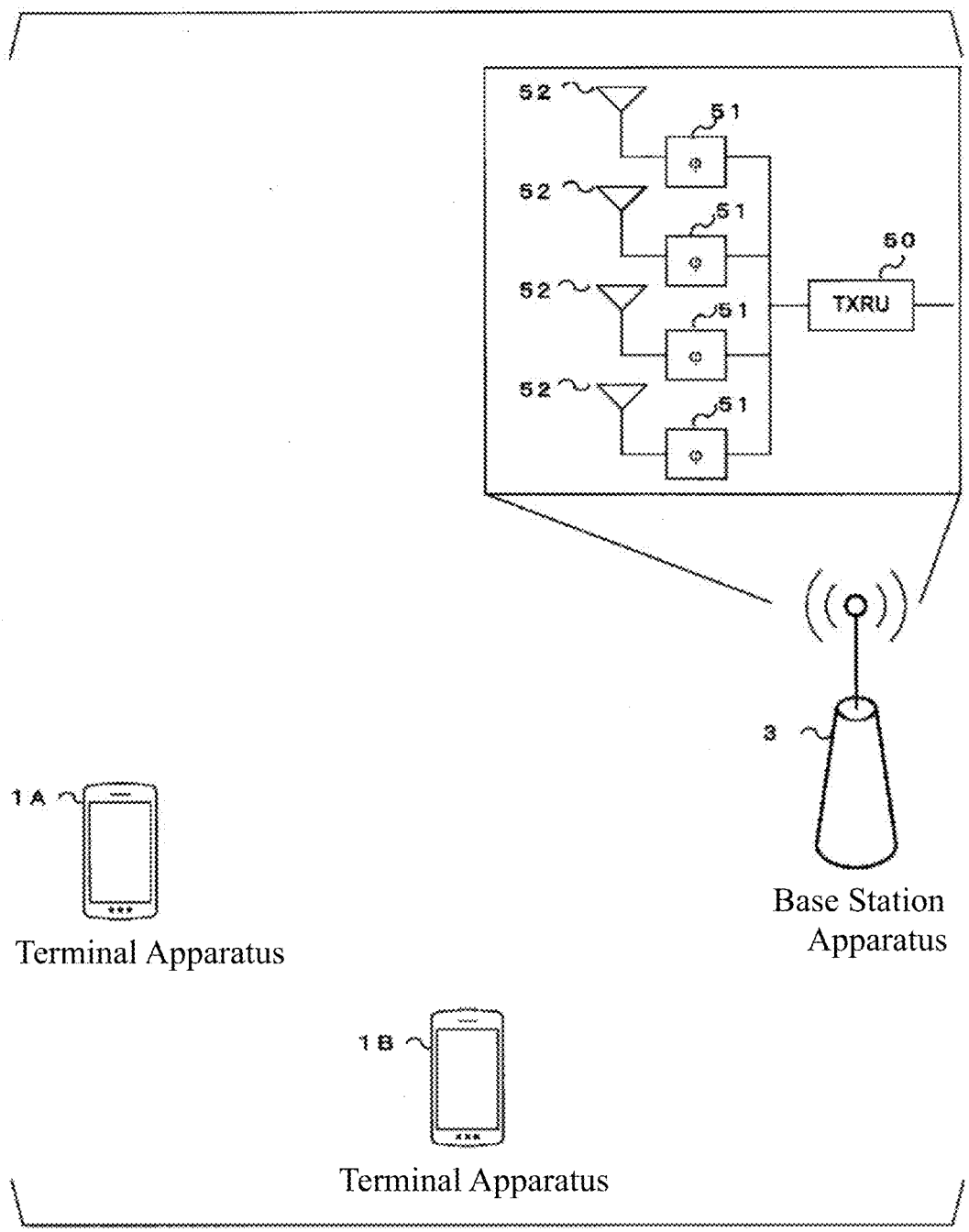
FIG. 6 is a diagram illustrating an example of beamforming according to an embodiment of the present invention.

FIG. 6 is a diagram illustrating an example of beamforming. A plurality of antenna elements are connected to one transceiver unit (TXRU) 50, the phase is controlled by a phase shifter 51 for each antenna element, and a transmission is performed by an antenna element 52, thus allowing a beam to be directed in any direction relative to a transmission signal. Typically, the TXRU may be defined as an antenna port, and only the antenna port may be defined in the terminal apparatus 1. Since the directivity can be directed in any direction by controlling the phase shifter 51, the base station apparatus 3 can communicate with the terminal apparatus 1 by using a high gain beam.

Hereinafter, a BandWidth Part (BWP) will be described. The BWP is also referred to as a carrier BWP. The BWP may be configured for the downlink and the uplink, respectively. The BWP is defined as a set of consecutive physical resources selected from continuous subsets of common resource blocks. The terminal apparatus 1 may be configured with up to four BWPs in which one downlink carrier BWP (DL BWP) is activated at a certain time. The terminal apparatus 1 may be configured with up to four BWPs in which one uplink carrier BWP (UL BWP) is activated at a certain time. In the case of carrier aggregation, the BWP may be configured in each serving cell. At this time, one BWP being configured in a certain serving cell may be expressed as that no BWP is configured. Further, two or more BWPs being configured may be expressed as that the BWP is configured.

<MAC Entity Operation>

In an activated serving cell, there is always one active (activated) BWP. BWP switching for a certain serving cell is used to activate an inactive (deactivated) BWP and deactivate an active (activated) BWP. BWP switching for a certain serving cell is controlled by a PDCCH indicating a downlink assignment or an uplink grant. BWP switching for a certain serving cell may be further controlled by the BWP inactivity timer or RRC signaling, or by the MAC entity itself at the start of a random access procedure. In the addition of the SpCell (PCell or PSCell) or the activation of the SCell, one BWP is first active without receiving a PDCCH indicating a downlink assignment or an uplink grant. The first active DL BWP and the first active UL BWP may be specified by an RRC message transmitted from the base station apparatus 3 to the terminal apparatus 1. The active BWP for a certain serving cell is specified by the RRC or PDCCH transmitted from the base station apparatus 3 to the terminal apparatus 1. In addition, the first active DL BWP and the first active UL BWP may be included in a Message 4. In an unpaired spectrum (e.g., TDD band, etc.), a DL BWP and a UL BWP are paired, and the BWP switching is common to the UL and the DL. In the active BWP for each of the activated serving cells in which the BWP is configured, the MAC entity of the terminal apparatus 1 applies normal processing. The normal processing includes transmitting the UL-SCH, transmitting the RACH, monitoring the PDCCH, transmitting the PUCCH, transmitting the SRS, and receiving the DL-SCH. In the inactive BWP for each of the activated serving cells in which the BWP is configured, the MAC entity of the terminal apparatus 1 does not transmit the UL-SCH, does not transmit the RACH, does not monitor the PDCCH, does not transmit the PUCCH, does not transmit the SRS, or does not receive the DL-SCH. In a case that a certain serving cell is deactivated, the active BWP may not be present (e.g., the active BWP is deactivated).

<RRC Operation>

A BWP information element (IE) included in the RRC message (broadcast system information or information sent in a dedicated RRC message) is used to configure the BWP. The RRC message transmitted from the base station apparatus 3 is received by the terminal apparatus 1. For each serving cell, a network (e.g., the base station apparatus 3) configures, for the terminal apparatus 1, at least an initial BWP including at least a downlink BWP and one uplink BWP (assumed in a case that the serving cell is configured with an uplink) or two uplink BWPs (in a case that a supplementary uplink is used). Furthermore, the network may configure additional uplink BWP or downlink BWP for a certain serving cell. The BWP configuration is divided into an uplink parameter and a downlink parameter. In addition, the BWP configuration is also divided into a common parameter and a dedicated parameter. The common parameter (e.g., a BWP uplink common IE, a BWP downlink common IE, etc.) is cell specific. The common parameter for the initial BWP of a primary cell is also provided in system information. For all other serving cells, the network provides the common parameters with dedicated signals. The BWP is identified by a BWP ID. The BWP ID of the initial BWP is 0. The BWP ID of other BWPs takes a value from 1 to 4.

When the higher layer parameter initialDownlinkBWP is not configured (provided) for the terminal apparatus 1, the initial DL BWP (initial active DL BWP) may be defined by the position and number of consecutive PRBs, the subcarrier spacing, and the cyclic prefix for PDCCH reception in a control resource set (CORESET) for the type 0 PDCCH common search space. The position of the consecutive PRBs begins at a PRB with the lowest index and ends at a PRB with the highest index between the PRBs of the control resource set for the type 0 PDCCH common search space. When the higher layer parameter initialDownlinkBWP is configured (provided) for the terminal apparatus 1, the initial DL BWP may be indicated by the higher layer parameter initialDownlinkBWP. The higher layer parameter initialDownlinkBWP may be included in SIB1 (systemInformationBlockType1, ServingCellConfigCommonSIB) or ServingCellCongfigCommon. The information element ServingCellCongfigCommonSIB is used to configure cell-specific parameters of the serving cell for the terminal apparatus 1 in the SIB1.

That is, when the higher layer parameter initialDownlinkBWP is not configured (provided) for the terminal apparatus 1, the size of the initial DL BWP may be the number of resource blocks of the control resource set (CORESET #0) for the type 0 PDCCH common search space. When the higher layer parameter initialDownlinkBWP is configured (provided) for the terminal apparatus 1, the size of the initial DL BWP may be given by locationAndBandwidth included in the higher layer parameter initialDownlinkBWP. The higher layer parameter locationAndBandwidth may indicate the position and bandwidth of the frequency domain of the initial DL BWP.

As described above, a plurality of DL BWPs may be configured for the terminal apparatus 1. In addition, according to the higher layer parameter defaultDownlinkBWP-Id, a default DL BWP can be configured in the DL BWP configured for the terminal apparatus 1. When the higher layer parameter defaultDownlinkBWP-Id is not provided for the terminal apparatus 1, the default DL BWP is the initial DL BWP.

The initial UL BWP may also be provided to the terminal apparatus 1 by SIB1 (systemInformationBlockType1) or initialUplinkBWP. The information element initialUplinkBWP is used to configure the initial UL BWP. For operations in the SpCell or the secondary cell, the initial UL BWP (initial active UL BWP) may be configured (provided) for the terminal apparatus 1 by the higher layer parameter initialUplinkBWP. When a supplementary uplink carrier is configured for the terminal apparatus 1, the initial UL BWP of the supplementary uplink carrier may be configured for the terminal apparatus 1 by initialUplinkBWP included in the higher layer parameter supplementaryUplink.

Hereinafter, a control resource set (CORESET) of the present embodiment will be described.

A control resource set (CORESET) is a time and frequency resource for searching for downlink control information. The CORESET configuration information includes information for identifying a CORESET identifier (ControlResourceId, CORESET-ID) and a CORESET frequency resource. The information element ControlResourceSetId (CORESET identifier) is used to identify a control resource set in a certain serving cell. The CORESET identifier is used between BWPs in a certain serving cell. The CORESET identifier is unique among BWPs in the serving cell. The number of CORESETs in each BWP is limited to 3, including an initial CORESET. In a certain serving cell, the value of the CORESET identifier takes a value from 0 to 11.

The control resource set identified by the CORESET identifier 0 (ControlResourceSetId 0) is referred to as the CORESET #0. The CORESET #0 may also be configured by pdcch-ConfigSIB1 included in the MIB or PDCCH-Config-Common included in the ServingCellCongfigCommon. That is, the CORESET #0 configuration information may be pdcch-ConfigSIB1 included in the MIB or PDCCH-Config-Common included in the ServingCellCongfigCommon. The CORESET #0 configuration information may be configured by controlResourceSetZero included in the PDCCH-ConfigCommon or the PDCCH-ConfigSIB1. In other words, the information element controlResourceSetZero is used to indicate the CORESET #0 (common CORESET) of the initial DL BWP. The CORESET indicated by the pdcch-ConfigSIB1 is the CORESET #0. The information element pdcch-ConfigSIB1 within the MIB or dedicated configuration is used to configure the initial DL BWP. The CORESET configuration information pdcch-ConfigSIB1 of the CORESET #0 does not include information that explicitly identify the CORESET identifier and the CORESET frequency resources (e.g., the number of consecutive resource blocks) and time resources (e.g., the number of consecutive symbols), but the CORESET frequency resources (e.g., the number of consecutive resource blocks) and time resources (e.g., the number of consecutive symbols) for the CORESET #0 can be implicitly identified by the information included in the pdcch-ConfigSIB1. The information element PDCCH-ConfigCommon is used to configure the cell-specific PDCCH parameter provided by the SIB. The PDCCH-ConfigCommon may also be provided at the time of handover and the addition of the PSCell and/or the SCell. The CORESET #0 configuration information is included in an initial BWP configuration. That is, CORESET #0 configuration information may not be included in a BWP configuration other than the initial BWP configuration. The controlResourceSetZero corresponds to 4 bits in the pdcch-ConfigSIB1 (e.g., 4 MSB bits or 4 most significant bits). The CORESET #0 is a control resource set for the type 0 PDCCH common search space.

The additional common CORESET configuration information may also be configured by commonControlResourceSet included in the PDCCH-ConfigCommon. In addition, the additional common CORESET configuration information may be used to specify the additional common CORESET for system information and/or a paging procedure. The additional common CORESET configuration information may also be used to specify the additional common CORESET used for a random access procedure. The additional common CORESET configuration information may be included in each BWP configuration. The CORESET identifier indicated in commonControlResourceSet takes a value other than 0.

A common CORESET may also be a CORESET (e.g., an additional common CORESET) used by a random access procedure. Further, in the present embodiment, the common CORESET may include a CORESET configured by the CORESET #0 configuration information and/or the additional common CORESET configuration information. In other words, the common CORESET may also include a CORESET #0 and/or an additional common CORESET. The CORESET #0 may also be referred to as a common CORESET #0. In the terminal apparatus 1, the common CORESET configuration information may be referred to (acquired) in a BWP other than the BWP in which the common CORESET is configured.

One or more pieces of CORESET configuration information may be configured by PDCCH-Config. The information element PDCCH-Config is used to configure UE-specific PDCCH parameters (e.g., CORSET, search space, etc.) for a certain BWP. The PDCCH-Config may be included in the configuration of each BWP.

That is, in the present embodiment, the common CORESET configuration information indicated by the MIB is pdcch-ConfigSIB1, the common CORESET configuration information indicated by the PDCCH-ConfigCommon is controlResourceSetZero, and the common CORESET (additional common CORESET) configuration information indicated by the PDCCH-ConfigCommon is commonControlResourceSet. The one or more pieces of CORESET (UE specifically configured Control Resource Sets, UE-specific CORESETs) configuration information indicated by the PDCCH-Config is controlResourceSetToAddModList.

A search space is defined for searching for PDCCH candidates. The searchSpaceType included in the search space configuration information indicates whether the search space is a common search space (CSS) or a UE-specific search space (USS). The UE-specific search space is derived from at least the value of C-RNTI configured by the terminal apparatus 1. That is, the UE-specific search space is derived independently for each terminal apparatus 1. The common search space is a search space shared among a plurality of terminal apparatuses 1, and includes CCEs (Control Channel Elements) each having a predetermined index. The CCE includes a plurality of resource elements. The search space configuration information includes information of DCI format to be monitored in the search space.

The search space configuration information includes the CORESET identifier identified by the CORESET configuration information. The CORESET identified by the CORESET identifier included in the search space configuration information is associated with the search space. In other words, the CORESET associated with the search space is the CORESET identified by the CORESET identifier included in the search space. The DCI format indicated by the search space configuration information is monitored by an associated CORESET. Each search space is associated with a CORESET. For example, the search space configuration information for a random access procedure may also be configured by the ra-SearchSpace. That is, the DCI format attached with CRC scrambled by RA-RNTI or TC-RNTI is monitored by the CORESET associated with the ra-SearchSpace.

As described above, the CORESET #0 configuration information is included in the initial DL BWP configuration. The CORESET #0 configuration information may not be included in a BWP (additional BWP) configuration other than the initial DL BWP configuration. When a BWP (additional BWP) other than the initial DL BWP refers to (acquires) the CORESET #0 configuration information, it may be necessary to meet at least the conditions that the CORESET #0 and an SS block are included in the additional BWP in the frequency domain and that the same subcarrier spacing is used. In other words, when a BWP (additional BWP) other than the initial BWP refers to (acquires) the CORESET #0 configuration information, it may be necessary to meet at least the conditions that the bandwidth of the initial DL BWP and the SS block are included in the additional BWP in the frequency domain and that the same subcarrier spacing is used. At this time, the search space (e.g., ra-SearchSpace) configured for the additional BWP can refer to (acquire) the CORESET #0 configuration information by the identifier 0 that indicates the CORESET #0. That is, at this time, CORESET #0 is configured only for the initial DL BWP, but the terminal apparatus 1 operating at other BWP (additional BWP) can refer to the CORESET #0 configuration information. Further, the terminal apparatus 1 may not expect the additional DL BWP to refer to the CORESET #0 configuration information when one of the following conditions is not met: the bandwidth of the initial DL BWP is included in the additional DL BWP in the frequency domain; the SS block is included in the additional DL BWP; and the same subcarrier spacing is used. That is, in this case, the base station apparatus 3 may not configure for the terminal apparatus 1 that the additional DL BWP refers to the CORESET #0 configuration information. Here, the initial DL BWP may be an initial DL BWP with size $N^{size}_{BWP}$, 0.

When a certain (additional) DL BWP refers to (acquires) the CORESET configuration information of another BWP, it may be necessary to meet at least the conditions that the CORESET (or the bandwidth of the BWP) and/or the SS included in (associated with) the BWP are/is included in the additional BWP in the frequency domain and that the same subcarrier spacing is used. In other words, the terminal apparatus 1 may not expect the additional DL BWP to refer to the CORESET configuration information configured with respect to the BWP when any of the following three conditions is not met: the CORESET (or the bandwidth of the BWP) is included in the additional DL BWP in the frequency domain; the SS block included in (associated with) the BWP is included in the additional DL BWP; and the same subcarrier spacing is used.

The terminal apparatus 1 monitors a set of PDCCH candidates in one or more CORESETs arranged in each active serving cell that is configured to monitor the PDCCH. The set of PDCCH candidates corresponds to one or more search space sets. Monitoring refers to decoding each PDCCH candidate according to one or more monitored DCI formats. The set of PDCCH candidates monitored by the terminal apparatus 1 is defined by PDCCH search space sets. One search space set is a common search space set or a UE-specific search space set. In the above description, the search space set is referred to as a search space, the common search space set is referred to as a common search space, and the UE-specific search space set is referred to as a UE-specific search space. The terminal apparatus 1 monitors the PDCCH candidates in one or more of the following search space sets.

A Type0-PDCCH common search space set: this search space set is configured by a higher layer parameter such as the pdcch-ConfigSIB1 indicated by the MIB, or the search space SIB1 (searchSpaceSIB1) indicated by the PDCCH-ConfigCommon, or the search space zero (searchSpaceZero) included in the PDCCH-Config- Common. The search space is used to monitor the DCI format attached with CRC scrambled by SI-RNRI of the primary cell.

A Type0A-PDCCH common search space set: this search space set is configured by a higher layer parameter such as the search space (searchSpaceOtherSystemInformation) indicated by the PDCCH-ConfigCommon. The search space is used to monitor the DCI format attached with CRC scrambled by SI-RNRI of the primary cell.

A type1-PDCCH common search space set: this search space set is configured by a higher layer parameter such as the search space (ra-SearchSpace) indicated by the PDCCH-ConfigCommon for a random access procedure. The search space is used to monitor the DCI format attached with CRC scrambled by RA-RNRI or TC-RNTI of the primary cell. The type1-PDCCH common search space set is a search space set used for a random access procedure.

A type2-PDCCH common search space set: this search space set is configured by a higher layer parameter such as the search space (pagingSearchSpace) indicated by the PDCCH-ConfigCommon. The search space is used to monitor the DCI format attached with CRC scrambled by P-RNTI of the primary cell.

A type3-PDCCH common search space set: for this search space set, the search space type indicated by a higher layer parameter such as the PDCCH-Config is configured by the common search space (SearchSpace). The search space is used to monitor the DCI format attached with CRC scrambled by INT-RNTI, SFI-RNTI, TPC-PUSCH-RNTI, TPC-PUCCH-RNTI, or TPC-SRS-RNTI. For the primary grant, it is used to monitor the DCI format attached with CRC scrambled by C-RNTI, CS-RNTI(s), or MSC-C-RNTI.

A UE-specific search space set: for this search space set, the search space type indicated by a higher layer parameter such as the PDCCH-Config is configured by the UE-specific search space (SearchSpace). The search space is used to monitor the DCI format attached with CRC scrambled by C-RNTI, CS-RNTI(s), or MSC-C-RNTI.

If the terminal apparatus 1 is provided with one or more search space sets by corresponding higher layer parameters (searchSpaceZero, searchSpaceSIB1, searchSpaceOtherSystemInformation, pagingSearchSpace, ra-SearchSpace, etc.) and provided with C-RNTI or CS-RNTI, the terminal apparatus 1 may monitor PDCCH candidates for DCI format 0_0 and DCI format 1_0 with C-RNTI or CS-RNTI in the one or more search space sets.

The BWP configuration information is divided into DL BWP configuration information and UL BWP configuration information. The BWP configuration information includes an information element bwp-Id (BWP identifier). The BWP identifier included in the DL BWP configuration information is used to identify (refer to) the DL BWP of a certain serving cell. The BWP identifier included in the UL BWP configuration information is used to identify (refer to) the UL BWP of a certain serving cell. The BWP identifier is given to the DL BWP and the UL BWP, respectively. For example, the BWP identifier corresponding to the DL BWP may also be referred to as a DL BWP index. The BWP identifier corresponding to the UL BWP may also be referred to as a UL BWP index. The initial DL BWP is referenced by the DL BWP identifier 0. The initial UL BWP is referenced by the UL BWP identifier 0. Each of other DL BWPs or other UL BWPs may also be referenced from the BWP identifier 1 to maxNrofBWPs. In other words, the BWP identifier set to 0 (bwp-Id=0) is associated with the initial BWP and cannot be used for other BWP. The maxNrofBWPs is the maximum number of BWPs per serving cell and is 4. That is, the value of other BWP identifier takes the value from 1 to 4. The configuration information of other higher layers is associated with a specific BWP by using the BWP identifier. The case that the DL BWP and the UL BWP have the same BWP identifier may also mean that the DL BWP and the UL BWP are paired.

The terminal apparatus 1 may configure one primary cell and up to 15 secondary cells.

Hereinafter, a procedure for receiving the PDSCH will be described.

The terminal apparatus 1 may decode (receive) a corresponding PDSCH by the detection of the PDCCH including the DCI format 1_0 or the DCI format 1_1. The corresponding PDSCH is scheduled (indicated) by the DCI format (DCI). The starting position (starting symbol) of the scheduled PDSCH is referred to as S. The starting symbol S of the PDSCH may be the first symbol with which the PDSCH is transmitted (mapped) within a certain slot. The starting symbol S is relative to the start of a slot. For example, when the value of S is 0, the terminal apparatus 1 may receive the PDSCH from the first symbol in a certain slot. In addition, for example, when the value of S is 2, the terminal apparatus 1 may receive the PDSCH from the third symbol of a certain slot. The number of consecutive symbols of the scheduled PDSCH is referred to as L. The number L of consecutive symbols counts from the starting symbol S. The determination of S and L assigned to the PDSCH will be described later.

The PDSCH mapping types have a PDSCH mapping type A and a PDSCH mapping type B. In the PDSCH mapping type A, the S takes a value from 0 to 3. The L takes a value from 3 to 14. However, the sum of the S and the L takes the value from 3 to 14. In the PDSCH mapping type B, the S takes a value from 0 to 12. The L takes a value from {2, 4, 7}. However, the sum of the S and the L takes a value from 2 to 14.

The position of the DMRS symbol for the PDSCH depends on the PDSCH mapping type. The position of the first DMRS symbol for the PDSCH depends on the PDSCH mapping type. In the PDSCH mapping type A, the position of the first DMRS symbol may be indicated by the higher layer parameter dmrs-TypeA-Position. In other words, the higher layer parameter dmrs-TypeA-Position is used to indicate the position of the first DMRS for the PDSCH or PUSCH. The dmrs-TypeA-Position is set to either 'pos2' or 'pos3'. For example, when the dmrs-TypeA-Position is set to 'pos2', the position of the first DMRS symbol for the PDSCH may be the third symbol within the slot. For example, when the dmrs-TypeA-Position is set to 'pos3', the position of the first DMRS symbol for the PDSCH may be the fourth symbol within the slot. Here, the S takes the value of 3 only when the dmrs-TypeA-Position is set to 'pos3'. In other words, when the dmrs-TypeA-Position is set to 'pos2', the S takes a value from 0 to 2. In the PDSCH mapping type B, the position of the first DMRS symbol is the first symbol of an allocated PDSCH.

Figure 7:
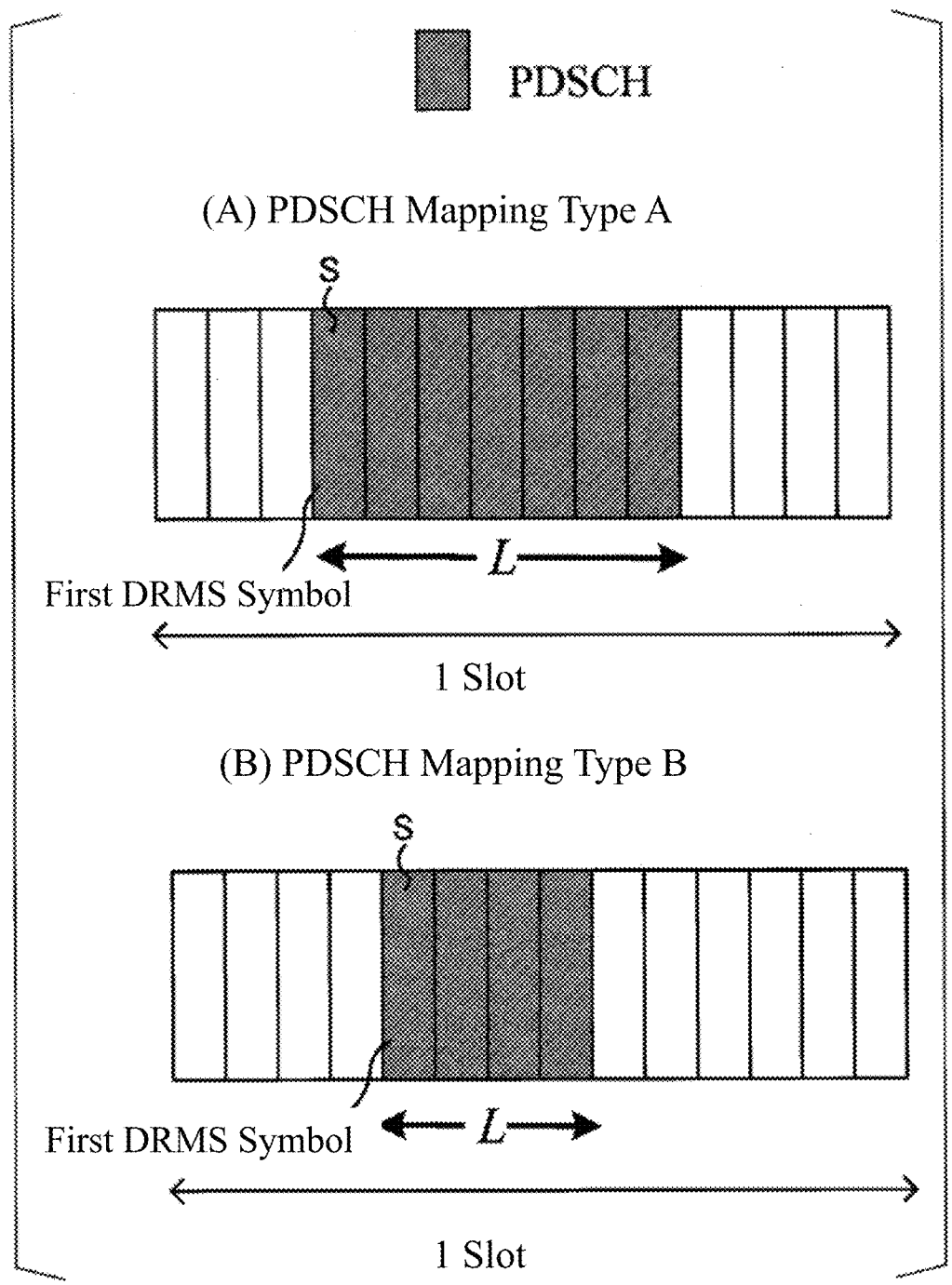
FIG. 7 is a diagram illustrating an example of a PDSCH mapping type according to an embodiment of the present invention.

FIG. 7 is a diagram illustrating an example of a PDSCH mapping type according to the present embodiment. FIG. 7 (A) is a diagram illustrating an example of a DPSCH mapping type A. In FIG. 7 (A), the S of the allocated PDSCH is 3. The L of the allocated PDSCH is 7. In FIG. 7 (A), the position of the first DMRS symbol for the PDSCH is the fourth symbol within the slot. That is, the dmrs-TypeA-Position is set to 'pos3'. FIG. 7 (B) is a diagram illustrating an example of a DPSCH mapping type A. In FIG. 7 (B), the S of the allocated PDSCH is 4. The L of the allocated PDSCH is 4. In FIG. 7 (B), the position of the first DMRS symbol for the PDSCH is the first symbol to which the PDSCH is allocated.

Hereinafter, a method for identifying PDSCH time domain resource allocation will be described.

The base station apparatus 3 may schedule the terminal apparatus 1 to receive the PDSCH by DCI. In addition, the terminal apparatus 1 may receive the PDSCH by the detection of the DCI distributed to the apparatus itself. When identifying the PDSCH time domain resource allocation, the terminal apparatus 1 determines a resource allocation table to be initially applied to the PDSCH. The resource allocation table includes one or more PDSCH time domain resource allocation configurations. Then, the terminal apparatus 1 may select one PDSCH time domain resource allocation configuration in the determined resource allocation table based on a value indicated by the 'Time domain resource assignment' field included in the DCI that schedules the PDSCH. In other words, the base station apparatus 3 determines the PDSCH resource allocation to the terminal apparatus 1, generates a value of the 'Time domain resource assignment' field, and transmits the DCI including the 'Time domain resource assignment' field to the terminal apparatus 1. The terminal apparatus 1 identifies the resource allocation of the PDSCH in a time direction based on the value set in the 'Time domain resource assignment' field.

FIG. 10 is a diagram defining which resource allocation table is applied to PDSCH time domain resource allocation. The terminal apparatus 1 may determine a resource allocation table to be applied to the PDSCH time domain resource allocation with reference to FIG. 10. The resource allocation table includes one or more PDSCH time domain resource allocation configurations. In the present embodiment, the resource allocation tables are categorized into (I) a predefined resource allocation table and (II) a resource allocation table configured based on an RRC signal of a higher layer. The predefined resource allocation table is defined as a default PDSCH time domain resource allocation A, a default PDSCH time domain resource allocation B, and a default PDSCH time domain resource allocation C. Hereinafter, the default PDSCH time domain resource allocation A is referred to as a default table A. The default PDSCH time domain resource allocation B is referred to as a default table B. The default PDSCH time domain resource allocation C is referred to as a default table C.

FIG. 11 is a diagram illustrating an example of a default table A according to the present embodiment. FIG. 12 is a diagram illustrating an example of a default table B according to the present embodiment. FIG. 13 is a diagram illustrating an example of a default table C according to the present embodiment. Referring to FIG. 11, the default table A includes 16 rows. Each row of the default table A indicates a PDSCH time domain resource allocation configuration. Specifically, in FIG. 11, the indexed row defines the PDSCH mapping type, the slot offset $K_0$ between the PDCCH including DCI and the PDSCH, the starting symbol S of the PDSCH within a slot, and the number of consecutive allocated symbols L. The resource allocation table configured according to an RRC signal of the higher layer is given by the signal pdsch-TimeDomainAllocationList of the higher layer. The information element PDSCH-TimeDomainResourceAllocation indicates the PDSCH time domain resource allocation configuration. The PDSCH-TimeDomainResourceAllocation can be used to configure a time domain relationship between the PDCCH including DCI and the PDSCH. The pdsch-TimeDomainAllocationList includes one or more information elements PDSCH-TimeDomainResourceAllocation. In other words, the pdsch-TimeDomainAllocationList is a list that includes one or more elements (information elements). One information element PDSCH-TimeDomainResourceAllocation may also be referred to as one entry (or one row). The pdsch-TimeDomainAllocationList may also include up to 16 entries. Each entry can also be defined by $K_0$, mappingType, and startSymbolAndLength. The $K_0$ indicates a slot offset between the PDCCH including DCI and the PDSCH. When the PDSCH-TimeDomainResourceAllocation does not indicate $K_0$, the terminal apparatus 1 may assume that the value of $K_0$ is 0. The mappingType indicates either the PDSCH mapping type A or the PDSCH mapping type A. The startSymbolAndLength is an index that gives a valid combination of the starting symbol S of the PDSCH and the number of consecutive allocated symbols L. The startSymbolAndLength may also be referred to as a start and length indicator SLIV. In other words, unlike a default table that directly defines the starting symbol S and the consecutive symbols L, the starting symbol S and the consecutive symbols L are given based on the SLIV. The base station apparatus 3 can set the value of SLIV so that the PDSCH time domain resource allocation does not exceed a slot boundary. The slot offset $K_0$ and SLIV will be described later.

The higher layer signal pdsch-TimeDomainAllocationList may be included in pdsch-ConfigCommon and/or pdsch-Config. The information element pdsch-ConfigCommon is used to configure a cell-specific parameter for the PDSCH for a certain BWP. The information element pdsch-Config is used to configure a UE-specific parameter for the PDSCH for a certain BWP.

FIG. 14 is a diagram illustrating an example of calculating SLIV.

In FIG. 14, 14 is the number of symbols included in a slot. FIG. 14 illustrates an example of calculating a SLIV in the case of a normal cyclic prefix (NCP). The value of SLIV is calculated based on the number of symbols within a slot, the starting symbol S, and the number of consecutive symbols L. Here, the value of L is equal to or greater than 1 and does not exceed (14-S). In the case of ECP, 6 and 12 are used for 7 and 14 in FIG. 14 when SLIV is calculated.

The slot offset $K_0$ will be described below.

Figure 15:
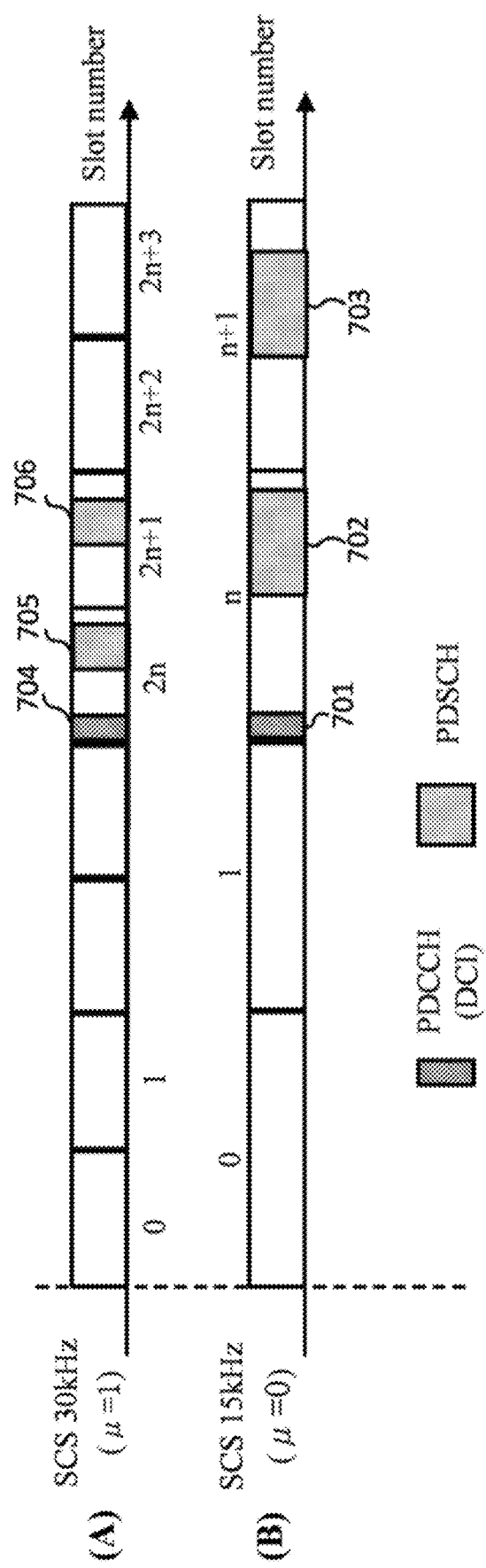
FIG. 15 is a diagram illustrating an example of DCI scheduling PDSCH according to the present embodiment.

As described above, in the subcarrier spacing configuration the slots count in an ascending order from 0 to $N^{\{subframe,\mu\}}\_\{slot\}-1$ in a subframe and count in an ascending order from 0 to $N^{\{frame,\mu\}}\_\{slot\}-1$ in a frame. The $K_0$ is the number of slots based on the subcarrier spacing for the PDSCH. The $K_0$ may take a value from 0 to 32. FIG. 15 is a diagram illustrating an example of DCI scheduling PDSCH. The slot length differs according to the subcarrier spacing configuration FIG. 15 (A) shows the slot number corresponding to 30 kHz subcarrier spacing ($\mu=1$). FIG. 15 (B) shows the slot number corresponding to 15 kHz subcarrier spacing ($\mu=0$). In a certain subframe or frame, the slot number counts from 0 in an ascending order. The slot number n with the subcarrier spacing set to 15 kHz corresponds to the slot numbers 2n and 2n+1 with the subcarrier spacing set to 30 kHz.

The terminal apparatus 1 detects DCI that schedules the PDSCH. The slot allocated to the PDSCH is given by Floor $(n*2^{\mu PDSCH}/2^{\mu PDCCH})+K_0$ (Equation 1). The function Floor (A) outputs a largest integer that does not exceed A. The n is a slot in which the PDCCH that schedules the PDSCH is detected. The $\mu PDSCH$ is a subcarrier spacing configuration for the PDSCH. The μPDCCH is a subcarrier spacing configuration for the PDCCH.

For example, the subcarrier spacing for the PDCCH including DCI is 15 kHz (μDCCH=0). The subcarrier spacing for the PDSCH scheduled by the DCI is 15 kHz (μPDSCH=0). The terminal apparatus 1 detects the PDCCH (701) including DCI in the slot n. When $K_0$ is 0, the slot allocated to the PDSCH scheduled by the DCI (701) is given as the slot n based on Equation 1. In this case, the PDSCH scheduled by the DCI (701) may be the PDSCH (702) in the slot n corresponding to the 15 kHz subcarrier spacing. When $K_0$ is 1, the slot allocated to the PDSCH scheduled by the DCI (701) is given as the slot n+1 based on Equation 1. In this case, the PDSCH scheduled by the DCI (701) is the PDSCH (703) in the slot n+1 corresponding to the 15 kHz subcarrier spacing.

In addition, for example, the subcarrier spacing for the PDCCH including DCI is 15 kHz (μPDCCH=0). The subcarrier spacing for the PDSCH scheduled by the DCI is 30 kHz (μPDSCH=1). The terminal apparatus 1 detects the PDCCH (701) including DCI in the slot n. When $K_0$ is 0, the slot allocated to the PDSCH scheduled by the DCI (701) is given as the slot 2n based on Equation 1. In this case, the PDSCH scheduled by the DCI (701) is the PDSCH (705) in the slot 2n corresponding to the 30 kHz subcarrier spacing. When $K_0$ is 1, the slot allocated to the PDSCH scheduled by the DCI (701) is given as the slot 2n+1 based on Equation 1. In this case, the PDSCH scheduled by the DCI (701) is the PDSCH (706) in the slot 2n+1 corresponding to the 30 kHz subcarrier spacing.

In addition, for example, the subcarrier spacing for the PDCCH including DCI is 30 kHz (μPDCCH=1). The subcarrier spacing for the PDSCH scheduled by the DCI is 15 kHz (μPDSCH=0). The terminal apparatus 1 detects the PDCCH (704) including DCI in the slot 2n corresponding to the 30 kHz subcarrier spacing. When $K_0$ is 0, the slot allocated to the PDSCH scheduled by the DCI (704) is given as the slot n based on Equation 1. In this case, the PDSCH scheduled by the DCI (704) may be the PDSCH (702) in the slot n corresponding to the 15 kHz subcarrier spacing. When $K_0$ is 1, the slot allocated to the PDSCH scheduled by the DCI (704) is given as the slot n+1 based on Equation 1. In this case, the PDSCH scheduled by the DCI (704) is the PDSCH (703) in the slot n+1 corresponding to the 15 kHz subcarrier spacing.

As described above, the terminal apparatus 1 may determine which resource allocation table to be applied to the PDSCH time domain resource allocation with reference to FIG. 10. In other words, the terminal apparatus 1 may determine the resource allocation table applied to the PDSCH scheduled by DCI based on at least a part or all of the following elements (A) to (F).

Element A: type of RNTI that scrambles CRC attached to DCI.

Element B: type of search space in which DCI is detected.

Element C: whether the CORESET associated with the search space is CORESET #0.

Element D: whether pdsch-ConfigCommon includes pdsch-TimeDomainAllocationList.

Element E: whether pdsch-Config includes pdsch-TimeDomainAllocationList.

Element F: SS/PBCH and CORESET multiplexing pattern.

In Element A, the type of RNTI that scrambles CRC attached to DCI is any one of SI-RNTI, RA-RNTI, TC-RNTI, P-RNTI, C-RNTI, MCS-C-RNTI, or CS-RNTI.

In Element B, the type of search space in which DCI is detected is a common search space or a UE-specific search space. The common search space includes a type 0 common search space, a type 1 common search space, and a type 2 common search space.

In an example A, the terminal apparatus 1 may detect the DCI in any common search space associated with CORESET #0. The detected DCI is attached with CRC scrambled by any of C-RNTI, MCS-C-RNTI, or CS-RNTI. The terminal apparatus 1 may determine a resource allocation table to be applied to the PDSCH scheduled by the DCI. When the pdsch-ConfigCommon includes the pdsch-TimeDomainAllocationList for the terminal apparatus 1, the terminal apparatus 1 may also determine the resource allocation table configured based on an RRC signal of the higher layer. The resource allocation table is given by the pdsch-TimeDomainAllocationList included in the pdsch-ConfigCommon. In addition, when the pdsch-ConfigCommon does not include the pdsch-TimeDomainAllocationList for the terminal apparatus 1, the terminal apparatus 1 may determine the default table A. In other words, the terminal apparatus 1 may determine the PDSCH time domain resource allocation by using the default table A indicating the PDSCH time domain resource allocation configuration.

In addition, in an example B, the terminal apparatus 1 may detect the DCI in any common search space that is not associated with CORESET #0. The detected DCI is attached with CRC scrambled by any of C-RNTI, MCS-C-RNTI, or CS-RNTI. The terminal apparatus 1 may determine a resource allocation table to be applied to the PDSCH scheduled by the DCI. When the pdsch-Config includes the pdsch-TimeDomainAllocationList for the terminal apparatus 1, the terminal apparatus 1 may determine the resource allocation table, which is applied to the PDSCH time domain resource allocation, as the resource allocation table given by the pdsch-TimeDomainAllocationList provided by the pdsch-Config. In other words, when the pdsch-Config includes the pdsch-TimeDomainAllocationList, the terminal apparatus 1 may determine the PDSCH time domain resource allocation by using the pdsch-TimeDomainAllocationList provided by the pdsch-Config regardless of whether the pdsch-ConfigCommon includes the pdsch-TimeDomainAllocationList. Further, when the pdsch-Config does not include the pdsch-TimeDomainAllocationList and the pdsch-ConfigCommon includes the pdsch-TimeDomainAllocationList, the terminal apparatus 1 determines the resource allocation table, which is applied to the PDSCH time domain resource allocation, as the resource allocation table given by the pdsch-TimeDomainAllocationList provided by the pdsch-ConfigCommon. In other words, the terminal apparatus 1 determines the PDSCH time domain resource allocation by using the pdsch-TimeDomainAllocationList provided by the pdsch-ConfigCommon. In addition, when the pdsch-Config does not include the pdsch-TimeDomainAllocationList and the pdsch-ConfigCommon does not include the pdsch-TimeDomainAllocationList, the terminal apparatus 1 determines the resource allocation table, which is applied to the PDSCH time domain resource allocation, as the default table A.

Further, in an example C, the terminal apparatus 1 may detect DCI in a UE-specific search space. The detected DCI is attached with CRC scrambled by any of C-RNTI, MCS-C-RNTI, or CS-RNTI. The terminal apparatus 1 may determine a resource allocation table to be applied to the PDSCH scheduled by the DCI. When the pdsch-Config includes the pdsch-TimeDomainAllocationList for the terminal apparatus 1, the terminal apparatus 1 determines the resource allocation table, which is applied to the PDSCH time domain resource allocation, as the resource allocation table given by the pdsch-TimeDomainAllocationList provided by the pdsch-Config. In other words, when the pdsch-Config includes the pdsch-TimeDomainAllocationList, the terminal apparatus 1 may determine the PDSCH time domain resource allocation by using the pdsch-TimeDomainAllocationList provided by the pdsch-Config regardless of whether the pdsch-ConfigCommon includes the pdsch-TimeDomainAllocationList. Further, when the pdsch-Config does not include the pdsch-TimeDomainAllocationList and the pdsch-ConfigCommon includes the pdsch-TimeDomainAllocationList, the terminal apparatus 1 determines the resource allocation table, which is applied to the PDSCH time domain resource allocation, as the resource allocation table given by the pdsch-TimeDomainAllocationList provided by the pdsch-ConfigCommon. In other words, the terminal apparatus 1 determines the PDSCH time domain resource allocation by using the pdsch-TimeDomainAllocationList provided by the pdsch-ConfigCommon. In addition, when the pdsch-Config does not include the pdsch-TimeDomainAllocationList and the pdsch-ConfigCommon does not include the pdsch-TimeDomainAllocationList, the terminal apparatus 1 determines the resource allocation table, which is applied to the PDSCH time domain resource allocation, as the default table A.

As seen from the examples B and C, the method for determining the resource allocation table applied to the PDSCH detected in the UE-specific search space is the same as the method for determining the resource allocation table applied to the PDSCH detected in any common search space that is not associated with the CORESET #0.

Then, the terminal apparatus 1 may select one PDSCH time domain resource allocation configuration in the determined resource allocation table based on a value indicated by the 'Time domain resource assignment' field included in the DCI that schedules the PDSCH. For example, when the resource allocation table applied to the PDSCH time domain resource allocation is the default table A, the value m indicated by the 'Time domain resource assignment' field may indicate the row index m+1 of the default table A. At this time, the PDSCH time domain resource allocation is the time domain resource allocation configuration indicated by the row index m+1. The terminal apparatus 1 assumes the time domain resource allocation configuration indicated by the row index m+1 and receives the PDSCH. For example, when the value m indicated by the 'Time domain resource assignment' field is 0, the terminal apparatus 1 uses the PDSCH time domain resource allocation configuration indicated by the row index 1 of the default table A to identify the resource allocation of the PDSCH, which is scheduled by the DCI, in a time direction.

In addition, when the resource allocation table applied to the PDSCH time domain resource allocation is the resource allocation table given by the pdsch-TimeDomainAllocationList, the value m indicated by the 'Time domain resource assignment' field corresponds to the (m+1)-th element (entry, row) in the list pdsch-TimeDomainAllocationList.

For example, when the value m indicated by the 'Time domain resource assignment' field is 0, the terminal apparatus 1 may refer to the first element (entry) in the list pdsch-TimeDomainAllocationList. For example, when the value m indicated by the 'Time domain resource assignment' field is 1, the terminal apparatus 1 may refer to the second element (entry) in the list pdsch-TimeDomainAllocationList.

The number of bits (size) of the 'Time domain resource assignment' field included in DCI will be described below.

The terminal apparatus 1 may decode (receive) a corresponding PDSCH by the detection of the PDCCH including the DCI format 1_0 or the DCI format 1_1. The number of bits of the 'Time domain resource assignment' field included in the DCI format 1_0 may be a fixed number of bits. For example, the fixed number of bits may be 4. In other words, the size of the 'Time domain resource assignment' field included in the DCI format 1_0 is 4 bits. In addition, the size of the 'Time domain resource assignment' field included in the DCI format 1_1 may be a variable number of bits. For example, the number of bits of the 'Time domain resource assignment' field included in the DCI format 1_1 may be any of 0, 1, 2, 3 and 4.

Hereinafter, the determination of the number of bits of the 'Time domain resource assignment' field included in the DCI format 1_1 will be described.

The number of bits of the 'Time domain resource assignment' field included in the DCI format 1_1 may also be given at least based on (I) whether the pdsch-ConfigCommon includes a pdsch-TimeDomainAllocationList and/or (II) whether the pdsch-Config includes a pdsch-TimeDomainAllocationList and/or (III) the number of rows included in a predefined default table.

In the present embodiment, the DCI format 1_1 is attached with CRC scrambled by any of C-RNTI, MCS-C-RNTI, and CS-RNTI. The DCI format 1_1 may be detected in a UE-specific search space. In the present embodiment, the case that 'the pdsch-Config includes the pdsch-TimeDomainAllocationList' may also mean that 'the pdsch-TimeDomainAllocationList is provided by the pdsch-Config'. The case that 'the pdsch-ConfigCommon includes the pdsch-TimeDomainAllocationList' may also mean that 'the pdsch-TimeDomainAllocationList is provided by the pdsch-ConfigCommon'.

The number of bits of the 'Time domain resource assignment' field may also be given as ceiling (log 2 (I)). The function Ceiling (A) outputs a smallest integer that is not smaller than A. When the pdsch-TimeDomainAllocationList is configured (provided) for the terminal apparatus 1, the value of I may be the number of entries included in the pdsch-TimeDomainAllocationList. When the pdsch-TimeDomainAllocationList is not configured (provided) for the terminal apparatus 1, the value of I may be the number of rows of a default table (default table A). In other words, when the pdsch-TimeDomainAllocationList is configured for the terminal apparatus 1, the number of bits of the 'Time domain resource assignment' field may be given based on the number of entries included in the pdsch-TimeDomainAllocationList. When the pdsch-TimeDomainAllocationList is not configured for the terminal apparatus 1, the number of bits of the 'Time domain resource assignment' field may be given based on the number of rows of a default table (default table A). Specifically, when the pdsch-Config includes the pdsch-TimeDomainAllocationList, the value of I may also be the number of entries included in the pdsch-TimeDomainAllocationList provided by the pdsch-Config. In addition, when the pdsch-Config does not include the pdsch-TimeDomainAllocationList and the pdsch-ConfigCommon includes the pdsch-TimeDomainAllocationList, the value of I may also be the number of entries included in the pdsch-TimeDomainAllocationList provided by the pdsch-ConfigCommon. Further, when the pdsch-Config does not include the pdsch-TimeDomainAllocationList and the pdsch-ConfigCommon does not include the pdsch-TimeDomainAllocationList, the value of I may also be the number of rows included in a default table (e.g., default table A).

In other words, when the pdsch-TimeDomainAllocation-List is configured (provided) for the terminal apparatus 1, the number of bits of the 'Time domain resource assignment' field may also be given as ceiling (log 2 (I)). When the pdsch-TimeDomainAllocationList is not configured (provided) for the terminal apparatus 1, the number of bits of the 'Time domain resource assignment' field may be a fixed number of bits. For example, the fixed number of bits may be 4 bits.

Here, the I may also be the number of entries included in the pdsch-TimeDomainAllocationList. Specifically, when the pdsch-Config includes the pdsch-TimeDomainAllocationList, the value of I may also be the number of entries included in the pdsch-TimeDomainAllocationList provided by the pdsch-Config. In addition, when the pdsch-Config does not include the pdsch-TimeDomainAllocationList and the pdsch-ConfigCommon includes the pdsch-TimeDomain-AllocationList, the value of I may also be the number of entries included in the pdsch-TimeDomainAllocationList provided by the pdsch-ConfigCommon.

As a result, the terminal apparatus 1 can identify the number of bits of the 'Time domain resource assignment' field generated by the base station apparatus 3. In other words, the terminal apparatus 1 can correctly receive the PDSCH that is scheduled by the base station apparatus 3 and allocated to the terminal apparatus 1.

Hereinafter, a procedure for receiving the PUSCH will be described.

The terminal apparatus 1 may transmit a corresponding PUSCH by the detection of the PDCCH including the DCI format 0_0 or the DCI format 0_1. In other words, the corresponding PUSCH may be scheduled (indicated) by the DCI format (DCI). In addition, the PUSCH may also be scheduled by an RAR UL grant included in an RAR message. The starting position (starting symbol) of the scheduled PUSCH is referred to as S. The starting symbol S of the PUSCH may be the first symbol with which the PUSCH is transmitted (mapped) within a certain slot. The starting symbol S is relative to the start of a slot. For example, when the value of S is 0, the terminal apparatus 1 may transmit the PUSCH from the first symbol in a certain slot. In addition, for example, when the value of S is 2, the terminal apparatus 1 may transmit the PUSCH from the third symbol of a certain slot. The number of consecutive symbols of the scheduled PUSCH is referred to as L. The number L of consecutive symbols counts from the starting symbol S. The determination of S and L assigned to the PUSCH will be described later.

The PUSCH mapping types have a PUSCH mapping type A and a PUSCH mapping type B. In the PUSCH mapping type A, the value of the S is 0. The L takes a value from 4 to 14. However, the sum of the S and the L takes the value from 4 to 14. In the PUSCH mapping type B, the S takes a value from 0 to 13. The L takes a value from 1 to 14. However, the sum of the S and the L takes the value from 1 to 14.

The position of the DMRS symbol for the PUSCH depends on the PUSCH mapping type. The position of the first DMRS symbol for the PUSCH depends on the PUSCH mapping type. In the PUSCH mapping type A, the position of the first DMRS symbol may be indicated by the higher layer parameter dmrs-TypeA-Position. The dmrs-TypeA-Position is set to either 'pos2' or 'pos3'. For example, when the dmrs-TypeA-Position is set to 'pos2', the position of the first DMRS symbol for the PUSCH may be the third symbol within the slot. For example, when the dmrs-TypeA-Position is set to 'pos3', the position of the first DMRS symbol for the PUSCH may be the fourth symbol within the slot. In the PUSCH mapping type B, the position of the first DMRS symbol may be the first symbol of an allocated PUSCH.

Hereinafter, a method for identifying PUSCH time domain resource allocation will be described.

The base station apparatus 3 may schedule the terminal apparatus 1 to transmit the PUSCH by DCI. In addition, the terminal apparatus 1 may transmit the PUSCH by the detection of the DCI distributed to the apparatus itself. When identifying the PUSCH time domain resource allocation, the terminal apparatus 1 determines a resource allocation table to be initially applied to the PUSCH. The resource allocation table includes one or more PUSCH time domain resource allocation configurations. Then, the terminal apparatus 1 may select one PUSCH time domain resource allocation configuration in the determined resource allocation table based on a value indicated by the 'Time domain resource assignment' field included in the DCI that schedules the PUSCH. In other words, the base station apparatus 3 determines the PUSCH resource allocation to the terminal apparatus 1, generates a value of the 'Time domain resource assignment' field, and transmits the DCI including the 'Time domain resource assignment' field to the terminal apparatus 1. The terminal apparatus 1 identifies the resource allocation of the PUSCH in a time direction based on the value set in the 'Time domain resource assignment' field.

FIG. 16 is a diagram defining which resource allocation table is applied to PUSCH time domain resource allocation. The terminal apparatus 1 may determine a resource allocation table to be applied to the PUSCH time domain resource allocation with reference to FIG. 16. The resource allocation table includes one or more PUSCH time domain resource allocation configurations. In the present embodiment, the resource allocation tables are categorized into (I) a predefined resource allocation table and (II) a resource allocation table configured based on an RRC signal of a higher layer. The predefined resource allocation table is defined as a default PUSCH time domain resource allocation A. Hereinafter, the default PUSCH time domain resource allocation A is referred to as a PUSCH default table A.

FIG. 17 is a diagram illustrating an example of a PUSCH default table A for a normal cyclic prefix (NCP). Referring to FIG. 17, the PUSCH default table A includes 16 rows. Each row of the PUSCH default table A indicates a PUSH time domain resource allocation configuration. Specifically, in FIG. 17, the indexed row defines the PUSCH mapping type, the slot offset $K_2$ between the PDCCH including DCI and the PUSCH, the starting symbol S of the PUSCH within a slot, and the number of consecutive allocated symbols L. The resource allocation table configured according to an RRC signal of the higher layer is given by the signal pusch-TimeDomainAllocationList of the higher layer. The information element PUSCH-TimeDomainResourceAllocation indicates the PUSCH time domain resource allocation configuration. The PUSCH-TimeDomainResourceAllocation can be used to configure a time domain relationship between the PDCCH including DCI and the PUSCH. The pusch-TimeDomainAllocationList includes one or more information elements PUSCH-TimeDomainResourceAllocation. In other words, the pusch-TimeDomainAllocation-List is a list that includes one or more elements (information elements). One information element PDSCH-TimeDomain-ResourceAllocation may also be referred to as one entry (or one row). The pusch-TimeDomainAllocationList may also include up to 16 entries. Each entry can be defined by $K_2$, mappingType, and startSymbolAndLength. The $K_2$ indicates a slot offset between the PDCCH including DCI and a scheduled PUSCH. If the PUSCH-TimeDomainResourceAllocation does not indicate $K_2$, the terminal apparatus 1 may assume that the value of $K_2$ is 1 when the subcarrier spacing for the PUSCH is 15 kHz or 30 kHz, assume that the value of $K_2$ is 2 when the subcarrier spacing for the PUSCH is 60 kHz, and assume that the value of $K_2$ is 3 when the subcarrier spacing for the PUSCH is 120 kHz. The mappingType indicates any of the PUSCH mapping type A or the PUSCH mapping type A. The startSymbolAndLength is an index that gives a valid combination of the starting symbol S of the PUSCH and the number of consecutive allocated symbols L. The startSymbolAndLength may also be referred to as a start and length indicator SLIV. In other words, unlike a default table that directly defines the starting symbol S and the consecutive symbols L, the starting symbol S and the consecutive symbols L are given based on the SLIV. The base station apparatus 3 can set the value of SLIV so that the PUSCH time domain resource allocation does not exceed a slot boundary. The value of SLIV is calculated based on the number of symbols within a slot, the starting symbol S, and the number of consecutive symbols L, as in the equation shown in FIG. 14.

The higher layer signal pusch-TimeDomainAllocationList may be included in pusch-ConfigCommon and/or pusch-Config. The information element pusch-ConfigCommon is used to configure a cell-specific parameter for the PUSCH for a certain BWP. The information element pusch-Config is used to configure a UE-specific parameter for the PUSCH for a certain BWP.

The terminal apparatus 1 detects DCI that schedules the PUSCH. The slot in which the PUSCH is transmitted is given by Floor $(n*2^{\mu PUSCH}/2^{\mu PDCCH})+K_2$ (Equation 4). The n is a slot in which the PDCCH that schedules the PUSCH is detected. The µPUSCH is a subcarrier spacing configuration for the PUSCH. The µPDCCH is a subcarrier spacing configuration for the PDCCH.

In FIG. 17, the value of $K_2$ is any of j, j+1, j+2, and j+3. The value of j is a value identified with respect to the subcarrier spacing for the PUSCH. For example, when the subcarrier spacing to which the PUSCH is applied is 15 kHz or 30 kHz, the value of j may be 1 slot. For example, when the subcarrier spacing to which the PUSCH is applied is 60 kHz, the value of j may be 2 slots. For example, when the subcarrier spacing to which the PUSCH is applied is 120 kHz, the value of j may be 3 slots.

As described above, the terminal apparatus 1 may determine which resource allocation table to be applied to the PUSCH time domain resource allocation with reference to FIG. 16.

In an example D, the terminal apparatus 1 may determine a resource allocation table to be applied to the PUSCH scheduled by the RAR UL grant. When the pusch-ConfigCommon includes the pusch-TimeDomainAllocationList for the terminal apparatus 1, the terminal apparatus 1 may determine the resource allocation table configured based on an RRC signal of the higher layer. The resource allocation table is given by the pusch-TimeDomainAllocationList included in the pusch-ConfigCommon. In addition, when the pusch-ConfigCommon does not include the pusch-TimeDomainAllocationList for the terminal apparatus 1, the terminal apparatus 1 may determine the PUSCH default table A. In other words, the terminal apparatus 1 may determine the PUSCH time domain resource allocation by using the default table A indicating the PUSCH time domain resource allocation configuration.

In addition, in an example E, the terminal apparatus 1 may detect the DCI in any common search space that is associated with CORESET #0. The detected DCI is attached with CRC scrambled by any of C-RNTI, MCS-C-RNTI, TC-RNTI, or CS-RNTI. The terminal apparatus 1 may determine a resource allocation table to be applied to the PUSCH scheduled by the DCI. When the pusch-ConfigCommon includes the pusch-TimeDomainAllocationList for the terminal apparatus 1, the terminal apparatus 1 may determine the resource allocation table, which is applied to the PUSCH time domain resource allocation, as the resource allocation table given by the pusch-TimeDomainAllocationList provided by the pdsch-ConfigCommon. In addition, when the pusch-ConfigCommon does not include the pusch-TimeDomainAllocationList, the terminal apparatus 1 may determine the resource allocation table, which is applied to the PUSCH time domain resource allocation, as the PUSCH default table A.

In addition, in an example F, the terminal apparatus 1 may detect the DCI in (I) any common search space that is associated with CORESET #0 or (II) a UE-specific search space. The detected DCI is attached with CRC scrambled by any of C-RNTI, MCS-C-RNTI, TC-RNTI, or CS-RNTI. The terminal apparatus 1 may determine a resource allocation table to be applied to the PUSCH scheduled by the DCI. When the pusch-Config includes the pusch-TimeDomainAllocationList for the terminal apparatus 1, the terminal apparatus 1 may determine the resource allocation table, which is applied to the PUSCH time domain resource allocation, as the resource allocation table given by the pusch-TimeDomainAllocationList provided by the pusch-Config. In other words, when the pusch-Config includes the pusch-TimeDomainAllocationList, the terminal apparatus 1 may determine the PUSCH time domain resource allocation by using the pusch-TimeDomainAllocationList provided by the pusch-Config regardless of whether the pusch-ConfigCommon includes the pusch-TimeDomainAllocationList. Further, when the pusch-Config does not include the pusch-TimeDomainAllocationList and the pusch-ConfigCommon includes the pusch-TimeDomainAllocationList, the terminal apparatus 1 may determine the resource allocation table, which is applied to the PUSCH time domain resource allocation, as the resource allocation table given by the pusch-TimeDomainAllocationList provided by the pusch-ConfigCommon. In other words, the terminal apparatus 1 determines the PUSCH time domain resource allocation by using the pusch-TimeDomainAllocationList provided by the pusch-ConfigCommon. In addition, when the pusch-Config does not include the pusch-TimeDomainAllocationList and the pusch-ConfigCommon does not include the pusch-TimeDomainAllocationList, the terminal apparatus 1 may determine the resource allocation table, which is applied to the PUSCH time domain resource allocation, as the PUSCH default table A.

Then, the terminal apparatus 1 may select one PUSCH time domain resource allocation configuration in the determined resource allocation table based on a value indicated by the 'Time domain resource assignment' field included in the DCI that schedules the PUSCH. For example, when the resource allocation table applied to the PUSCH time domain resource allocation is the PUSCH default table A, the value m indicated by the 'Time domain resource assignment' field may indicate the row index m+1 of the default table A. At this time, the PUSCH time domain resource allocation is the time domain resource allocation configuration indicated according to the row index m+1. The terminal apparatus 1 assumes the time domain resource allocation configuration indicated according to the row index m+1 and transmits the PUSCH. For example, when the value m indicated by the 'Time domain resource assignment' field is 0, the terminal apparatus 1 uses the PUSCH time domain resource allocation configuration indicated by the row index 1 of the PUSCH default table A to identify the resource allocation of the PUSCH, which is scheduled by the DCI, in a time direction.

In addition, when the resource allocation table applied to the PUSCH time domain resource allocation is the resource allocation table given by the pusch-TimeDomainAllocationList, the value m indicated by the 'Time domain resource assignment' field corresponds to the (m+1)-th element (entry, row) in the list pusch-TimeDomainAllocationList.

For example, when the value m indicated by the 'Time domain resource assignment' field is 0, the terminal apparatus 1 may refer to the first element (entry) in the list pusch-TimeDomainAllocationList. For example, when the value m indicated by the 'Time domain resource assignment' field is 1, the terminal apparatus 1 may refer to the second element (entry) in the list pusch-TimeDomainAllocationList.

The number of bits (size) of the 'Time domain resource assignment' field included in DCI will be described below.

The terminal apparatus 1 may transmit a corresponding PUSCH by the detection of the PDCCH including the DCI format 0_0 or the DCI format 0_1. The number of bits of the 'Time domain resource assignment' field included in the DCI format 0_0 may be a fixed number of bits. For example, the fixed number of bits may be 4. In other words, the size of the 'Time domain resource assignment' field included in the DCI format 0_0 is 4 bits. In addition, the size of the 'Time domain resource assignment' field included in the DCI format 0_1 may be a variable number of bits. For example, the number of bits of the 'Time domain resource assignment' field included in the DCI format 0_1 may be any of 0, 1, 2, 3 and 4.

Hereinafter, the determination of the number of bits of the 'Time domain resource assignment' field included in the DCI format 0_1 will be described.

The number of bits of the 'Time domain resource assignment' field included in the DCI format 0_1 may also be given at least based on (I) whether the pusch-ConfigCommon includes a pusch-TimeDomainAllocationList and/or (II) whether the pusch-Config includes a pusch-TimeDomainAllocationList and/or (III) the number of rows included in a predefined default table. In the present embodiment, the DCI format 0_1 is attached with CRC scrambled by any of C-RNTI, MCS-C-RNTI, and CS-RNTI. The DCI format 0_1 may be detected in a UE-specific search space. In the present embodiment, the case that 'the pusch-Config includes the pusch-TimeDomainAllocationList' may also mean that 'the pusch-TimeDomainAllocationList is provided through the pusch-Config'. The case that 'the pusch-ConfigCommon includes the pusch-TimeDomainAllocationList' may also mean that 'the pusch-TimeDomainAllocationList is provided through the pdsch-ConfigCommon'.

The number of bits of the 'Time domain resource assignment' field may also be given as ceiling (log 2 (I)). When the pusch-TimeDomainAllocationList is configured (provided) for the terminal apparatus 1, the value of I may be the number of entries included in the pusch-TimeDomainAllocationList. When the pusch-TimeDomainAllocationList is not configured (provided) for the terminal apparatus 1, the value of I may be the number of rows of the PUSCH default table A. In other words, when the pusch-TimeDomainAllocationList is configured for the terminal apparatus 1, the number of bits of the 'Time domain resource assignment' field may be given based on the number of entries included in the pusch-TimeDomainAllocationList. When the pusch-TimeDomainAllocationList is not configured for the terminal apparatus 1, the number of bits of the 'Time domain resource assignment' field may be given based on the number of rows of a default table (default table A). Specifically, when the pusch-Config includes the pusch-TimeDomainAllocationList, the value of I may also be the number of entries included in the pusch-TimeDomainAllocationList provided by the pusch-Config. In addition, when the pusch-Config does not include the pusch-TimeDomainAllocationList and the pusch-ConfigCommon includes the pusch-TimeDomainAllocationList, the value of I may also be the number of entries included in the pusch-TimeDomainAllocationList provided by the pusch-ConfigCommon. Further, when the pusch-Config does not include the pusch-TimeDomainAllocationList and the pusch-ConfigCommon does not include the pusch-TimeDomainAllocationList, the value of I may also be the number of rows included in the PUSCH default table A.

In other words, when the pusch-TimeDomainAllocationList is configured (provided) for the terminal apparatus 1, the number of bits of the 'Time domain resource assignment' field may also be given as ceiling (log 2 (I)). When the pusch-TimeDomainAllocationList is not configured (provided) for the terminal apparatus 1, the number of bits of the 'Time domain resource assignment' field may be a fixed number of bits. For example, the fixed number of bits may be 4 bits.

Here, the I may also be the number of entries included in the pusch-TimeDomainAllocationList. Specifically, when the pusch-Config includes the pusch-TimeDomainAllocationList, the value of I may also be the number of entries included in the pusch-TimeDomainAllocationList provided by the pusch-Config. In addition, when the pusch-Config does not include the pusch-TimeDomainAllocationList and the pusch-ConfigCommon includes the pusch-TimeDomainAllocationList, the value of I may also be the number of entries included in the pusch-TimeDomainAllocationList provided by the pusch-ConfigCommon.

As a result, the terminal apparatus 1 can identify the number of bits of the 'Time domain resource assignment' field generated by the base station apparatus 3. In other words, the terminal apparatus 1 can correctly transmit the PUSCH that is scheduled by the base station apparatus 3 and allocated to the terminal apparatus 1.

Hereinafter, a random access procedure according to the present embodiment will be described. The random access procedures are categorized into two procedures, that is, a contention based (CB) random access procedure and a non-contention based (non-CB) random access procedure (also referred to as a contention free random access procedure). The contention based random access is also referred to as CBRA, and the non-contention based random access is also referred to as CFRA.

The random access procedure may include (i) transmitting a random access preamble (Message 1, Msg1) of the PRACH, (ii) achieving reception of a random access response (RAR) message (Message 2, Msg2) with the PDCCH/PDSCH and an applicable case with the same, (iii) transmitting a Message 3 PUSCH (Msg3 PUSCH), and (iv) receiving the PDSCH for contention resolution.

The contention-based random access procedure is initiated by a PDCCH command, a MAC entity, a beam failure notification from a lower layer, or an RRC, etc. When a beam failure notification is provided from the physical layer of the terminal apparatus 1 to the MAC entity of the terminal apparatus 1, the MAC entity of the terminal apparatus 1 initiates a random access procedure if a certain condition is met. When a beam failure notification is provided from the physical layer of the terminal apparatus 1 to the MAC entity of the terminal apparatus 1, the procedure of determining whether a certain condition is met and initiating a random access procedure may be referred to as a beam failure recovery procedure. The random access procedure may be a random access procedure for a beam failure recovery request. The random access procedure initiated by the MAC entity includes a random access procedure initiated by a scheduling request procedure. The random access procedure for a beam failure recovery request may or may not be regarded as a random access procedure initiated by the MAC entity. A random access procedure for a beam failure recovery request and a random access procedure initiated by a scheduling request procedure may perform different procedures, so that the random access procedure for a beam failure recovery request may be distinguished from the scheduling request procedure. The random access procedure for the beam failure recovery request and the scheduling request procedure may be a random access procedure initiated by the MAC entity. In a certain embodiment, the random access procedure initiated by a scheduling request procedure may also be referred to as a random access procedure initiated by the MAC entity, and the random access procedure for a beam failure recovery request may be referred to as a random access procedure based on a beam failure notification from the lower layer. Hereinafter, the initiation of a random access procedure in the case of receiving a beam failure notification from the lower layer may refer to the initiation of a random access procedure for a beam failure recovery request.

The terminal apparatus 1 may perform a contention based random access procedure at the time of initial access from a state in which the terminal apparatus 1 is not connected (in communication) with the base station apparatus 3, and/or at the time of scheduling request in the case where uplink data that can be transmitted to the terminal apparatus 1 or sidelink data that can be transmitted to the terminal apparatus 1 is generated even though the terminal apparatus 1 is connected to the base station apparatus 3. However, the use of the contention based random access is not limited to these examples.

The generation of the uplink data that can be transmitted to the terminal apparatus 1 may also include triggering a buffer status report corresponding to the uplink data that can be transmitted. The generation of the uplink data that can be transmitted to the terminal apparatus 1 may also include pending a scheduling request triggered based on the generation of the uplink data that can be transmitted.

The generation of the sidelink data that can be transmitted to the terminal apparatus 1 may also include triggering a buffer status report corresponding to the sidelink data that can be transmitted. The generation of the sidelink data that can be transmitted to the terminal apparatus 1 may also include pending a scheduling request triggered based on the generation of the sidelink data that can be transmitted.

The non-contention based random access procedure may be initiated when the terminal apparatus 1 receives information indicating the initiation of a random access procedure from the base station apparatus 3. The non-contention based random access procedure may also be initiated when the MAC layer of the terminal apparatus 1 receives a beam failure notification from the lower layer.

The non-contention based random access may be used to promptly perform uplink synchronization between the terminal apparatus 1 and the base station apparatus 3 when a handover or transmission timing of a mobile station apparatus is invalid even though the base station apparatus 3 and the terminal apparatus 1 are connected. The non-contention based random access may also be used to transmit a beam failure recovery request when a beam failure occurs in the terminal apparatus 1. However, the use of the non-contention based random access is not limited to these examples.

However, the information indicating initiation of a random access procedure may also be referred to as a Message 0, an Msg.0, an NR-PDCCH command, a PDCCH command, or the like.

However, when a random access preamble index indicated by the Message 0 is a predetermined value (for example, when all bits indicating the index are 0s), the terminal apparatus 1 may perform a contention based random access procedure in which one preamble is randomly selected out from a set of preambles that can be used by the terminal apparatus 1 and then transmitted.

However, random access configuration information may include common information within a cell, or may include dedicated information that differs for each terminal apparatus 1.

However, a part of the random access configuration information may also be associated with all of the SS/PBCH blocks within an SS burst set. However, a part of the random access configuration information may also be associated with one configured CSI-RS or all of multiple configured CSI-RS. However, a part of the random access configuration information may also be associated with one downlink transmission beam (or beam index).

However, a part of the random access configuration information may also be associated with one SS/PBCH block within an SS burst set. However, a part of the random access configuration information may also be associated with one configured CSI-RS or one of multiple configured CSI-RS. However, a part of the random access configuration information may also be associated with one downlink transmission beam (or beam index). However, the information associated with one SS/PBCH block, one CSI-RS, and/or one downlink transmission beam may also include index information (e.g., SSB index, beam index, or QCL configuration index) for identifying one corresponding SS/PBCH block, one corresponding CSI-RS, and/or one corresponding downlink transmission beam.

Figure 8:
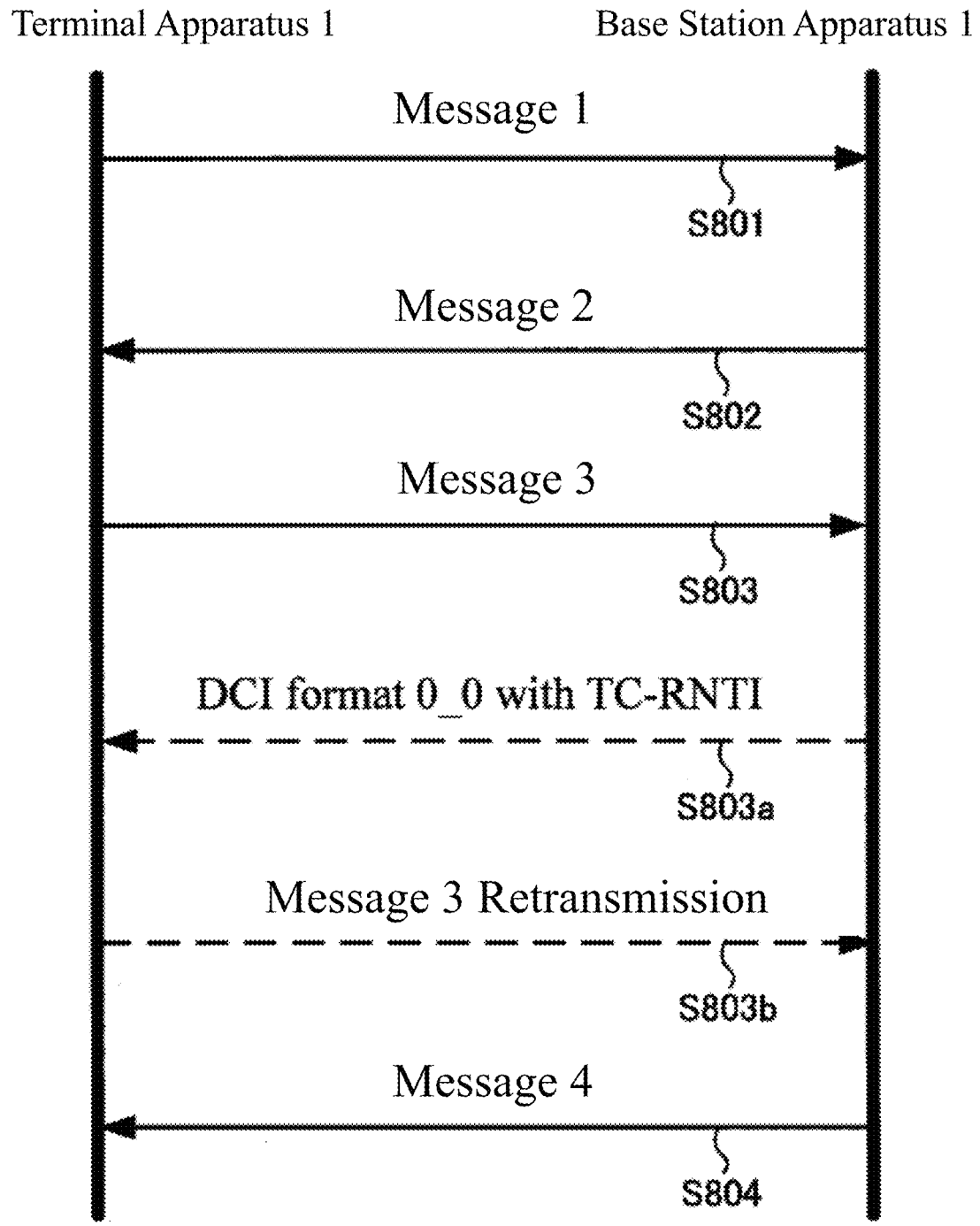
FIG. 8 is a diagram illustrating an example of a random access procedure of a terminal apparatus 1 according to an embodiment of the present invention.

FIG. 8 is a diagram illustrating an example of a random access procedure of a terminal apparatus 1 according to the present embodiment.

<Message 1 (S801)>

In S801, the terminal apparatus 1 transmits a random access preamble to the base station apparatus 3 through the PRACH. The transmitted random access preamble may also be referred to as a Message 1 (Msg1). The transmission of the random access preamble may also be referred to as PRACH transmission. The random access preamble is configured to notify the base station apparatus 3 of information by using one of a plurality of sequences. For example, 64 types of sequences (random access preamble indexes are numbered from 1st to 64th) are prepared. When 64 types of sequences are prepared, 6-bit information (which may be a ra-Preamble index or a preamble index) can be provided to the base station apparatus 3. This information may also be provided as a random access preamble identifier (RAPID).

In the case of a contention based random access procedure, the terminal apparatus 1 itself randomly selects the random access preamble index. In the contention based random access procedure, the terminal apparatus 1 selects an SS/PBCH block having an RSRP exceeding a predetermined threshold value, and selects a preamble group. When the relationship between the SS/PBCH block and the random access preamble is set, the terminal apparatus 1 randomly selects the ra-PreambleIndex from one or more random access preambles associated with the selected SS/PBCH block and the selected preamble group, and sets the selected ra-PreambleIndex to a preamble index (PREAMBLE_INDEX). In addition, for example, the selected SS/PBCH block and the selected preamble group may be divided into two subgroups based on the transmission size of the Message 3. When the transmission size of the Message 3 is small, the terminal apparatus 1 may randomly select the preamble index from a subgroup corresponding to the transmission size of the small Message 3, and when the transmission size of the Message 3 is large, the terminal apparatus 1 may randomly select the preamble index from a subgroup corresponding to the transmission size of the large Message 3. The index in the case where the message size is small is usually selected when the propagation path characteristic is poor (or when the distance between the terminal apparatus 1 and the base station apparatus 3 is long), and the index in the case where the message size is large is selected when the propagation path characteristic is good (or when the distance between the terminal apparatus 1 and the base station apparatus 3 is short).

In the case of a non-contention based random access procedure, the terminal apparatus 1 selects the random access preamble index based on the information received from the base station apparatus 3. Here, the information received by the terminal apparatus 1 from the base station apparatus 3 may be included in the PDCCH. When the value of bits of the information received from the base station apparatus 3 is all 0s, the terminal apparatus 1 performs a contention based random access procedure, and the terminal apparatus 1 itself selects the random access preamble index.

<Message 2 (S802)>

Next, the base station apparatus 3 having received the Message 1 generates an RAR message including an uplink grant (RAR UL grant or Random Access Response Grant) for instructing the terminal apparatus 1 to perform transmission, and transmits a random access response including the generated RAR message to the terminal apparatus 1 via the DL-SCH in S802. That is, the base station apparatus 3 transmits the random access response including the RAR message, which corresponds to the random access preamble transmitted in S801, through the PDSCH of the primary cell (or a primary secondary cell). The PDSCH corresponds to the PDCCH including the RA-RNTI. The RA-RNTI is calculated by RA-RNTI=1+s_id+14×t_id+14×80×f_id+14×80×8×ul_carrier_id. Here, the s_id is an index of the first OFDM symbol of the transmitted PRACH, and takes a value from 0 to 13. The t_id is an index of the first slot of the PRACH in a system frame, and takes a value from 0 to 79. The f_id is an index of the PRACH in the frequency domain and takes a value from 0 to 7. The ul_carrier_id is the uplink carrier used for transmitting Msg1. The ul_carrier_id for the NUL carrier is 0, and the ul_carrier_id for the SUL carrier is 1.

The random access response may also be referred to as a Message 2 or a Msg2. In addition, the base station apparatus 3 includes a random access preamble identifier, which corresponds to the received random access preamble, and an RAR message (MAC RAR), which corresponds to the identifier, in the Message 2. The base station apparatus 3 calculates a transmission timing difference between the terminal apparatus 1 and the base station apparatus 3 according to the received random access preamble, and includes transmission timing adjustment information (Timing Advance Command) for adjusting the difference in the RAR message. The RAR message at least includes a random access response grant field mapped to an uplink grant, a temporary C-RNTI field mapped to a temporary C-RNTI (Cell Radio Network Temporary Identifier), and a TA command (Timing Advance Command). The terminal apparatus 1 adjusts the timing of PUSCH transmission based on the TA command. The timing of PUSCH transmission may also be adjusted for each group of cells. In addition, the base station apparatus 3 includes a random access preamble identifier, which corresponds to the received random access preamble, in the Message 2.

In response to the PRACH transmission, the terminal apparatus 1 detects (monitors) the DCI format 1_0, to which a CRC parity bit scrambled by the corresponding RA-RNTI is attached, in the SpCell (PCell or PSCell) during the period of a random access response window. The period (window size) of the random access response window is given by the higher layer parameter ra-ResponseWindow. The window size is the number of slots based on the subcarrier spacing of the type1-PDCCH common search space.

When the terminal apparatus 1 detects the DCI format 1_0 attached with CRC scrambled by RA-RNTI and a PDSCH including one DL-SCH transport block within the window period, the terminal apparatus 1 forwards the transport block to the higher layer. The higher layer parses the transport block for a random access preamble identifier (RAPID) associated with the PRACH transmission. When the higher layer identifies the RAPID included in an RAR message of the DL-SCH transport block, the higher layer indicates an uplink grant to the physical layer. Identifying the RAPID means that the RAPID included in the received random access response is the same as the RAPID corresponding to the transmitted random access preamble. The uplink grant is referred to as a random access response uplink grant (RAR UL grant) in the physical layer. That is, the terminal apparatus 1 can identify the RAR message (MAC RAR) distributed to the apparatus itself from the base station apparatus 3 by monitoring the random access response (Message 2) corresponding to the random access preamble identifier.

The higher layer instructs the physical layer to transmit the PRACH (i) in the case where the terminal apparatus 1 does not detect the DCI format 1_0, which is attached with CRC scrambled by RA-RNTI, within the window period, or (ii) in the case where the terminal apparatus 1 does not correctly receive a DL-SCH transport block of the PDSCH within the window period, or (iii) in the case where the higher layer does not identify a RAPID associated with the PRACH transmission.

When the received random access response includes a random access preamble identifier corresponding to the transmitted random access preamble, and the terminal apparatus 1 selects the random access preamble based on the information received from the base station apparatus 3, the terminal apparatus 1 considers that the non-contention based random access procedure is successfully completed and transmits the PUSCH based on the uplink grant included in the random access response.

When the received random access response includes a random access preamble identifier corresponding to the transmitted random access preamble, and the terminal apparatus 1 itself selects the random access preamble, the TC-RNTI is set to the value of the TC-RNTI field included in the received random access response, and the random access Message 3 is transmitted through the PUSCH based on the uplink grant included in the random access response. The PUSCH corresponding to the uplink grant included in the random access response is transmitted in the serving cell in which the corresponding preamble is transmitted through the PRACH.

The RAR uplink (UL) grant is used to schedule PUSCH transmission (or RAR PUSCH). The PUSCH (or PUSCH transmission) scheduled by the RAR UL grant may also be referred to as RAR PUSCH (or RAR PUSCH transmission). In other words, the RAR PUSCH transmission is the PUSCH transmission corresponding to the RAR UL grant. That is, the PUSCH (PUSCH transmission) scheduled by the RAR UL grant may be the PUSCH (PUSCH transmission) corresponding to the RAR UL grant.

In the contention based random access procedure, the terminal apparatus 1 transmits the Msg3 (Message 3) based on the RAR UL grant. In other words, in the contention based random access procedure, the Msg3 PUSCH (Msg3 PUSCH transmission) is scheduled by the RAR UL grant. The Msg3 may be a first scheduled transmission (PUSCH transmission) in the contention based random access procedure. The Msg3 may be a message including C-RNTI MAC CE or CCCH SDU as a part of the contention based random access procedure, and may be transmitted through a UL-SCH. In the contention based random access procedure, the RAR PUSCH transmission may be an Msg3 PUSCH transmission. In the non-contention based random access procedure, the terminal apparatus 1 may transmit a PUSCH (RAR PUSCH) based on an RAR UL grant. In other words, in the non-contention based random access procedure, the PUSCH scheduled by the RAR UL grant may not be referred to as an Msg3 PUSCH. In addition, in the non-contention based random access procedure, the PUSCH scheduled by the RAR UL grant may also be referred to as a non-Msg3 PUSCH. In other words, in the non-contention based random access procedure, the non-Msg3 PUSCH may also be a PUSCH scheduled by the RAR UL grant.

In addition, in the present embodiment, the Msg3 PUSCH may include a PUSCH scheduled by an RAR UL grant in the contention based random access procedure. In addition, the Msg3 PUSCH may also include a PUSCH scheduled by an RAR UL grant in the non-contention based random access procedure. In other words, the Msg3 PUSCH may be a PUSCH scheduled by an RAR UL grant regardless of the type of the random access procedure (a contention based random access procedure, or a non-contention based random access procedure).

FIG. 9 is a diagram illustrating an example of fields included in an RAR UL grant. When the value of the frequency hopping flag shown in FIG. 9 is 0, the terminal apparatus 1 transmits the PUSCH scheduled by the RAR UL grant without frequency hopping. When the value of the frequency hopping flag is 1, the terminal apparatus 1 transmits the PUSCH scheduled by the RAR UL grant with frequency hopping. The frequency resource allocation of the PUSCH scheduled by the RAR UL grant may also be an uplink resource allocation type 1.

The '(Msg3) PUSCH frequency resource allocation' field is used for indicating frequency domain resource allocation for a PUSCH transmission scheduled by an RAR UL grant.

The '(Msg3) PUSCH time resource allocation' field is used for indicating time domain resource allocation for a PUSCH scheduled by an RAR UL grant.

The 'MCS' field is used for determining an MCS index for a PUSCH scheduled by an RAR UL grant.

The 'TPC command for scheduled PUSCH' field is used for setting a transmission power of a PUSCH scheduled by an RAR UL grant.

In a contention based random access procedure, the 'CSI request' field is reserved. In a non-contention based random access procedure, the 'CSI request' field is used for determining whether an aperiodic CSI report is included in a PUSCH transmission.

<Message 3 (S803)>

The terminal apparatus 1 performs a PUSCH transmission scheduled by the RAR UL grant included in the RAR message received in S 802. The terminal apparatus 1 performs a PRACH transmission and a PUSCH transmission scheduled by the RAR UL grant on the same uplink carrier in the same serving cell. The PUSCH scheduled by the RAR UL grant is transmitted in an active UL BWP. The subcarrier spacing for the PUSCH scheduled by the RAR UL grant may be indicated according to the higher layer parameter SubcarrierSpacing or the higher layer parameter SubcarrierSpacing2 configured for a UL BWP. In FDD, the higher layer parameter SubcarrierSpacing may also be used to indicate the subcarrier spacing of a DL BWP. In FDD, the higher layer parameter SubcarrierSpacing2 may also be used to indicate the subcarrier spacing of a UL BWP. In SUL, the higher layer parameter SubcarrierSpacing may also be used to indicate the subcarrier spacing of NUL (Normal Uplink or Non-SUL) carriers. In SUL, the higher layer parameter SubcarrierSpacing may also be used to indicate the subcarrier spacing of a serving cell of SUL carriers.

The terminal apparatus 1 detects DCI that schedules a PDSCH including an RAR message. The RAR message includes an RAR UL grant. The terminal apparatus 1 performs a PUSCH transmission scheduled by the RAR UL grant that is in the RAR message. The number of a slot distributed to the PUSCH is given by Floor $(n*2^{\mu PUSCH}/2^{\mu PDSCH})+K_2+\Delta$ (Equation 2). The n is a slot in which the PDSCH including an RAR message is detected. The slot n is the number of the slot corresponding to the subcarrier spacing for the PDSCH. The µPDSCH is a subcarrier spacing configuration for the PDSCH. The µPUSCH is a subcarrier spacing configuration for the PUSCH scheduled by the RAR UL grant. In other words, when the terminal apparatus 1 receives the PDSCH including the RAR message in the slot n, the terminal apparatus 1 may transmit the PUSCH scheduled by the RAR UL grant in the slot Floor $(n*2^{\mu PUSCH}/2^{\mu PDSCH})+K_2+\Delta$. The value of $K_2$ can be indicated by the 'PUSCH time resource allocation' field included in the RAR UL grant. The $\Delta$ is a specific slot delay value of an additional subcarrier spacing for the first transmission of the PUSCH scheduled by the RAR UL grant. In other words, the value of the $\Delta$ corresponds to the subcarrier spacing applied to the PUSCH scheduled by the RAR UL grant. For example, when the subcarrier spacing applied to the PUSCH scheduled by the RAR UL grant is 15 kHz, the value of $\Delta$ may be 2 slots. When the subcarrier spacing is 30 kHz, the value of $\Delta$ may be 3 slots. When the subcarrier spacing is 60 kHz, the value of $\Delta$ may be 4 slots. When the subcarrier spacing is 120 kHz, the value of $\Delta$ may be 6 slots.

In other words, the number of a slot in which the PUSCH scheduled by an RAR UL grant is transmitted may be given based on (i) the first subcarrier spacing for the PDSCH including an RAR message, (ii) the second subcarrier spacing for the PUSCH scheduled by the RAR UL grant included in the PDSCH, (iii) the number of the slot in which the PDSCH including the RAR message is received, (iv) the number $\Delta$ of predefined slots corresponding to the second subcarrier spacing, and (v) the slot offset value $K_2$ given according to the RAR UL grant.

Figure 18:
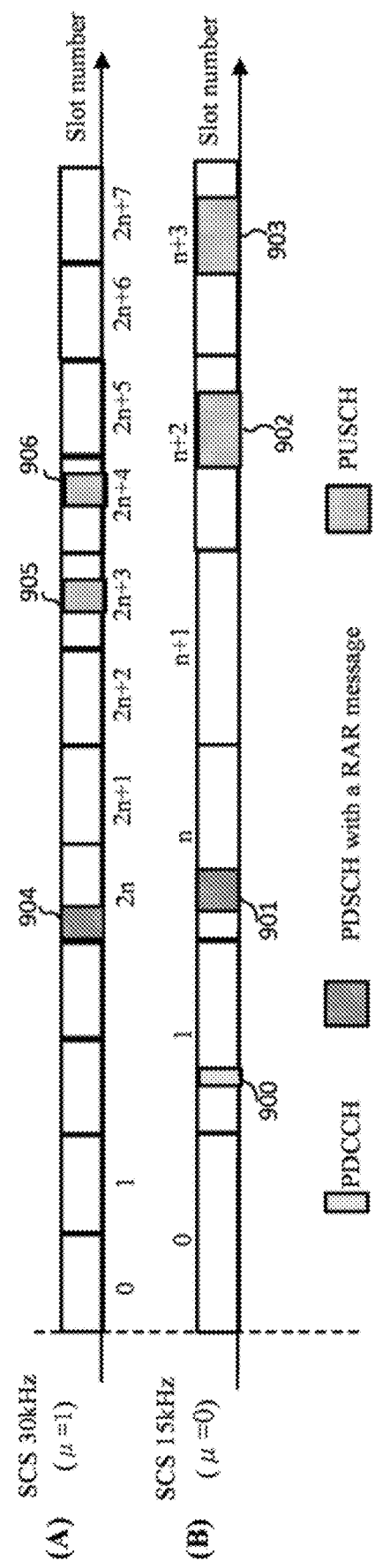
FIG. 18 is a diagram illustrating an example of transmitting a PUSCH scheduled by an RAR UL grant according to the present embodiment.

FIG. 18 is a diagram illustrating an example of transmitting a PUSCH scheduled by an RAR UL grant. The slot length differs according to the subcarrier spacing configuration FIG. 18 (A) shows the slot number corresponding to 30 kHz subcarrier spacing ($\mu$=1). FIG. 18 (B) shows the slot number corresponding to 15 kHz subcarrier spacing ($\mu$=0). In a certain subframe or frame, the slot number, which corresponds to the subcarrier spacing, counts from 0 in an ascending order. The slot number n with the subcarrier spacing set to 15 kHz corresponds to the slot numbers 2n and 2n+1 with the subcarrier spacing set to 30 kHz.

In FIG. 18, the terminal apparatus 1 can detect the DCI (900) and then receive the PDSCH including the RAR message scheduled by the detected DCI. The PDSCH including the RAR message may be the PDSCH (901) or the PDSCH (904) based on the DCI (900).

For example, the subcarrier spacing for the PDSCH (901) including the RAR message is 15 kHz ($\mu$PDSCH=0). The subcarrier spacing for the PUSCH scheduled by the RAR UL grant included in the PDSCH (901) is 15 kHz ($\mu$PUSCH=0). The value of $\Delta$ corresponding to the 15 kHz subcarrier spacing is 2. When the $K_2$ is 0, the slot for transmitting the PUSCH scheduled by the RAR UL grant included in the PDSCH (901) is given as slot n+2 based on Equation 2. In this case, the scheduled PUSCH is the PUSCH (902) in the slot n+2 corresponding to the 15 kHz subcarrier spacing. When the $K_2$ is 1, the slot for transmitting the PUSCH scheduled by the RAR UL grant included in the PDSCH (901) is given as slot n+3 based on Equation 2. In this case, the scheduled PUSCH is the PUSCH (903) in the slot n+3 corresponding to the 15 kHz subcarrier spacing.

In addition, for example, the subcarrier spacing for the PDSCH (901) including the RAR message is 15 kHz ($\mu$PDSCH=0). The subcarrier spacing for the PUSCH scheduled by the RAR UL grant included in the PDSCH (901) is 30 kHz ($\mu$PUSCH=1). The value of $\Delta$ corresponding to the 30 kHz subcarrier spacing is 3. When the $K_2$ is 0, the slot for transmitting the PUSCH scheduled by the RAR UL grant included in the PDSCH (901) is given as slot 2n+3 based on Equation 2. In this case, the scheduled PUSCH is the PUSCH (905) in the slot 2n+3 corresponding to the 30 kHz subcarrier spacing. When the $K_2$ is 1, the slot for transmitting the PUSCH scheduled by the RAR UL grant included in the PDSCH (901) is given as slot 2n+4 based on Equation 2. In this case, the scheduled PUSCH is the PUSCH (906) in the slot 2n+4 corresponding to the 30 kHz subcarrier spacing.

In addition, for example, the subcarrier spacing for the PDSCH (904) including the RAR message is 30 kHz ($\mu$PDSCH=1). The subcarrier spacing for the PUSCH scheduled by the RAR UL grant included in the PDSCH (904) is 30 kHz ($\mu$PUSCH=1). The value of $\Delta$ corresponding to the 30 kHz subcarrier spacing is 3. When the $K_2$ is 0, the slot for transmitting the PUSCH scheduled by the RAR UL grant included in the PDSCH (904) is given as slot 2n+3 based on Equation 2. In this case, the scheduled PUSCH is the PUSCH (905) in the slot 2n+3 corresponding to the 30 kHz subcarrier spacing. When the $K_2$ is 1, the slot for transmitting the PUSCH scheduled by the RAR UL grant included in the PDSCH (904) is given as slot 2n+4 based on Equation 2. In this case, the scheduled PUSCH is the PUSCH (906) in the slot 2n+4 corresponding to the 30 kHz subcarrier spacing.

In addition, for example, the subcarrier spacing for the PDSCH (904) including the RAR message is 30 kHz ($\mu$PDSCH=1). The subcarrier spacing for the PUSCH scheduled by the RAR UL grant included in the PDSCH (904) is 15 kHz ($\mu$PUSCH=0). The value of $\Delta$ corresponding to the 15 kHz subcarrier spacing is 2. When the $K_2$ is 0, the slot for transmitting the PUSCH scheduled by the RAR UL grant included in the PDSCH (904) is given as slot n+2 based on Equation 2. In this case, the scheduled PUSCH is the PUSCH (902) in the slot n+2 corresponding to the 15 kHz subcarrier spacing. When the $K_2$ is 1, the slot for transmitting the PUSCH scheduled by the RAR UL grant included in the PDSCH (904) is given as slot n+3 based on Equation 2. In this case, the scheduled PUSCH is the PUSCH (903) in the slot n+3 corresponding to the 15 kHz subcarrier spacing.

<Message 3 Retransmission (S803*a*)>

The Message 3 retransmission is scheduled by DCI format 0_0 attached with a CRC parity bit scrambled by TC-RNTI included in an RAR message. That is, the PUSCH retransmission of the transport block transmitted by the PUSCH corresponding to an RAR UL grant included in the RAR message is scheduled by DCI format 0_0 attached with a CRC parity bit scrambled by TC-RNTI. The DCI format 0_0 is transmitted on the PDCCH in the type1-PDCCH common search space set. In other words, the terminal apparatus 1 may monitor the DCI format 0_0 for scheduling a Message 3 retransmission after transmitting the Message 3 in S803. If the terminal apparatus 1 detects the DCI format 0_0 for scheduling Message 3 retransmission in S803*a*, the terminal apparatus 1 performs S803*b*.

<Message 3 Retransmission (S803*b*)>

When the DCI format 0_0 attached with the CRC parity bit scrambled by TC-RNTI is detected in S803*a*, the terminal apparatus 1 performs a PUSCH retransmission for the transport block transmitted in S803.

<Message 4 (S804)>

In order to respond to the PUSCH transmission of the Message 3 (Msg3), the terminal apparatus 1, in which C-RNTI is not shown, monitors the DCI format 1_0 that schedules the PDSCH including a UE contention resolution identity. Here, the DCI format 1_0 is attached with a CRC parity bit scrambled by a corresponding TC-RNTI. In order to respond to the PDSCH reception with the UE contention resolution identity, the terminal apparatus 1 transmits HARQ-ACK information on a PUCCH. The PUCCH transmission may be performed in an active UL BWP, in which the Message 3 (Msg 3) is transmitted.

As a result, the terminal apparatus 1 performing the random access procedure can transmit uplink data to the base station apparatus 3.

Figure 19:
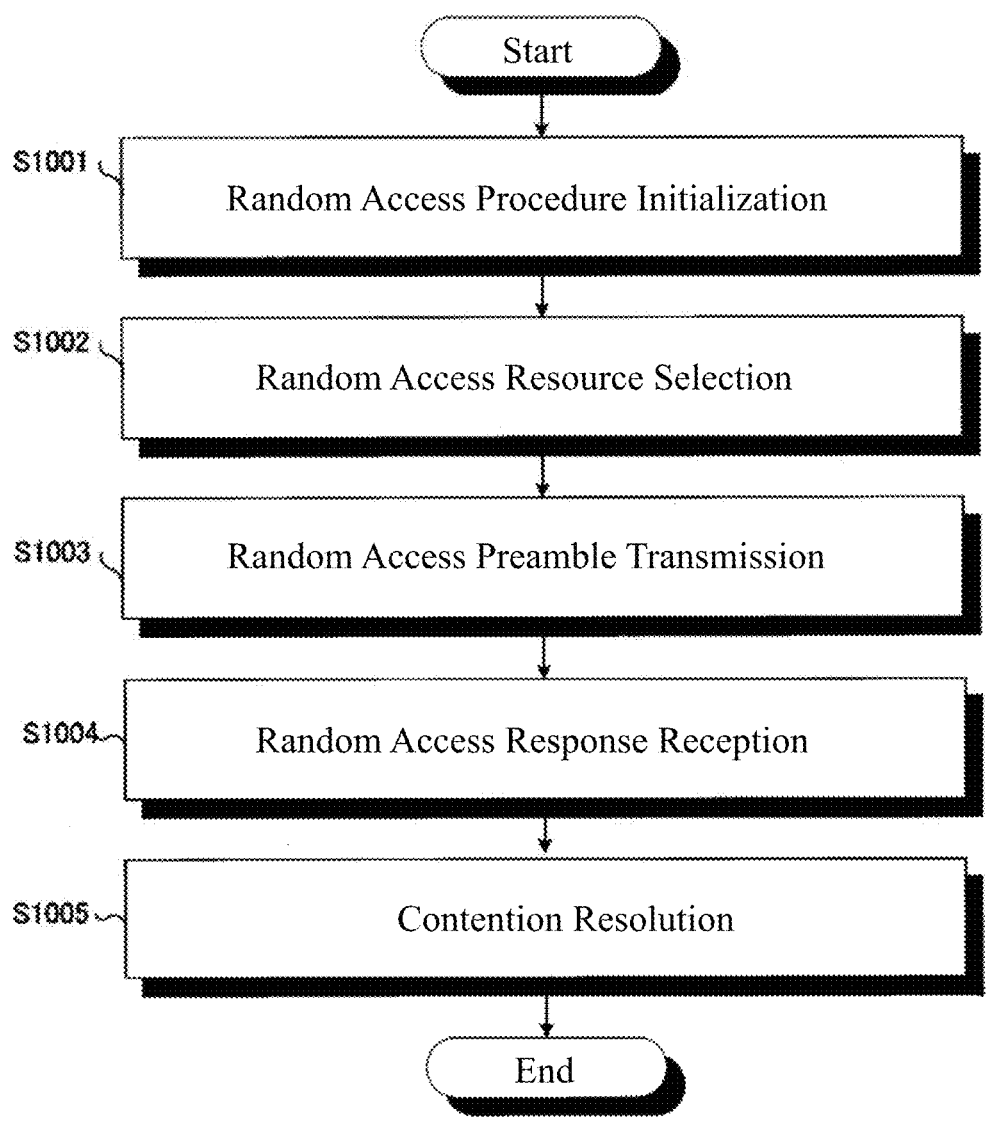
FIG. 19 is a flowchart illustrating an example of a random access procedure of a MAC entity according to an embodiment of the present invention.

FIG. 19 is a flowchart illustrating an example of a random access procedure of a MAC entity according to the present embodiment.

<Random Access Procedure Initialization (S1001)>

In FIG. 19, S1001 is a procedure related to random access procedure initialization. In S1001, a random access procedure is initiated according a PDCCH command, a MAC entity itself, a beam failure notification from a lower layer, or an RRC, etc. The random access procedure in an SCell is initiated only according to a PDCCH command including a ra-PreambleIndex that is not set to 0b000000.

In S1001, the terminal apparatus 1 receives random access configuration information via a higher layer before initiating a random access procedure. The random access configuration information may include one or more elements of the following information or information for determining/configuring the following information.

prach-ConfigIndex: one set of one or more available time/frequency resources (also referred to as random access channel occasions, PRACH occasions or RACH occasions) for transmission of random access preambles.

preambleReceivedTargetPower: an initial power for preamble (or a target received power).

rsrp-ThresholdSSB: a reference signal received power (RSRP) threshold for selection of SS/PBCH blocks (or associated random access preambles and/or PRACH occasions).

rsrp-ThresholdCSI-RS: a reference signal received power (RSRP) threshold for selection of CSI-RS (or associated random access preambles and/or PRACH occasions).

rsrp-ThresholdSSB-SUL: a reference signal received power (RSRP) threshold for selection between a normal uplink (NUL) carrier and a supplementary uplink (SUL) carrier.

powerControlOffset: a power offset between the rsrp-ThresholdSSB and the rsrp-ThresholdCSI-RS in the case where a random access procedure is initiated for beam failure recovery.

powerRampingStep: a power ramp step (or a power ramp element). The step of ramping up transmission power based on a preamble transmission counter PREAMBLE_TRANSMISSION_COUNTER is indicated.

ra-PreambleIndex: one or more available random access preambles or one or more available random access preambles in a plurality of random access preamble groups mentioned above.

ra-ssb-OccasionMaskIndex: information for determining a PRACH occasion assigned to an SS/PBCH block in which a MAC entity transmits a random access preamble.

ra-OccasionList: information for determining a PRACH occasion assigned to a CSI-RS in which a MAC entity can transmit a random access preamble.

preamTransMax: a maximum number of preamble transmissions.

ssb-perRACH-OccasionAndCB-PreamblesPerSSB (SpCell only): a parameter indicating the number of SS/PBCH blocks mapped per PRACH occasion and the number of random access preambles mapped per SS/PBCH block.

ra-ResponseWindow: a time window for monitoring a random access response (SpCell only).

ra-ContentionResolutioTimer: a contention resolution timer.

numberOfRA-PreambleGroupA: the number of random access preambles within a random access preamble group A for each SS/PBCH block.

PREAMBLE_TRANSMISSION_COUNTER: a preamble transmission counter.

DELTA_PREAMBLE: a power offset value based on a random access preamble format.

PREAMBLE_POWER_RAMPING_COUNTER: a preamble power ramping counter.

PREAMBLE_RECEIVED_TARGET_POWER: an initial random access preamble power. It indicates an initial transmission power for a random access preamble transmission.

PREAMBLE_BACKOFF: it is used to adjust the timing of a random access preamble transmission.

When a random access procedure is initiated in a certain serving cell, the MAC entity refreshes the Msg3 buffer, sets the state variable PREAMBLE_TRANSMISSION_COUNTER to 1, sets the state variable PREAMBLE_POWER_RAMPING_COUNTER to 1, and sets the state variable PREAMBLE_BACKOFF to 0ms. If a carrier used for the random access procedure is explicitly notified, the MAC entity selects the carrier notified to perform the random access procedure and sets the state variable PCMAX to a maximum transmission power value of the notified carrier. In the case where the carrier used for the random access procedure is not explicitly notified, where an SUL carrier is configured for a serving cell, and where the RSRP of the downlink path loss reference is smaller than the rsrp-ThresholdSSB-SUL, the MAC entity selects the SUL carrier to perform the random access procedure and sets the state variable PCMAX to a maximum transmission power value of the SUL carrier. Otherwise, the MAC entity selects an NUL carrier to perform the random access procedure and sets the state variable PCMAX to a maximum transmission power value of the NUL carrier.

<Random Access Procedure Initialization (S1002)>

S1002 is a random access resource selection procedure. Hereinafter, a procedure for selecting a random access resource (including a time/frequency resource and/or a preamble index) in the MAC layer of the terminal apparatus 1 will be described.

The terminal apparatus 1 sets by the following procedure a value for the preamble index (also referred to as PREAMBLE_INDEX) of a random access preamble to be transmitted.

The terminal apparatus 1 (MAC entity) selects an SS/PBCH block or a CSI-RS whose RSRP exceeds a predetermined threshold when (1) a random access procedure is initiated according to a beam failure notification from a lower layer, (2) a random access resource (which may also be a PRACH occasion) for a non-contention based random access for a beam failure recovery request associated with an SS/PBCH block (also referred to as a SSB) or a CSI-RS is provided by an RRC parameter, and (3) an RSRP of one or more SS/PBCH blocks or CSI-RS exceeds the predetermined threshold. If the CSI-RS is selected and there is no Ra-PreambleIndex associated with the selected CSI-RS, the MAC entity may set the ra-PreambleIndex associated with the selected SS/PBCH block to a preamble index (PREAMBLE_INDEX). Otherwise, the MAC entity sets the ra-PreambleIndex associated with the selected SS/PBCH block or CSI-RS as the preamble index.

The terminal apparatus 1 sets the signaled ra-PreambleIndex to the preamble index in a case where (1) the ra-PreambleIndex is provided through the PDCCH or RRC, (2) the value of the ra-PreambleIndex is not a value indicating a contention based random access procedure (e.g., 0b000000), and (3) the SS/PBCH block or the CSI-RS is not made associated with a random access resource for a non-contention based random access through the RRC. The 0bxxxxxx refers to a bit string configured with a 6-bits information field.

The terminal apparatus 1 selects one of the SS/PBCH blocks in which the RSRP exceeds a predetermined threshold and sets the ra-PreambleIndex associated with the selected SS/PBCH block to a preamble index in a case where (1) a random access resource for a non-contention based random access associated with an SS/PBCH block is provided by the RRC, and (2) one or more SS/PBCH blocks whose RSRP exceeds a predetermined threshold among the associated SS/PBCH blocks can be used.

The terminal apparatus 1 selects one of the CSI-RSs whose RSRP exceeds a predetermined threshold and sets the ra-PreambleIndex associated with the selected CSI-RS to a preamble index in a case where (1) a CSI-RS is made associated with a random access resource for a non-contention based random access through the RRC, and (2) one or more CSI-RSs whose RSRP exceeds a predetermined threshold among the associated CSI-RSs can be used.

When none of the above conditions is met, the terminal apparatus 1 performs a contention based random access procedure. In the contention based random access procedure, the terminal apparatus 1 selects an SS/PBCH block having an RSRP exceeding a predetermined threshold value, and selects a preamble group. When the relationship between the SS/PBCH block and the random access preamble is set, the terminal apparatus 1 randomly selects the ra-PreambleIndex from one or more random access preambles associated with the selected SS/PBCH block and the selected preamble group, and sets the selected ra-PreambleIndex to a preamble index.

When one SS/PBCH block is selected and an association between a PRACH occasion and the SS/PBCH block is set, the MAC entity may determine the next available PRACH occasion among the PRACH occasions associated with the selected SS/PBCH block. However, when one CSI-RS is selected and an association between a PRACH occasion and the CSI-RS is set, the terminal apparatus 1 may determine the next available PRACH occasion among the PRACH occasions associated with the selected CSI-RS.

The available PRACH occasions may be determined based on mask index information, SSB index information, a resource configuration configured according to an RRC parameter, and/or a selected reference signal (SS/PBCH block or CSI-RS). The resource configuration configured according to the RRC parameter includes a resource configuration for each SS/PBCH block and/or a resource configuration for each CSI-RS.

The base station apparatus 3 may transmit the resource configuration for each SS/PBCH block and/or the resource configuration for each CSI-RS to the terminal apparatus 1 through an RRC message. The terminal apparatus 1 receives the resource configuration for each SS/PBCH block and/or the resource configuration for each CSI-RS through the RRC message from the base station apparatus 3. The base station apparatus 3 may transmit the mask index information and/or the SSB index information to the terminal apparatus 1. The terminal apparatus 1 acquires the mask index information and/or the SSB index information from the base station apparatus 3. The terminal apparatus 1 may select a reference signal (SS/PBCH block or CSI-RS) based on a certain condition. The terminal apparatus 1 may determine the next available PRACH occasion based on mask index information, SSB index information, a resource configuration configured according to an RRC parameter, and a selected reference signal (SS/PBCH block or CSI-RS). The MAC entity of the terminal apparatus 1 may instruct the physical layer to use the selected PRACH occasion to transmit a random access preamble.

The mask index information is information indicating an index of the available PRACH occasion for transmitting a random access preamble. The mask index information may be information indicating a part of PRACH occasions of one or more PRACH occasion groups determined by the prach-ConfigurationIndex. The mask index information may be information indicating a part of PRACH occasions of a PRACH occasion group mapped with a specific SSB index identified based on the SSB index information.

The SSB index information is information indicating an SSB index corresponding to any of one or more SS/PBCH blocks transmitted by the base station apparatus 3. The terminal apparatus 1 that has received the Message 0 identifies a PRACH occasion group mapped with a SSB index indicated by the SSB index information. The SSB index mapped to each PRACH occasion is determined based on a PRACH configuration index, the higher layer parameter SB-perRACH-Occasion, and the higher layer parameter cb-preamblePerSSB.

<Random Access Preamble Transmission (S1003)>

S1003 is a procedure related to random access preamble transmission. For each random access preamble, the MAC entity increments the state variable PREAMBLE_POWER_RAMPING_COUNTER by 1 when (1) the state variable PREAMBLE_TRANSMISSION_COUNTER is greater than 1, and (2) no notification of the stopped power ramp count is received from the higher layer, and (3) the selected SS/PBCH block is not changed.

Next, the MAC entity selects the value of DELTA_PREAMBLE and sets the state variable PREAMBLE_RECEIVED_TARGET_POWER to a predetermined value. The predetermined value is calculated through preambleReceivedTargetPower DELTA_PREAMBLE+(PREAMBLE_POWER_RAMPING_COUNTER−1) powerRampingStep.

Next, the MAC entity calculates an RA-RNTI associated with the PRACH occasion in which a random access preamble is transmitted, except for the case of a non-contention based random access preamble for a beam failure recovery request. The RA-RNTI is calculated through RA-RNTI=1+ s_id+14×t_id+14×80×f_id+14×80×8×ul_carrier_id. Here, the s_id is an index of the first OFDM symbol of the transmitted PRACH, and takes a value from 0 to 13. The t_id is an index of the first slot of the PRACH in a system frame, and takes a value from 0 to 79. The fid is an index of the PRACH in the frequency domain and takes a value from 0 to 7. The ul_carrier_id is the uplink carrier used for transmitting Msg1. The ul_carrier_id for the NUL carrier is 0, and the ul_carrier_id for the SUL carrier is 1.

The MAC entity instructs the physical layer to use the selected PRACH to transmit a random access preamble.

<Random Access Response Reception (S1004)>

S1004 is a procedure related to random access response reception. Once the random access preamble is transmitted, the MAC entity performs the following operations regardless of the possible occurrence of a measurement gap. Here, the random access response may also be a MAC PDU for the random access response.

The MAC PDU (random access response MAC PDU) includes one or more MAC subPDUs and possible padding. Each MAC subPDU includes one of the following.

MAC subheader including only a Backoff Indicator
MAC subheader indicating only a RAPID
MAC subheader indicating a RAPID and a MAC payload for Random Access Response (MAC RAR)

The MAC subheader including only the Backoff Indicator is placed at the beginning of a MAC PDU. The padding is placed at the end of the MAC PDU. A MAC subPDU including only the RAPID and a MAC subPDU including the RAPID and the MAC RAR can be placed at any position between a MAC subPDU including only the Backoff Indicator and padding.

The MAC RAR is fixed in size and includes reserved bits set to 0, transmission timing adjustment information (TA command or Timing Advance command), UL grant (RAR UL grant), and TEMPORARY C-RNTI. Hereinafter, an RAR message may also be a MAC RAR. The RAR message may also be a random access response.

In S1004, if the MAC entity transmits a non-contention based random access preamble for a beam failure recovery request, the MAC entity initiates a random access response window (ra-ResponseWindow) in the first PDCCH occasion from the end of the random access preamble transmission. Also, during the operation of the random access response window, the MAC entity monitors the PDCCH of the SpCell identified according to the C-RNTI in response to the beam failure recovery request. Here, the period (window size) of the random access response window is given by the ra-ResponseWindow included in the higher layer parameter BeamFailureRecoveryConfig. Otherwise, the MAC entity initiates a random access response window (ra-Response-Window) in the first PDCCH occasion from the end of the random access preamble transmission. Here, the period (window size) of the random access response window is given by the ra-ResponseWindow included in the higher layer parameter RACH-ConfigCommon. Further, during the operation of the random access response window, the MAC entity monitors the PDCCH of the SpCell identified according to the RA-RNTI for the random access response. Here, in the case of beam failure detection, the information element BeamFailureRecoveryConfig is used to configure a RACH resource and a candidate beam for a beam failure recovery for the terminal apparatus 1. The information element RACH-ConfigCommon is used to identify a cell-specific random access parameter.

The MAC entity considers that the random access procedure has been successfully completed in the case where (1) a reception notification of the PDCCH transmission is received from the lower layer, (2) the PDCCH transmission is scrambled by the C-RNTI, and (3) the MAC entity transmits a non-contention based random access preamble for a beam failure recovery request.

Next, the MAC entity performs the following operations when (1) the downlink assignment is received in the RA-RNTI PDCCH and (2) the received transport block is successfully decoded.

The MAC entity sets the PREAMBLE_BACKOFF to the value of the BI field included in a MAC subPDU when the random access response includes a MAC subPDU including the Backoff Indicator. Otherwise, the MAC entity sets the PREAMBLE_BACKOFF to 0ms.

In addition, the MAC entity may consider that the random access response has been successfully received in the case where the random access response includes a MAC subPDU including a random access preamble identifier corresponding to the transmitted PREAMPLE_INDEX.

The MAC entity considers that the random access procedure has been successfully completed and indicates to the higher layer the reception of an acknowledgement to an SI request (system information request) in the case where (1) the reception of the random access response is considered successful and (2) the random access response includes a MAC subPDU including only a RAPID. Here, when the condition (2) is not met, the MAC entity applies the following operation A to the serving cell to which the random access preamble is transmitted.

<Start of Operation A>

The MAC entity processes the received transmission timing adjustment information (Timing Advance Command) and indicates to the lower layer the amount of the preambleReceivedTargetPower and power ramping applied to the latest random access preamble transmission. Here, the transmission timing adjustment information is used to adjust the transmission timing difference between the terminal apparatus 1 and the base station apparatus 3 based on the received random access preamble.

The MAC entity may ignore the received UL grant in the case where the serving cell for the random access procedure is an SCell for SRS only. Otherwise, the MAC entity processes the value of the received UL grant and indicates the value to the lower layer.

The MAC entity may consider that the random access procedure has been successfully completed in the case where a random access preamble is not selected by the MAC entity from the range of the contention based random access preambles.

<End of Operation A>

The MAC entity sets the TEMPORARY C-RNTI to the value of the Temporary C-RNTI field included in the received random access response in the case where the random access preamble is selected by the MAC entity from the range of the contention based random access preambles. Next, in the case where the random access response is successfully received for the first time in the random access procedure, if no transmission is made to the CCCH logical channel (common control channel logical channel), the MAC entity notifies the predetermined entity (Multiplexing and assembly entity) that the next uplink transmission includes the C-RNTI MAC CE, and the MAC entity acquires from the predetermined entity (multiplexing and assembly entity) a MAC PDU for transmission and stores the acquired MAC PDU in the Msg3 buffer. When the MAC entity performs transmission on the CCCH logical channel, the MAC entity acquires from the predetermined entity (multiplexing and assembly entity) a MAC PDU for transmission and stores the acquired MAC PDU in the Msg3 buffer.

If at least one of the following conditions (3) and (4) is met, the MAC entity determines that the random access response has not been successfully received and increments the preamble transmission count (PREAMBLE_TRANSMISSION_COUNTER) by 1. When the value of the preamble transmission counter reaches a predetermined value (the maximum number of preamble transmissions+1) and the random access preamble is transmitted by an SpCell, the MAC entity indicates the random access problem to the higher layer. Also, when a random access procedure is initiated for an SI request, the MAC entity considers that the random access procedure has not been successfully completed.

When the value of the preamble transmission count reaches a prescribed value (the maximum number of preamble transmissions+1) and the random access preamble is transmitted by the SCell, the MAC entity considers that the random access procedure has not been completed successfully.

Condition (3) refers to that the period of the random access response window configured by the RACH-ConfigCommon expires, and no random access response including a random access preamble identifier that matches the transmitted preamble index is received. The condition (4) refers to that the period of the random access response window configured by the BeamFailureRecoveryConfig expires, and no PDCCH scrambled by the C-RNTI is received.

In the case where the random access procedure is not completed, if the MAC entity selects a random access preamble from the range of contention based random access preambles by the MAC itself in the random access procedure, the MAC entity selects a random backoff time between 0 and the PREAMBLE_BACKOFF, delays the next random access preamble transmission by the selected backoff time and then performs S1002. In the case where the random access procedure is not completed, if the Mac entity does not select a random access preamble from the range of contention based random access preambles by the MAC itself in the random access procedure, the MAC entity performs S1002.

The MAC entity may stop the random access response window if it successfully receives the random access response including the random access preamble identifier that matches the transmitted preamble index.

The terminal apparatus 1 transmits the Message 3 through the PUSCH based on the UL grant.

<Contention Resolution (S1005)>

S1005 is a procedure related to contention resolution.

The MAC entity starts the contention resolution timer once the Msg3 is transmitted, and the MAC entity restarts the contention resolution timer in each HARQ retransmission. The MAC entity monitors the PDCCH while the contention resolution timer is running regardless of the possible occurrence of a measurement gap.

In the case where the MAC entity receives a reception notification of the PDCCH transmission from the lower layer and where the C-RNTI MAC CE is included in the Msg3, if at least one of the following conditions (5) to (7) is met, then the MAC entity considers that the contention resolution is successful, stops the contention resolution timer, discards the TEMPORARY C-RNTI, and considers that the random access procedure has been completed successfully.

Condition (5) refers to that the random access procedure is initiated by a MAC sublayer itself or an RRC sublayer, the PDCCH transmission is scrambled by C-RNTI, and the PDCCH transmission includes an uplink grant for an initial transmission. Condition (6) refers to that the random access procedure is initiated by a PDCCH command, and the PDCCH transmission is scrambled by C-RNTI. Condition (7) refers to that the random access procedure is initiated for beam failure recovery, and the PDCCH transmission is scrambled by C-RNTI.

In the case where the CCCH SDU (UE contention resolution Identity) is included in the Msg3 and where the PDCCH transmission is scrambled by TEMPORARY C-RNTI, the MAC entity stops the contention resolution timer if the MAC PDU is successfully decoded. Then, in the case where the successfully decoded MAC PDU includes a UE contention resolution identity MAC CE and where the UE contention resolution identity in the MAC CE matches the CCCH SDU transmitted by the Msg3, the MAC entity considers that the contention resolution is successful and ends the MAC PDU disassembly and demultiplexing. Also, in the case where the random access procedure is initiated for an SI request, the MAC entity indicates to the higher layer the reception of an acknowledgement to the SI request. In the case where the random access procedure is not initiated for the SI request, the MAC entity sets the C-RNTI to the value of TEMPORARY C-RNTI. Then, the MAC entity discards the TEMPORARY C-RNTI and considers that the random access procedure is successfully completed.

In the case where the UE contention resolution identity in the MAC CE does not match the CCCH SDU transmitted by the Msg3, the MAC entity discards the TEMPORARY C-RNTI, considers that the contention resolution is not successful and discards the successfully decoded MAC PDU.

In the case where the contention resolution timer expires, the MAC entity discards the TEMPORARY_C-RNTI and considers that the contention resolution is not successful. In the case where the contention resolution is considered to be not successful, the MAC entity flushes the HARQ buffer used to transmit the MAC PDU stored in the Msg3 buffer and increments the preamble transmission counter (PREAMBLE_TRANSMISSION_COUNTER) by 1. If the value of the preamble transmission counter reaches a predetermined value (the maximum number of preamble transmissions+1), the MAC entity indicates the random access problem to the higher layer. Also, when a random access procedure is initiated for an SI request, the MAC entity considers that the random access procedure has not been successfully completed.

In the case where the random access procedure is not completed, the MAC entity selects a random backoff time between 0 and the PREAMBLE_BACKOFF, delays the next random access preamble transmission by the selected backoff time and performs S1002.

If the random access procedure is completed, the MAC entity discards the explicitly signaled non-contention based random access resources used for the non-contention based random access procedure other than the non-contention based random access procedure for the beam failure recovery request, and flushes the HARQ buffer used to transmit the MAC PDU in stored in the Msg3 buffer.

Hereinafter, the configurations of apparatuses according to the present embodiment will be described.

Figure 20:
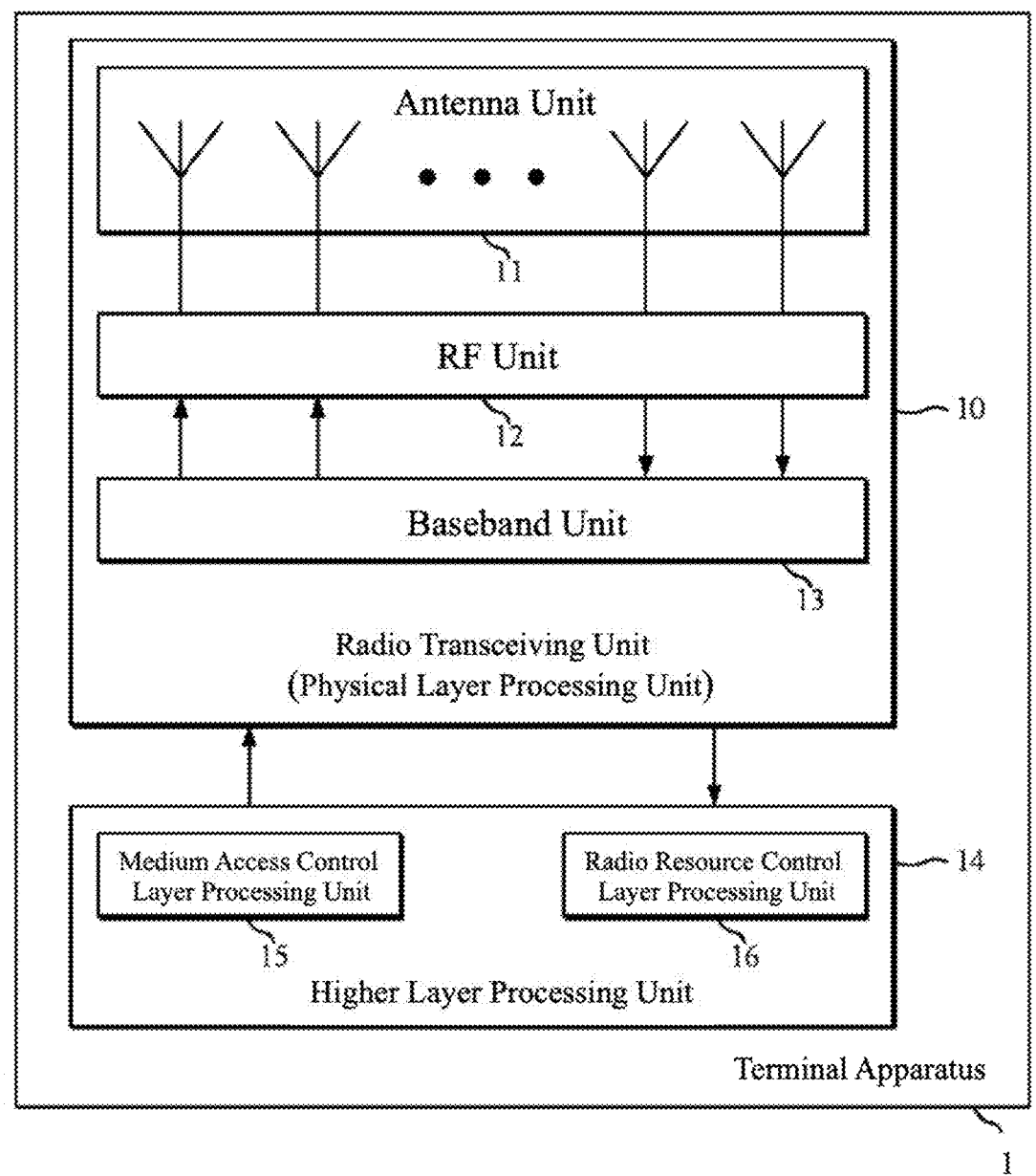
FIG. 20 is a schematic block diagram illustrating a configuration of a terminal apparatus 1 according to an embodiment of the present invention.

FIG. 20 is a schematic block diagram illustrating a configuration of a terminal apparatus 1 according to the present embodiment. As shown in FIG. 20, the terminal apparatus 1 includes a radio transceiving unit 10 and a higher layer processing unit 14. The radio transceiving unit 10 includes an antenna unit 11, an RF (Radio Frequency) unit 12, and a baseband unit 13. The higher layer processing unit 14 includes a medium access control layer processing unit 15 and a radio resource control layer processing unit 16. The radio transceiving unit 10 is also referred to as a transmission unit, a reception unit, a monitoring unit, or a physical layer processing unit. The higher layer processing unit 14 is also referred to as a measurement unit, a selection unit, or a control unit 14.

The higher layer processing unit 14 outputs uplink data (also referred to as transport block) generated by a user operation or the like to the radio transceiving unit 10. The higher layer processing unit 14 performs processing a part or all of a medium access control (MAC) layer, a packet data convergence protocol (PDCP) layer, a radio link control (RLC) layer, and a radio resource control (RRC) layer. The higher layer processing unit 14 may also include a function of selecting one reference signal from one or a plurality of reference signals based on a measured value of each reference signal. The higher layer processing unit 14 may include a function of selecting a PRACH occasion associated with the selected reference signal from one or a plurality of PRACH occasions. The higher layer processing unit 14 may include a function of identifying one index from one or more indexes set in a higher layer (e.g., RRC layer) and setting the index to a preamble index in the case where the bit information, which is included in the information indicating the start of the random access procedure and received by the radio transceiving unit 10, is a predetermined value. The higher layer processing unit 14 may include a function of identifying an index, which is associated with the selected reference signal, from one or more indexes set by the RRC and setting the index to a preamble index. The higher layer processing unit 14 may include a function of determining the next available PRACH occasion based on the received information (for example, SSB index information and/or mask index information). The higher layer processing unit 14 may include a function of selecting an SS/PBCH block based on the received information (for example, SSB index information).

The medium access control layer processing unit 15 included in the higher layer processing unit 14 performs the processing of the MAC layer (Medium Access Control layer). The medium access control layer processing unit 15 controls the transmission of a scheduling request based on the use of various types of configuration information/parameters managed by the radio resource control layer processing unit 16.

The radio resource control layer processing unit 16 included in the higher layer processing unit 14 performs processing of the RRC layer (Radio Resource Control layer). The radio resource control layer processing unit 16 manages various types of configuration information/parameters of the present terminal apparatus. The radio resource control layer processing unit 16 sets various types of configuration information/parameters based on a higher signal received from the base station apparatus 3. That is, the radio resource control layer processing unit 16 sets various types of configuration information/parameters based on information indicating the various types of configuration information/parameters received from the base station apparatus 3. The radio resource control layer processing unit 16 controls resource allocation based on downlink control information received from the base station apparatus 3.

The radio transceiving unit 10 performs processing of the physical layer, such as modulation, demodulation, encoding, decoding, and the like. The radio transceiving unit 10 demultiplexes, demodulates, and decodes the signal received from the base station apparatus 3, and then outputs decoded information to the higher layer processing unit 14. The radio transceiving unit 10 generates a transmission signal by modulating and encoding data, and then transmits the transmission signal to the base station apparatus 3. The radio transceiving unit 10 may also include a function of receiving one or more reference signals from a certain cell. The radio transceiving unit 10 may include a function of receiving information identifying one or more PRACH occasions (for example, SSB index information and/or mask index information). The radio transceiving unit 10 may include a function of receiving information indicating the start of the random access procedure. The radio transceiving unit 10 may include a function of receiving information identifying a predetermined index. The radio transceiving unit 10 may include a function of receiving information identifying a random access preamble index. The radio transceiving unit 10 may include a function of transmitting a random access preamble in the PRACH occasion determined by the higher layer processing unit 14.

The RF unit 12 converts (down converts) a signal received via the antenna unit 11 into a baseband signal by orthogonal demodulation, and then removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a cyclic prefix (CP) from the converted digital signal, performs a fast Fourier transform (FFT) on the signal from which the CP has been removed, and extracts a signal in the frequency domain.

The baseband unit 13 generates an OFDM symbol by performing an inverse fast Fourier transform (IFFT) on data, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal to a signal with a carrier frequency, and transmits the up-converted signal via the antenna unit 11. Further, the RF unit 12 amplifies the power. The RF unit 12 may include a function of determining the transmission power of an uplink signal and/or an uplink channel to be transmitted in a serving cell. The RF unit 12 may also be referred to as a transmission power control unit.

Figure 21:
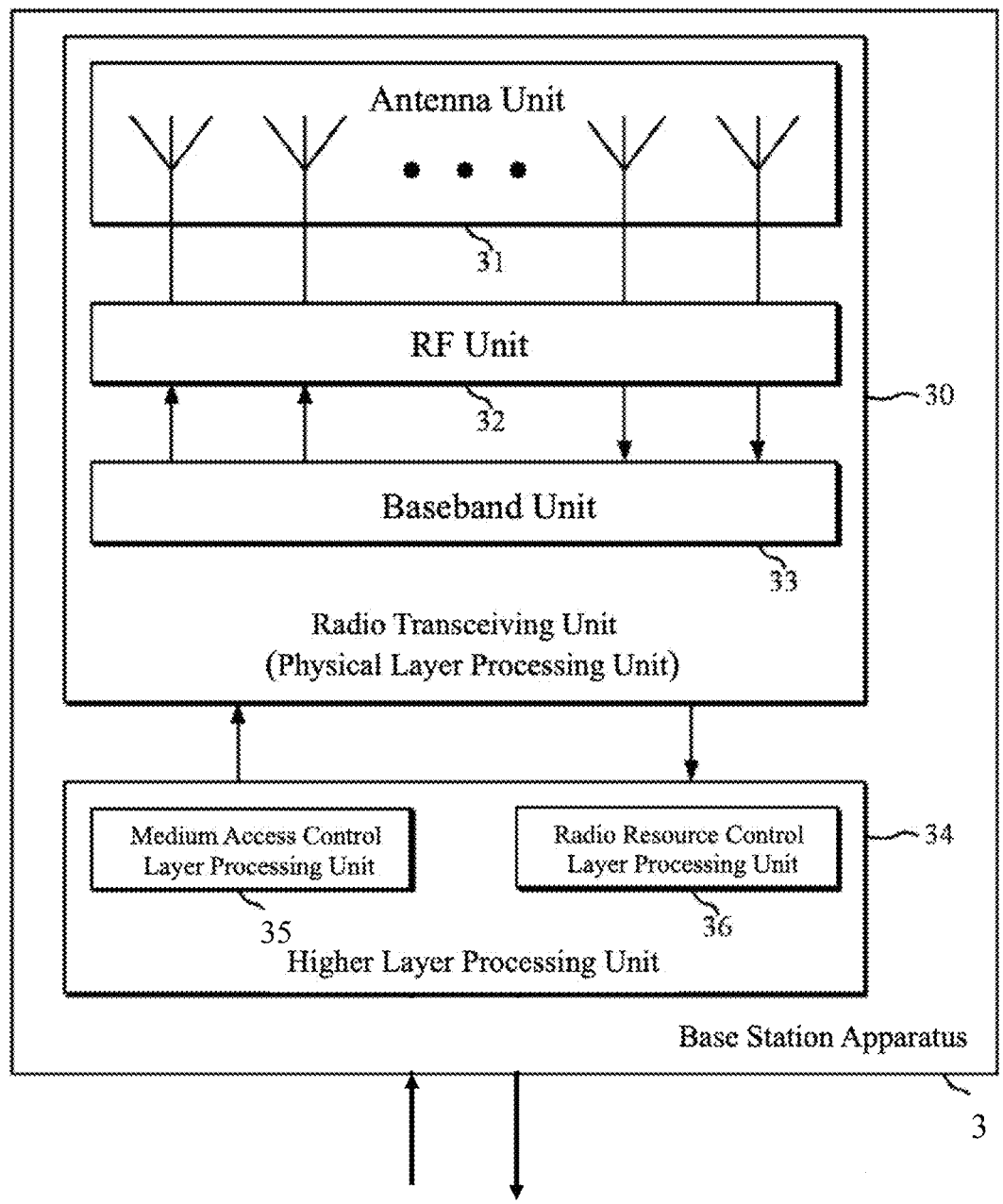
FIG. 21 is a schematic block diagram illustrating a configuration of a base station apparatus 3 according to an embodiment of the present invention.

FIG. 21 is a schematic block diagram illustrating a configuration of a base station apparatus 3 according to the present embodiment. As shown in FIG. 21, the base station apparatus 3 includes a radio transceiving unit 30 and a higher layer processing unit 34. The radio transceiving unit 30 includes an antenna unit 31, an RF unit 32, and a baseband unit 33. The higher layer processing unit 34 includes a medium access control layer processing unit 35 and a radio resource control layer processing unit 36. The radio transceiving unit 30 is also referred to as a transmission unit, a reception unit, a monitoring unit, or a physical layer processing unit. Further, a control unit that controls the operation of each unit based on various conditions may be provided additionally. The higher layer processing unit 34 is also referred to as a control unit 34.

The higher layer processing unit 34 performs processing a part or all of a medium access control (MAC) layer, a packet data convergence protocol (PDCP) layer, a radio link control (RLC) layer, and a radio resource control (RRC) layer. The higher layer processing unit 34 may include a function of identifying one reference signal from one or more reference signals based on a random access preamble received by the radio transceiving unit 30. The higher layer processing unit 34 may identify a PRACH occasion for monitoring a random access preamble according to at least SSB index information and mask index information.

The medium access control layer processing unit 35 included in the higher layer processing unit 34 performs the processing of the MAC layer. The medium access control layer processing unit 35 performs processing associated with a scheduling request based on various types of configuration information/parameters managed by the radio resource control layer processing unit 36.

The radio resource control layer processing unit 36 included in the higher layer processing unit 34 performs the RRC layer processing. The radio resource control layer processing unit 36 generates downlink control information (e.g., an uplink grant or a downlink grant) including resource allocation information for the terminal apparatus 1. The radio resource control layer processing unit 36 generates, or acquires from a higher node, downlink control information, downlink data (transport block or random access response) allocated on a physical downlink shared channel, system information, an RRC message, a MAC control element (CE), and the like, and outputs them to the radio transceiving unit 30. In addition, the radio resource control layer processing unit 36 manages various types of configuration information/parameters for its own terminal apparatus 1. The radio resource control layer processing unit 36 can also set various types of configuration information/parameters respectively for its own terminal apparatus 1 via a higher signal. That is, the radio resource control layer processing unit 36 transmits/broadcasts information indicating various types of configuration information/parameters. The radio resource control layer processing unit 36 may transmit/ broadcast information identifying the configuration of one or more reference signals in a certain cell.

In the case where an RRC message, a MAC CE, and/or a PDCCH are transmitted from the base station apparatus 3 to the terminal apparatus 1 and where the terminal apparatus 1 performs processing based on the reception of the above, the base station apparatus 3 performs processing (i.e., controls of the terminal apparatus 1 and the system) assuming that the terminal apparatus performs the processing. That is, the base station apparatus 3 transmits to the terminal apparatus 1 the RRC message, the MAC CE, and/or the PDCCH for making the terminal apparatus to perform the processing based on the reception of the above.

The radio transceiving unit 30 includes a function of transmitting one or more reference signals. In addition, the radio transceiving unit 30 may include a function of receiving from the terminal apparatus 1 signals that include a beam failure recovery request. The radio transceiving unit 30 may include a function of transmitting information identifying one or more PRACH occasions (for example, SSB index information and/or mask index information) to the terminal apparatus 1. The radio transceiving unit 30 may include a function of transmitting information identifying a predetermined index. The radio transceiving unit 30 may include a function of transmitting information identifying a random access preamble index. The radio transceiving unit 30 may include a function of monitoring a random access preamble in the PRACH occasion identified by the higher layer processing unit 34. In addition, a part of functions of the radio transceiving unit 30 is similar to the functions of the radio transceiving unit 10, and hence the description thereof is omitted. Further, when the base station apparatus 3 is connected to one or more transmission reception points 4, a part or all of the functions of the radio transceiving unit 30 may be included in each transmission reception point 4.

Further, the higher layer processing unit 34 transmits (forwards) or receives a control message or user data between the base station apparatuses 3 or between a higher level network apparatus (MME, S-GW (Serving-GW)) and the base station apparatus 3. In FIG. 21, the components of other base station apparatus 3 and the transmission path of data (control information) between the components are omitted, but other functions provided by some components necessary for operating as the base station device 3 are clear and included without further illustration. For example, the higher layer processing unit 34 includes a radio resource management layer processing unit and an application layer processing unit. Further, the higher layer processing unit 34 may include a function of configuring a plurality of scheduling request resources corresponding respectively to the plurality of reference signals transmitted from the radio transceiving unit 30.

It should be noted that the "unit" in the drawings is an element for implementing the functions and procedures of the terminal apparatus 1 and the base station apparatus 3, and may also be expressed by terms such as a part, a circuit, a constituent apparatus, an equipment, a member, and the like.

The units with reference numerals 10 to 16 included in the terminal apparatus 1 may be configured as circuits, respectively. The units with reference numerals 30 to 36 included in the base station apparatus 3 may be configured as circuits, respectively.

(1) More specifically, a terminal apparatus 1 according to a first aspect of the present invention includes: a reception unit 10 which detects a PDCCH including a DCI in a USS and receives a PDSCH scheduled by the DCI; and a control unit 16 which determines the number of bits of a first field included in the DCI. The first field is a time domain resource allocation field for the PDSCH. A first parameter of a higher layer includes one or more entries, and the one or more entries indicate time domain resource allocation information for the PDSCH. A default table is predefined and indicates the time domain resource allocation information for the PDSCH. The control unit 16 determines the number of bits of the first field to be ceiling (log 2 (I)). When the first parameter is indicated, the I is given according to the number of entries; and when the first parameter is not indicated, the I is given according to the number of rows of the default table.

(2) A base station apparatus 3 according to a second aspect of the present invention includes: a reception unit 30 which transmits a PDCCH including a DCI in a USS and receives a PDSCH scheduled by the DCI; and a control unit 36 which determines the number of bits of a first field and generate the DCI that includes the first field. The first field is a time domain resource allocation field for the PDSCH. A first parameter of a higher layer includes one or more entries, and the one or more entries indicate time domain resource allocation information for the PDSCH. A default table is predefined and indicates the time domain resource allocation information for the PDSCH. The control unit 36 determines the number of bits of the first field to be ceiling (log 2 (I)). When the first parameter is indicated, the I is given according to the number of entries; and when the first parameter is not indicated, the I is given according to the number of rows of the default table.

(3) According to the first aspect or the second aspect of the present invention, when the first parameter is not indicated, the default table is used to indicate time domain resource allocation for the PDSCH, and when the first parameter is indicated, the one or more entries is used to indicate the time domain resource allocation for the PDSCH.

(4) According to the first aspect or the second aspect of the present invention, the time domain resource allocation information for the PDSCH indicates a slot offset between the PDCCH and the PDSCH, a starting symbol of the PDSCH within a slot and the number of consecutive allocated symbols, and a PDSCH mapping type.

(5) According to the first aspect or the second aspect of the present invention, the first parameter is included in the PDSCH setting common to a cell or the PDSCH setting specific to a UE.

(6) According to the first aspect or the second aspect of the present invention, the DCI is attached with CRC scrambled by any of C-RNTI, MCS-C-RNTI, and CS-RNTI.

(7) A terminal apparatus 1 according to a third aspect of the present invention includes: a reception unit 10 which detects a PDCCH including a DCI in a USS and receives a PDSCH scheduled by the DCI; and a control unit 16 which determines the number of bits of a first field included in the DCI. The first field is a time domain resource allocation field for the PDSCH. A first parameter of a higher layer includes one or more entries, and the one or more entries indicate time domain resource allocation information for the PDSCH. When the control unit 16 indicates the first parameter, the number of bits of the first field is determined to be ceiling (log 2 (I)). When the first parameter is not indicated, the number of bits of the first field is determined to be 4, and the I is given according to the number of entries.

(8) A base station apparatus 3 according to a fourth aspect of the present invention includes: a reception unit 30 which transmits a PDCCH including a DCI in a USS and receives a PDSCH scheduled by the DCI; and a control unit 36 which determines the number of bits of a first field and generate the DCI that includes the first field. The first field is a time domain resource allocation field for the PDSCH. A first parameter of a higher layer includes one or more entries, and the one or more entries indicate time domain resource allocation information for the PDSCH. When the control unit 36 indicates the first parameter, the number of bits of the first field is determined to be ceiling (log 2 (I)). When the first parameter is not indicated, the number of bits of the first field is determined to be 4, and the I is given according to the number of entries.

(9) A terminal apparatus 1 according to a fifth aspect of the present invention includes: a reception unit 10 which receives a PDSCH including a RAR message in a slot n; and a transmission unit 10 which transmits a PUSCH scheduled according to a first UL grant included in the RAR message. A subcarrier spacing used for the PDSCH is a first subcarrier spacing X, and a subcarrier spacing used for the PUSCH is a second subcarrier spacing Y. The n of the slot n is a first slot number corresponding to the first subcarrier spacing X, and a second slot number of a slot for transmitting the PUSCH is given by Floor $(n*Y/X)+K_2+\Delta$. The second slot number corresponds to the second subcarrier spacing Y. The value of $K_2$ is a slot offset value given based on the first UL grant, and the value of $\Delta$ is the number of predefined slots corresponding to the second subcarrier spacing Y.

(10) According to the fifth aspect of the present invention, the slots corresponding to the subcarrier spacings respectively are counted in an ascending order from 0 within a subframe and/or within a frame.

(11) A base station apparatus 3 according to a sixth aspect of the present invention includes: a transmission unit 30 which receives a PDSCH including a RAR message in a slot n; and a reception unit 30 which receives a PUSCH scheduled according to a first UL grant included in the RAR message. A subcarrier spacing used for the PDSCH is a first subcarrier spacing X, and a subcarrier spacing used for the PUSCH is a second subcarrier spacing Y. The n of the slot n is a first slot number corresponding to the first subcarrier spacing X, and a second slot number of a slot for transmitting the PUSCH is given by Floor $(n*Y/X)+K_2+\Delta$. The second slot number corresponds to the second subcarrier spacing Y. The value of $K_2$ is a slot offset value given based on the first UL grant, and the value of $\Delta$ is the number of predefined slots corresponding to the second subcarrier spacing Y.

(12) According to the sixth aspect of the present invention, the slots corresponding to the subcarrier spacings respectively are counted in an ascending order from 0 within a subframe and/or within a frame.

Accordingly, the terminal apparatus 1 and the base station apparatus 3 can communicate efficiently.

The program running in the apparatuses according to one aspect of the present invention may be a program that controls a central processing unit (CPU) to operate a computer so as to implement the functions of the embodiment according to the present invention. Programs or information processed by the programs are temporarily stored in a volatile memory such as a random access memory (RAM), a non-volatile memory such as a flash memory, a hard disk drive (HDD), or other storage device system.

Besides, a program for implementing such functions of the embodiment according to the present invention may be recorded on a computer-readable recording medium. It may be implemented by loading the program recorded on the recording medium into a computer system and executing the program. The "computer system" described herein refers to a computer system built into the apparatuses, and includes an operating system and hardware components such as peripheral devices. In addition, the "computer-readable recording medium" may be any of a semiconductor recording medium, an optical recording medium, a magnetic recording medium, a medium dynamically retaining the program for a short time, or any other computer readable recording medium.

In addition, the various functional blocks or various features of the apparatuses used in the above-mentioned embodiments may be installed or performed by a circuit, such as an integrated circuit or multiple integrated circuits. Circuits designed to execute the functions described in the present description may include general-purpose processors, digital signal processors (DSPs), application specific integrated circuits (ASICs), field programmable gate arrays (FPGAs) or other programmable logic devices, discrete gates or transistor logic, discrete hardware components, or any combination of the above. The general-purpose processor may be a microprocessor, or may be a conventional processor, controller, microcontroller, or state machine. The above-mentioned circuit may include a digital circuit, or may include an analog circuit. In addition, in a case that with advances in semiconductor technology, a new circuit integration technology may appear to replace the present technology for integrated circuits, one or more aspects of the present invention may also use a new integrated circuit based on the new circuit integration technology.

Besides, in the embodiment according to the present invention, an example applied to a communication system, which includes a base station apparatus and a terminal apparatus, has been described, but it can also be applied to a system in which terminals communicate with each other via D2D (Device to Device) communication.

Besides, the present invention is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail with reference to the accompanying drawings, but the specific configuration is not limited to the embodiments and further includes design modification and the like without departing from the scope of the present invention. In addition, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another may also be included in the technical scope of the present invention.

INDUSTRIAL APPLICABILITY

Several aspects of the present invention can be applied to a base station apparatus, a terminal apparatus, a communication method, and the like that require efficient communication performed between a terminal apparatus and a base station apparatus.

What is claimed is:

1. A terminal apparatus for communicating with a base station apparatus, the terminal apparatus comprising:
   at least one processor; and
   at least one memory coupled to the at least one processor, the at least one memory storing one or more computer-executable instructions that, when executed by the at least one processor, cause the terminal apparatus to:
   receive, from the base station apparatus, a physical downlink control channel (PDCCH) including downlink control information (DCI) in a search space specific to the terminal apparatus and a physical downlink shared channel (PDSCH) scheduled by the DCI; and
   determine a number of bits of a time domain resource allocation field in the DCI as ceiling(log 2(I)), in which the time domain resource allocation field is associated with a time domain resource allocation configuration and a default table for the PDSCH,
   wherein:
   when a radio resource control (RRC) parameter pdsch-TimeDomainAllocationList is received, I is given by a number of entries in the RRC parameter pdsch-TimeDomainAllocationList, and
   when the RRC parameter pdsch-TimeDomainAllocationList is not received, I is given by a fixed number of entries in the default table.

2. The terminal apparatus of claim 1, wherein the time domain resource allocation field indicates a slot offset between the PDCCH and the PDSCH, a starting symbol of the PDSCH within a slot, a number of consecutive allocated symbols, and a PDSCH mapping type.

3. The terminal apparatus of claim 1, wherein the DCI is attached with a cyclic redundancy check scrambled by any of a Cell-Radio Network Temporary Identifier (C-RNTI), a Modulation and Coding Scheme (MCS)-C-RNTI, or a Configured Scheduling-RNTI.

4. A base station apparatus for communicating with a terminal apparatus, the base station apparatus comprising:
   at least one processor; and
   at least one memory coupled to the at least one processor, the at least one memory storing one or more computer-executable instructions that, when executed by the at least one processor, cause the base station apparatus to:
   transmit, to the terminal apparatus, a physical downlink control channel (PDCCH) including downlink control information (DCI) in a search space specific to the terminal apparatus and a physical downlink shared channel (PDSCH) scheduled by the DCI; and
   determine a number of bits of a time domain resource allocation field in the DCI as ceiling(log 2(I)), in which the time domain resource allocation field is associated with a time domain resource allocation configuration and a default table for the PDSCH,
   wherein:
   when a radio resource control (RRC) parameter pdsch-TimeDomainAllocationList is transmitted, I is given by a number of entries in the RRC parameter pdsch-TimeDomainAllocationList, and
   when the RRC parameter pdsch-TimeDomainAllocationList is not transmitted, I is given by a fixed number of entries in the default table.

5. The base station apparatus of claim 4, wherein the time domain resource allocation field indicates a slot offset between the PDCCH and the PDSCH, a starting symbol of the PDSCH within a slot, a number of consecutive allocated symbols, and a PDSCH mapping type.

6. The base station apparatus of claim 4, wherein the DCI is attached with a cyclic redundancy check scrambled by any of a Cell-Radio Network Temporary Identifier (C-RNTI), a Modulation and Coding Scheme (MCS)-C-RNTI, or a Configured Scheduling-RNTI.

7. A communication method for a terminal apparatus communicating with a base station apparatus, the communication method comprising:
   receiving, from the base station apparatus, a physical downlink control channel (PDCCH) including downlink control information (DCI) in a search space specific to the terminal apparatus and a physical downlink shared channel (PDSCH) scheduled by the DCI; and
   determining a number of bits of a time domain resource allocation field in the DCI as ceiling(log 2(I)), in which the time domain resource allocation field is associated with a time domain resource allocation configuration and a default table for the PDSCH,
   wherein:
   when a radio resource control (RRC) parameter pdsch-TimeDomainAllocationList is received, I is given by a number of entries in the RRC parameter pdsch-TimeDomainAllocationList, and
   when the RRC parameter pdsch-TimeDomainAllocationList is not received, I is given by a fixed number of entries in the default table.

8. The communication method of claim 7, wherein the time domain resource allocation field indicates a slot offset between the PDCCH and the PDSCH, a starting symbol of the PDSCH within a slot, a number of consecutive allocated symbols, and a PDSCH mapping type.

9. The communication method of claim 7, wherein the DCI is attached with a cyclic redundancy check scrambled by any of a Cell-Radio Network Temporary Identifier (C-RNTI), a Modulation and Coding Scheme (MCS)-C-RNTI, or a Configured Scheduling-RNTI.

* * * * *